(12) United States Patent
Good et al.

(10) Patent No.: US 7,104,454 B2
(45) Date of Patent: *Sep. 12, 2006

(54) AUTOMATED SYSTEM AND METHOD FOR IDENTIFYING AND MEASURING PACKAGES TRANSPORTED THROUGH AN OMNIDIRECTIONAL LASER SCANNING TUNNEL

(75) Inventors: Timothy A. Good, Blackwood, NJ (US); Andrew D. Dehennis, Cheltenham, PA (US); Xiaoxun Zhu, Philadelphia, PA (US); David M. Wilz, Sr., Sewell, NJ (US); George B. Rockstein, Audobon, NJ (US); Stephen J. Colavito, Brookhaven, PA (US); Robert E. Blake, Woodbury Heights, NJ (US); Ka Man Au, Philadelphia, PA (US); George Kolis, Pennsawken, NJ (US); C. Harry Knowles, Morristown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 294 days.

This patent is subject to a terminal disclaimer.

(21) Appl. No.: 10/438,797

(22) Filed: May 15, 2003

(65) Prior Publication Data

US 2004/0069854 A1 Apr. 15, 2004

Related U.S. Application Data

(63) Continuation of application No. 10/076,912, filed on Feb. 14, 2002, now Pat. No. 6,616,604, which is a continuation of application No. 09/157,778, filed on Sep. 21, 1998, now Pat. No. 6,517,004, which is a continuation-in-part of application No. 09/047,146, filed on Mar. 24, 1998, now Pat. No. 6,360,947, and a continuation-in-part of application No. 08/949,915, filed on Oct. 14, 1997, now Pat. No. 6,158,659, and a continuation-in-part of application No. 08/854,832, filed on May 12, 1997, now Pat. No. 6,085,978, and a continuation-in-part of application No. 08/886,806, filed on Apr. 22, 1997, now Pat. No. 5,984,185, and a continuation-in-part of application No. 08/726,522, filed on Oct. 7, 1996, now Pat. No. 6,073,846, and a continuation-in-part of application No. 08/573,949, filed on Dec. 18, 1995, now abandoned.

(51) Int. Cl.
*B06K 7/10* (2006.01)

(52) U.S. Cl. ............................ 235/462.24; 235/462.25; 235/472.01

(58) Field of Classification Search ... 235/462.01–462.48, 235/235/235/235/235/235/235/235/235/235/235/235/235/235/235/235/235/235/472.01, 235/472.02, 472.03, 454, 455, 494, 470
See application file for complete search history.

(56) References Cited

U.S. PATENT DOCUMENTS 4,333,006 A 6/1982 Gorin et al.

(Continued)

FOREIGN PATENT DOCUMENTS

| GB | 2 189 594 A | 10/1987 |
|----|-------------|---------|
| WO | WO 97/22082 | 6/1997 |

OTHER PUBLICATIONS

Web-based publication entitled "Tunnel Scanning System" by Accu-Sort, Inc., www.accusort.com/mktg/as01.html, pp. 1–2, Jan. 12, 1997.

(Continued)

*Primary Examiner*—Thien M. Le
(74) *Attorney, Agent, or Firm*—Thomas J. Perkowski, Esq., P.C.

(57) ABSTRACT

A fully automated package identification and measuring system, in which an omni-directional holographic scanning tunnel is used to read bar codes on packages entering the tunnel, while a package dimensioning subsystem is used to capture information about the package prior to entry into the tunnel. Mathamatical models are created on a real-time basis for the geometry of the package and the position of the laser scanning beam used to read the bar code symbol thereon. The mathamatical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

15 Claims, 105 Drawing Sheets

U.S. PATENT DOCUMENTS

| | | |
|---|---|---|
| 4,580,894 A | 4/1986 | Wojeik |
| 5,331,118 A | 7/1994 | Jensen |
| 5,495,097 A | 2/1996 | Katz et al. |
| 5,547,034 A | 8/1996 | Wurz et al. |
| 5,555,090 A | 9/1996 | Schmutz |
| 5,633,487 A | 5/1997 | Schmutz et al. |
| 5,656,799 A | 8/1997 | Ramsden et al. |
| 5,661,561 A | 8/1997 | Wurz et al. |
| 5,689,092 A | 11/1997 | Wurz et al. |
| 5,699,161 A | 12/1997 | Woodworth |
| 5,723,852 A | 3/1998 | Rando et al. |
| 5,737,438 A | 4/1998 | Zlotnick et al. |
| 5,814,802 A | 9/1998 | Hecht et al. |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,969,823 A | 10/1999 | Wurz et al. |
| 5,979,760 A | 11/1999 | Freyman et al. |
| 5,984,186 A | 11/1999 | Tafoya |
| 5,991,041 A | 11/1999 | Woodworth |
| 6,053,409 A | 4/2000 | Brobst et al. |
| 6,123,264 A | 9/2000 | Li et al. |
| 6,147,358 A | 11/2000 | Hecht |
| 6,517,004 B1 * | 2/2003 | Good et al. ............. 235/472.02 |
| 6,554,189 B1 * | 4/2003 | Good et al. ............. 235/462.01 |
| 6,616,048 B1 * | 9/2003 | Good et al. ............. 235/472.02 |
| 2003/0080192 A1 * | 5/2003 | Tsikos et al. .......... 235/462.14 |
| 2003/0085280 A1 * | 5/2003 | Tsikos et al. ................ 235/454 |
| 2003/0085281 A1 * | 5/2003 | Knowles et al. ........... 235/454 |
| 2003/0089778 A1 * | 5/2003 | Tsikos et al. ................ 235/454 |
| 2003/0094495 A1 * | 5/2003 | Knowles et al. ....... 235/462.14 |
| 2003/0098349 A1 * | 5/2003 | Tsikos et al. .......... 235/462.01 |
| 2003/0098353 A1 * | 5/2003 | Tsikos et al. .......... 235/472.01 |
| 2003/0102379 A1 * | 6/2003 | Tsikos et al. .......... 235/462.45 |
| 2003/0218070 A1 * | 11/2003 | Tsikos et al. .......... 235/472.01 |

OTHER PUBLICATIONS

Scientific publication entitled "Dimensioning The Right Way: Reliably" by Cargoscan A/S, Sep. 1998, pp. 1–16.

Product brochure for the MINI–X by Accu–Sort Systems, Inc., Telford, PA, pp. 1–3, Jan. 1998.

Scientific publication entitled "Omni–Scan Tunnel" by Metrologic Instruments, Inc., Blackwood, NJ, Jan. 1997, pp. 1–8.

* cited by examiner

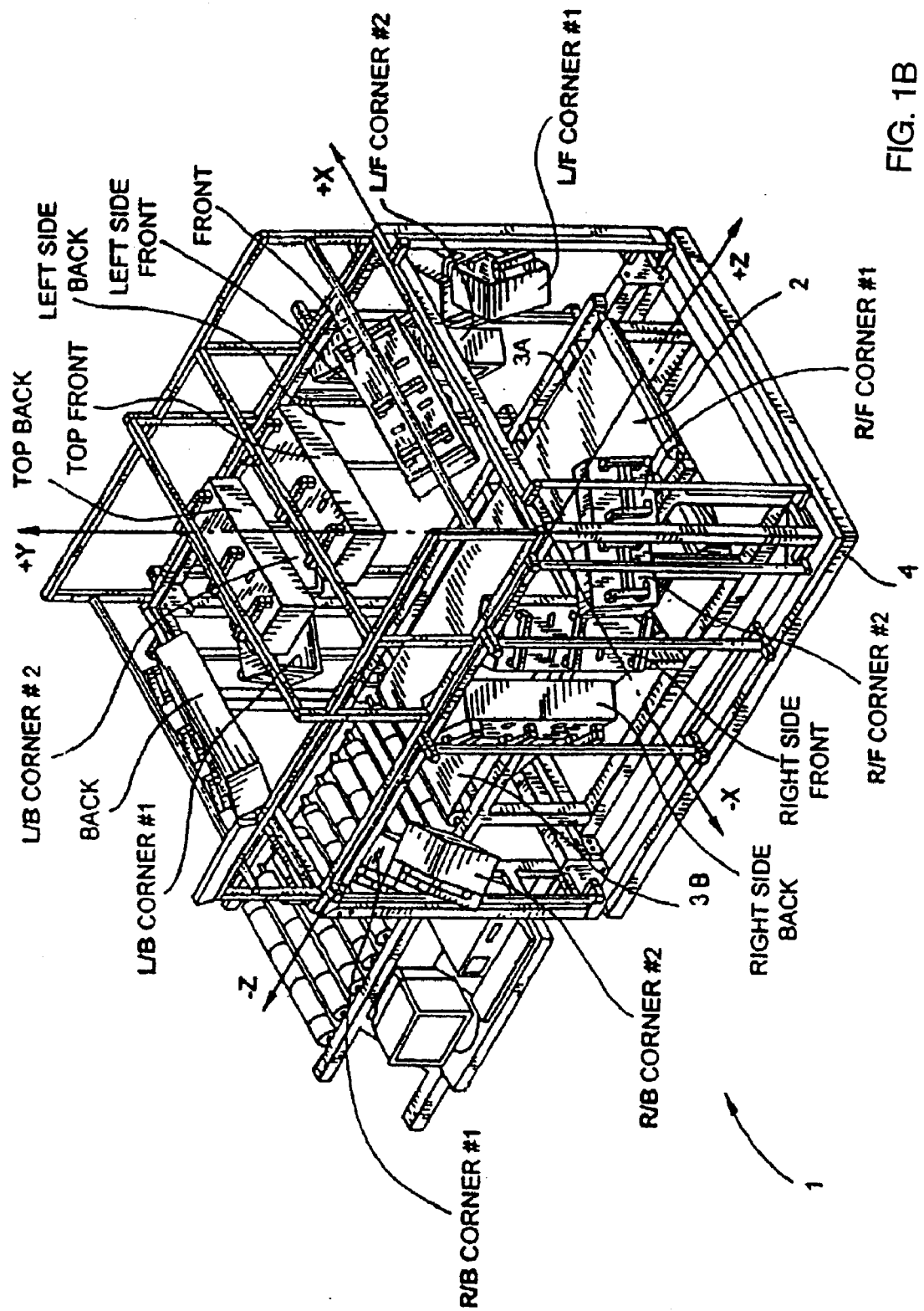

TUNNEL SCANNER POSITIONING DATA:

| SCANNER: | ROTATION ANGLES (degrees): | | | POSITION COORDINATES (inches): | | |
|---|---|---|---|---|---|---|
| | YAW | RITCH | ROLL | X | Y | Z |
| TOP/FRONT | 0 | 80 | 0 | 1 | 73 | -10 |
| TOP/BACK | 0 | 100 | 0 | -1 | 66 | 10 |
| FRONT | 0 | 40 | 0 | 0 | 57 | -40 |
| BACK | 0 | 130 | 0 | 0 | 57 | 40 |
| RIGHT SIDE/FRONT | 60 | 0 | 90 | -45 | 18 | -12 |
| RIGHT SIDE/BACK | 120 | 0 | 90 | -45 | 18 | 12 |
| LEFT SIDE/FRONT | -60 | 0 | 90 | 45 | 18 | -12 |
| LEFT SIDE/BACK | -120 | 0 | 90 | 45 | 18 | 12 |
| L/F CORNER #1 | -30 | 15 | -7 | 29 | 18 | -80 |
| L/F CORNER #2 | -30 | 15 | -7 | 40 | 18 | -59 |
| L/B CORNER #1 | -150 | 15 | 7 | 29 | 18 | 80 |
| L/B CORNER #2 | -150 | 15 | 7 | 40 | 18 | 68 |
| R/F CORNER #1 | 30 | 15 | 7 | -29 | 18 | -80 |
| R/F CORNER #2 | 30 | 15 | 7 | -40 | 18 | -59 |
| R/B CORNER #1 | 150 | 15 | -7 | -29 | 18 | 80 |
| R/B CORNER #2 | 150 | 15 | -7 | -40 | 18 | 68 |

FIG. 2C

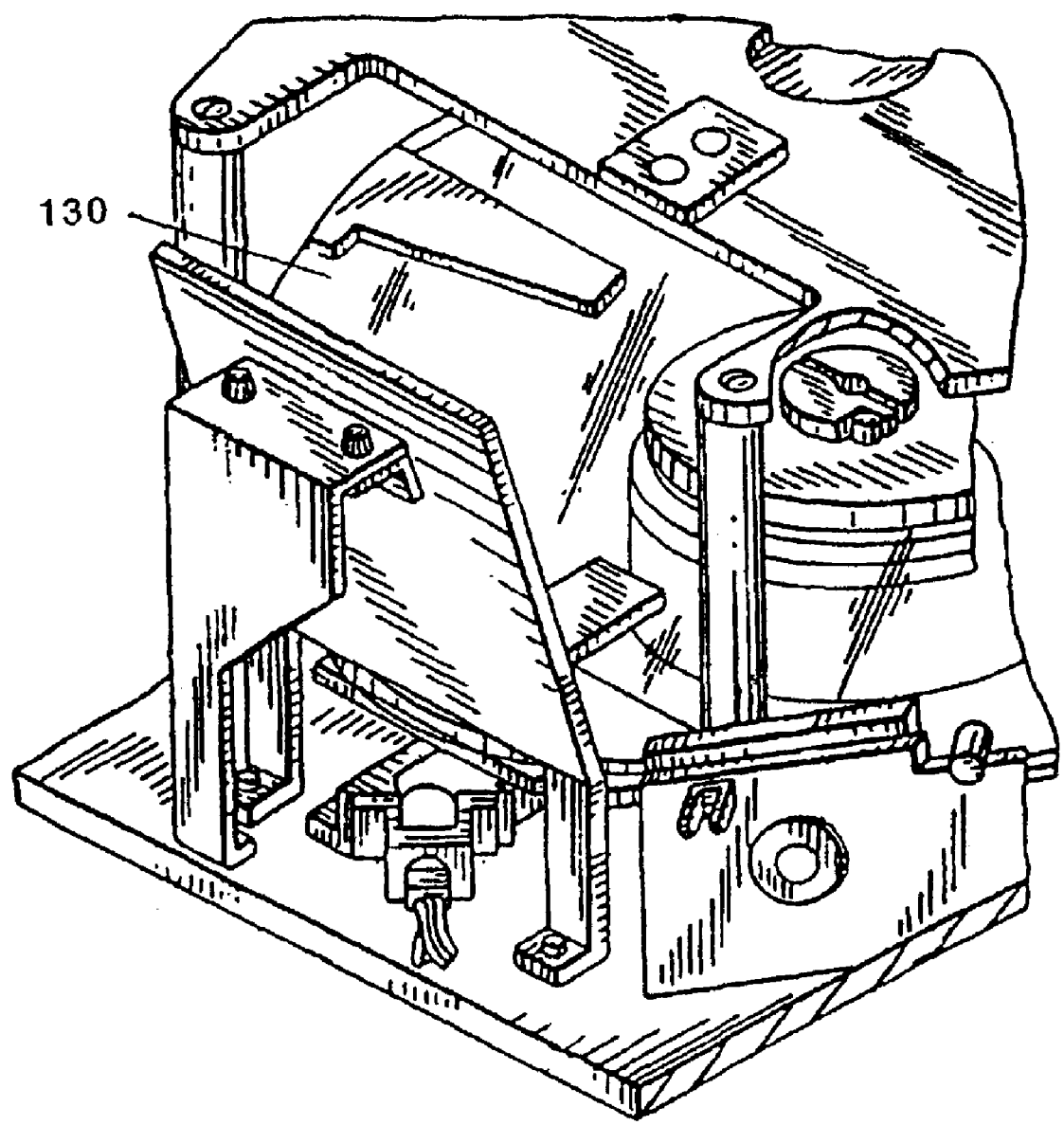
FIG. 3A1

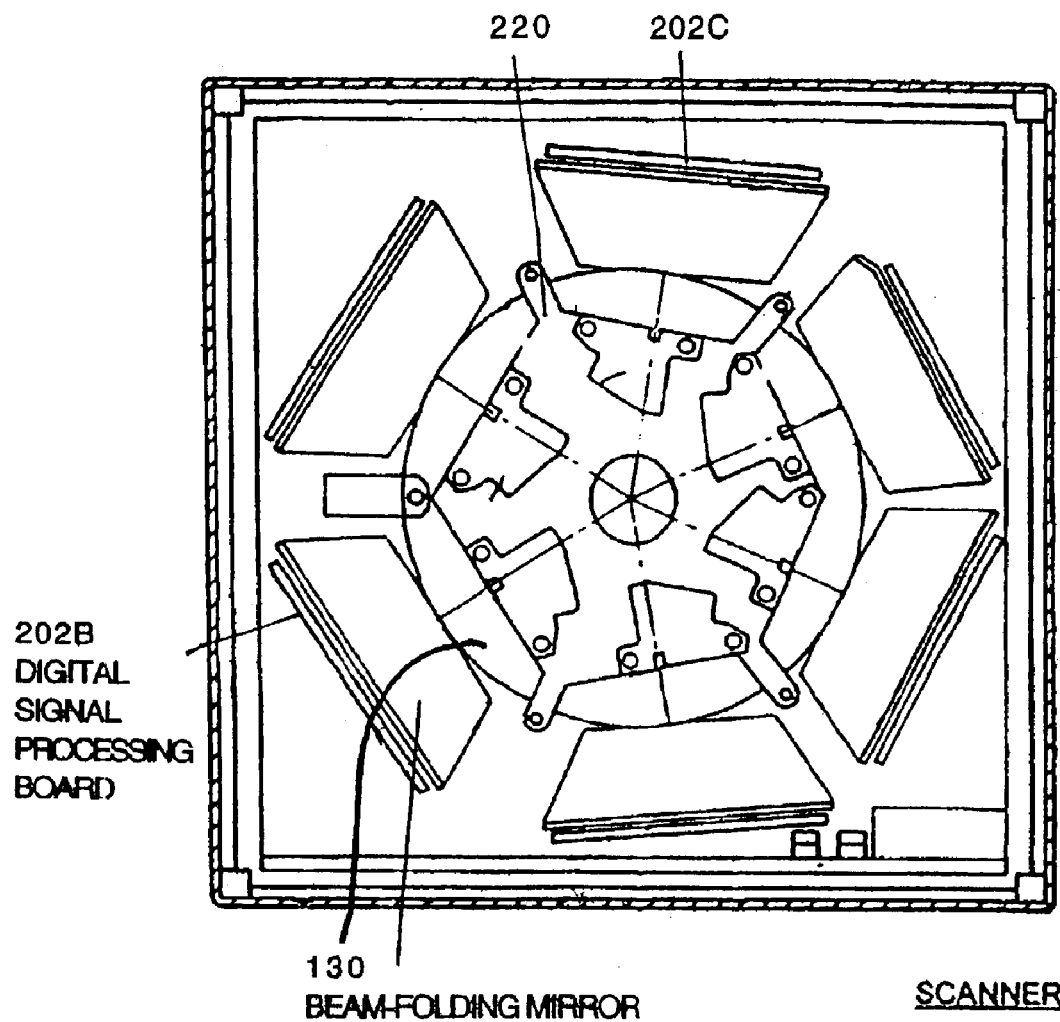
FIG. 3A2

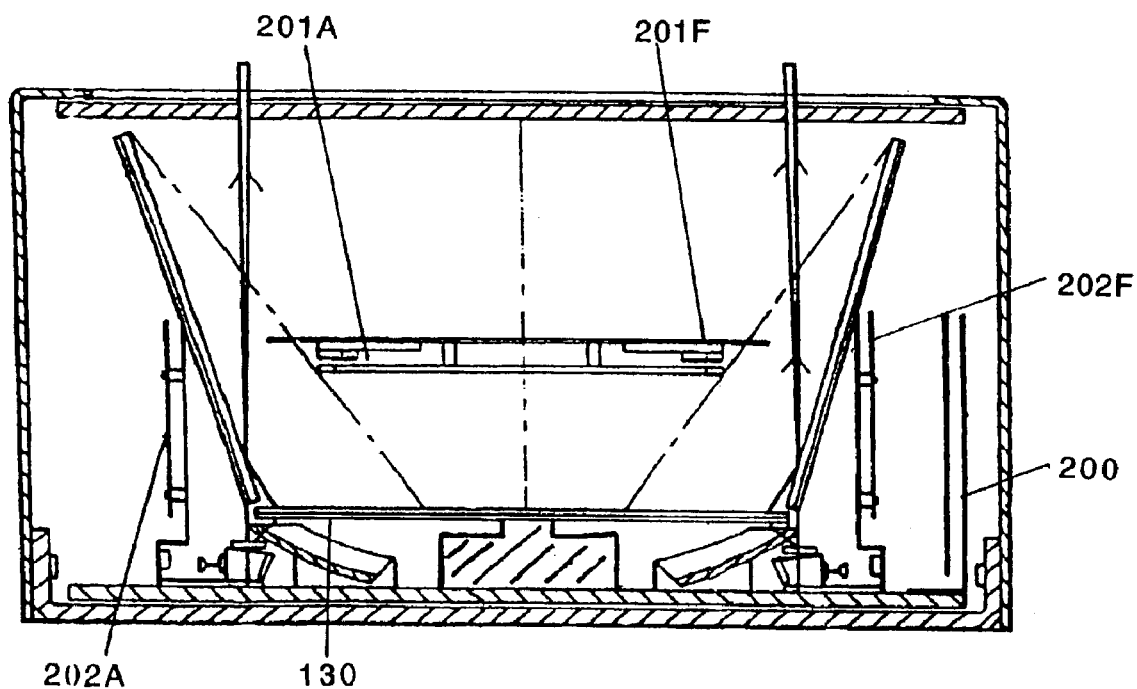
FIG. 3A3

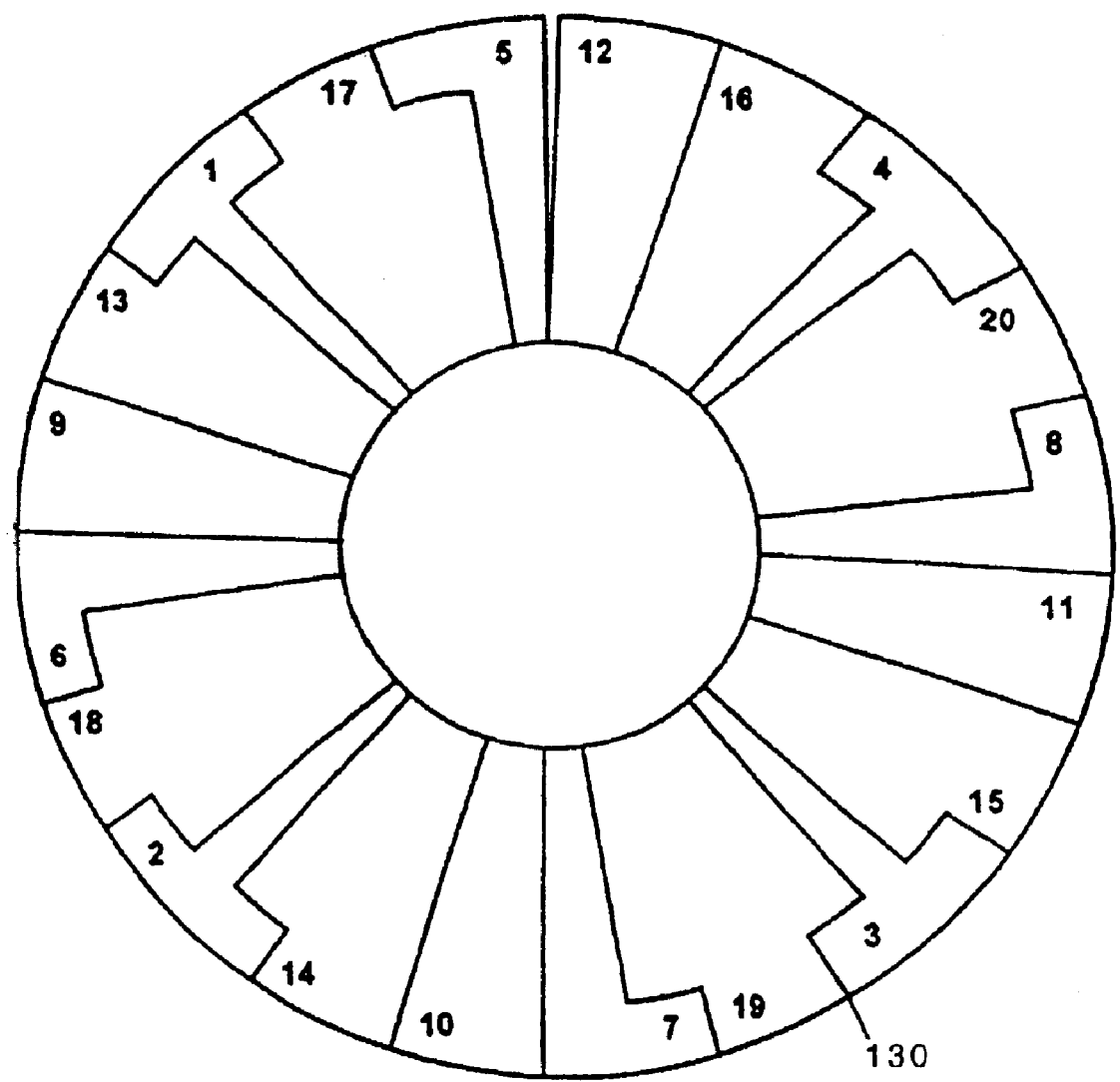
FIG. 3A4

| ROTATIONAL SPEED OF DISK (rpm) | | | | | |
|---|---|---|---|---|---|
| X-SCAN 4 LINES/ 5 FOCAL PLANES | | | | | WAVELENGTH: |
| FACET | DIFFRACTION FOCAL LENGTH (inches) | GEOMETRICAL FOCAL LENGTH (inches) | ANGLE A (degrees) | ANGLE B (degrees) | ANGLE OF DIFFRACTION (degrees) |
| 1 | 39.00 | 39.07 | 45.9 | 57.40 | 32.60 |
| 2 | 39.00 | 39.07 | 45.9 | 57.40 | 32.60 |
| 3 | 39.00 | 39.07 | 45.9 | 57.40 | 32.60 |
| 4 | 39.00 | 39.07 | 45.9 | 57.40 | 32.60 |
| 5 | 45.01 | 45.11 | 45.9 | 57.00 | 33.00 |
| 6 | 45.01 | 45.11 | 45.9 | 57.00 | 33.00 |
| 7 | 45.01 | 45.11 | 45.9 | 57.00 | 33.00 |
| 8 | 45.01 | 45.11 | 45.9 | 57.00 | 33.00 |
| 9 | 51.51 | 51.66 | 45.9 | 56.67 | 33.33 |
| 10 | 51.51 | 51.66 | 45.9 | 56.67 | 33.33 |
| 11 | 51.51 | 51.66 | 45.9 | 56.67 | 33.33 |
| 12 | 51.51 | 51.66 | 45.9 | 56.67 | 33.33 |
| 13 | 58.32 | 58.64 | 45.9 | 56.40 | 33.60 |
| 14 | 58.32 | 58.64 | 45.9 | 56.40 | 33.60 |
| 15 | 58.32 | 58.64 | 45.9 | 56.40 | 33.60 |
| 16 | 58.32 | 58.64 | 45.9 | 56.40 | 33.60 |
| 17 | 64.93 | 65.24 | 45.9 | 56.19 | 33.81 |
| 18 | 64.93 | 65.24 | 45.9 | 56.19 | 33.81 |
| 19 | 64.93 | 65.24 | 45.9 | 56.19 | 33.81 |
| 20 | 64.93 | 65.24 | 45.9 | 56.19 | 33.81 |
| | | AVERAGE ANGLE B(degrees): | | 56.73 | |
| APPROXIMATE MINIMUM BOX WIDTH: | | 12.57 inches | | | |
| (BASED ON LARGE MIRROR AS LIMITATION) | | | | | |

FIG. 3A5A

| 6000 | | | | |
|---|---|---|---|---|
| 685 mm | | | | ACCOUNTING FOR DEAD TIME FOR LASER BEAM 2.59 (degrees) |
| ANGLE OF BEAM FROM VERTICAL (degrees) | SCAN ANGLE (degrees) | SCAN MULT. FACTOR(m) | ROTATION ANGLE (degrees) | |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| | AVERAGE: | 1.33 | | |
| SUMS | 407.01 | | 307.00 | 358.88 |
| TOTAL FACET ANGULAR SWEEP (degrees): | | | | 358.88 |

FIG. 3A5B

| LIGHT COLLECTION FACTOR | MAXIMUM COLLECTION AREA (IGNORING NOTCH) (sq. in) | DESIGN COLLECTION AREA (INCLUDES NOTCH LOSS OF 0.15) (sq. inches) | BEAM SPEED AT CENTER OF SCAN LINE (inches/sec) | BEAM SPEED AT MAX DEPTH OF FIELD (inches/sec) | BEAM SPEED AT MIN DEPTH OF FIELD (inches/sec) |
|---|---|---|---|---|---|
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 37.18 | 48.34 | 46.34 | | SUMS | |
| | | Vmax (in/s): | 56908 | | |
| | | Vmin (in/s): | 29409 | | |
| | | RATIO | 1.34 | | |

FIG. 3A5C

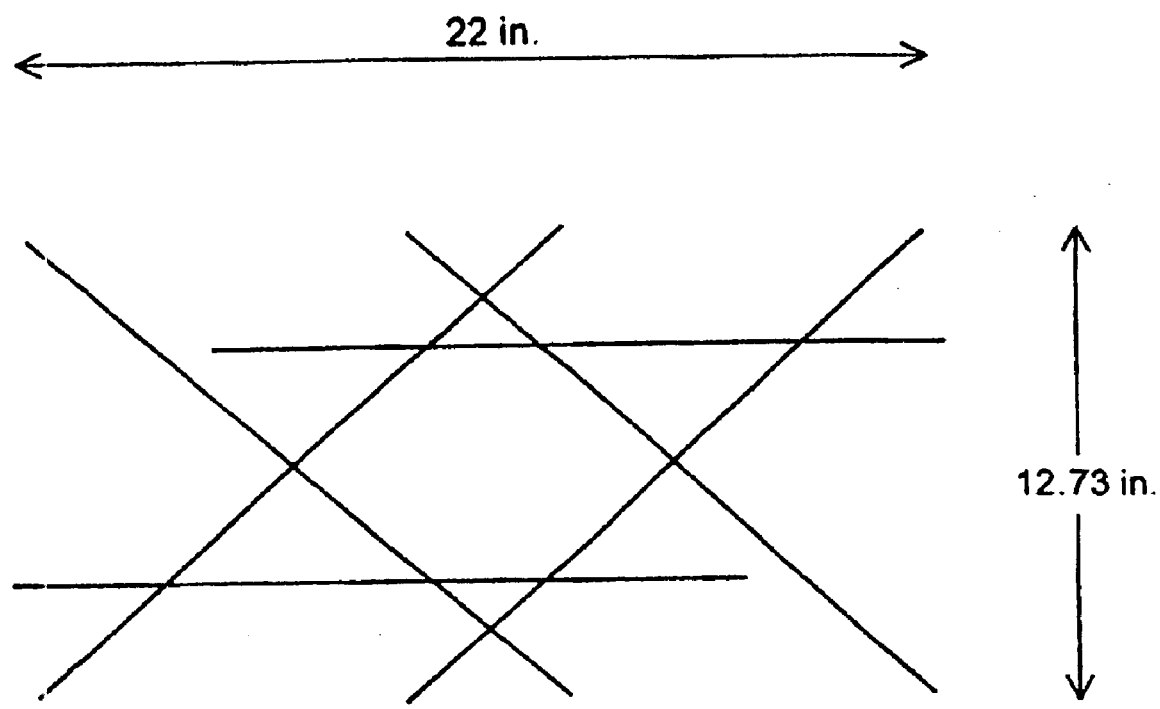
CONVEYOR SCANNER SCAN PATTERN
AT THE MIDDLE FOCAL PLANE
FIG. 3A6

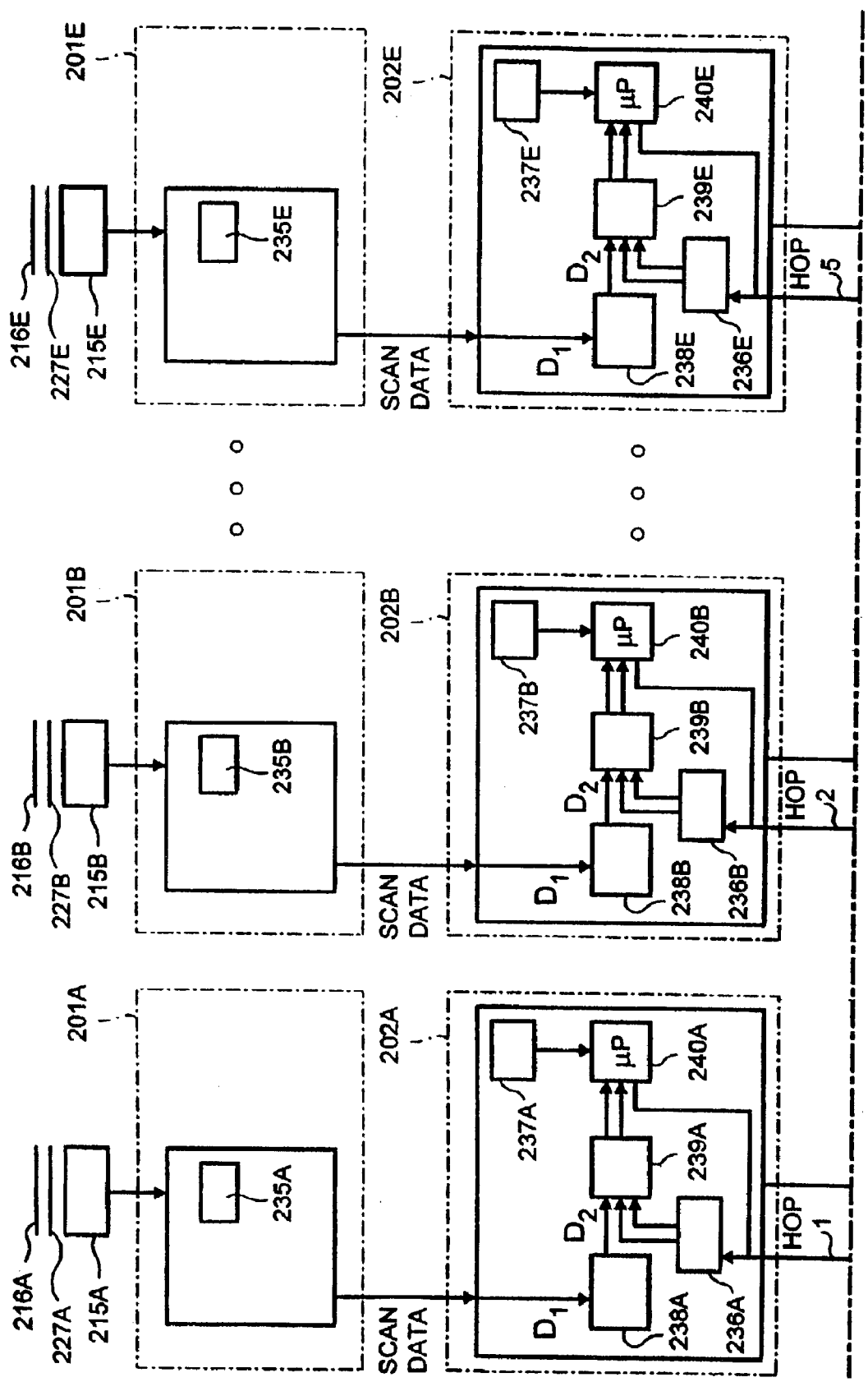
FIG. 3A7A

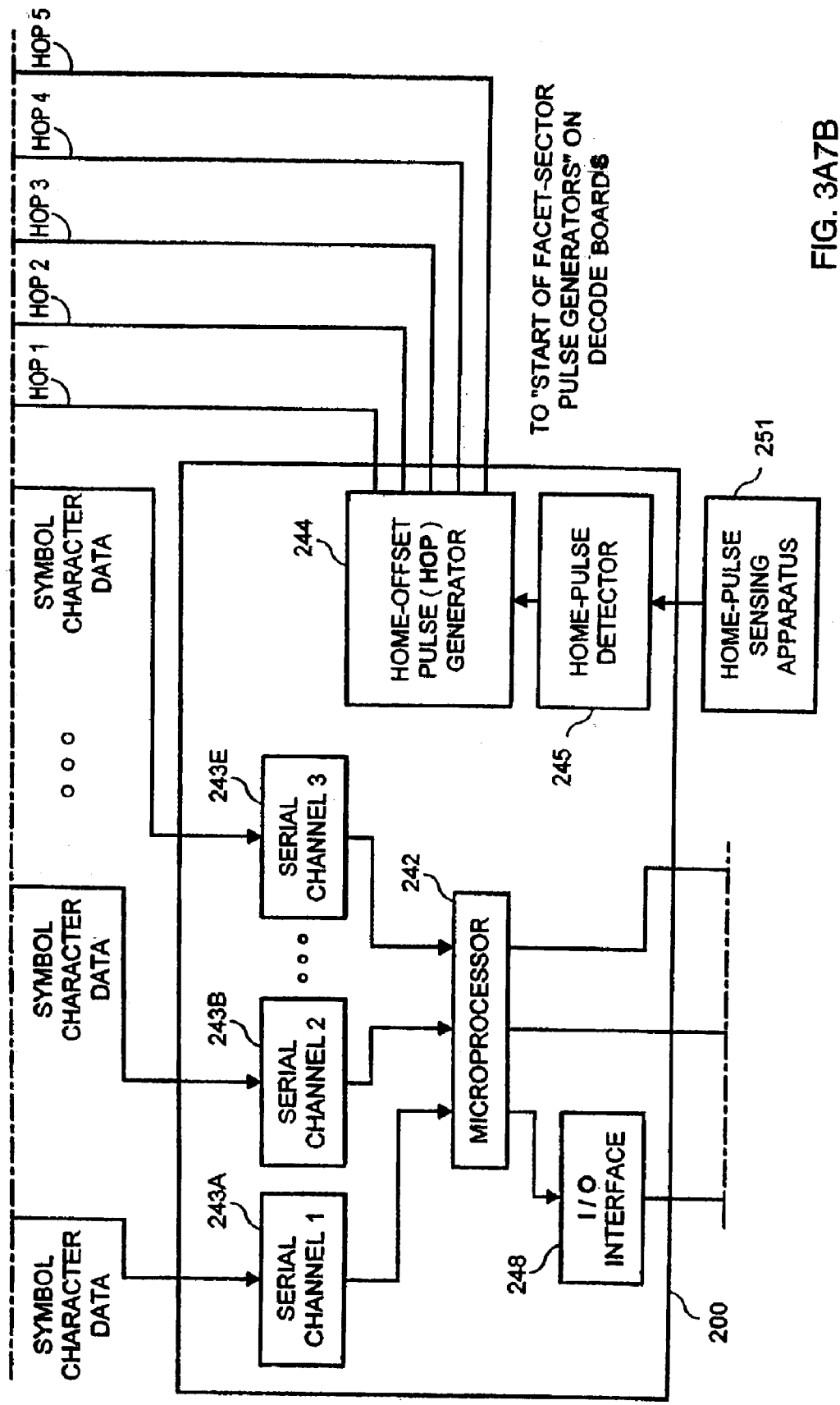
FIG. 3A7B

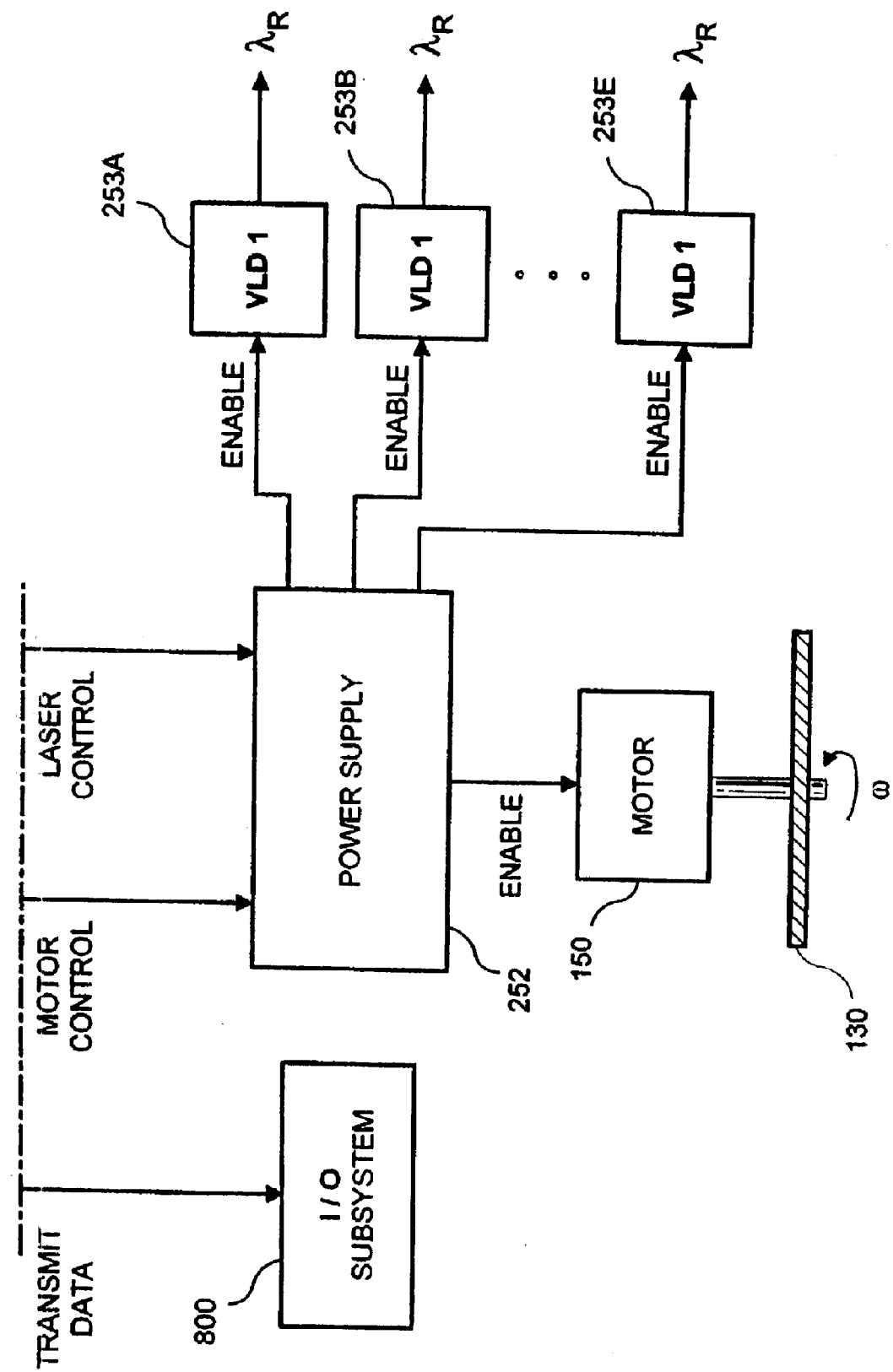
FIG. 3A7C

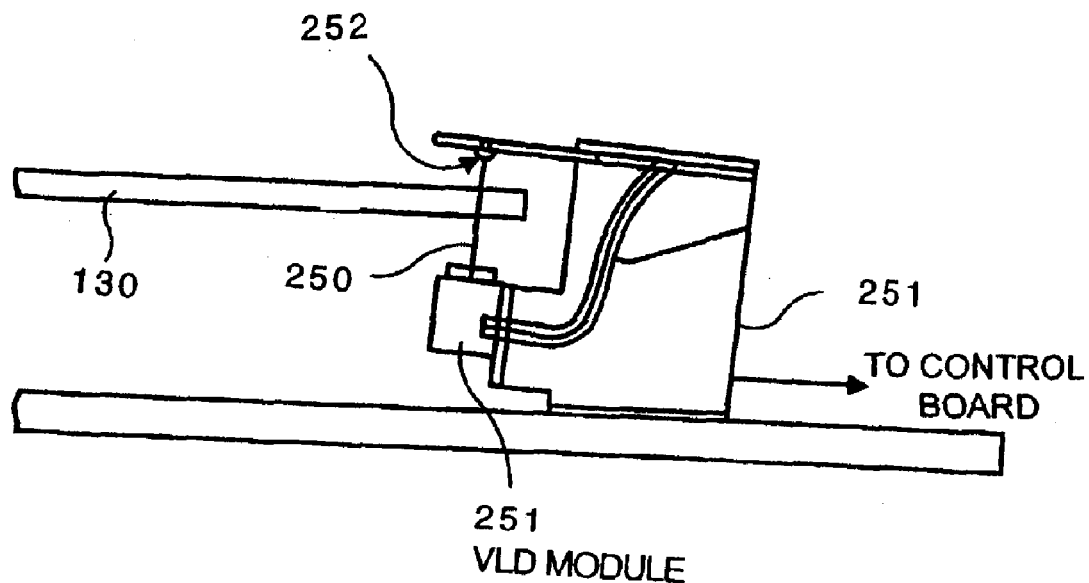
FIG. 3A8A
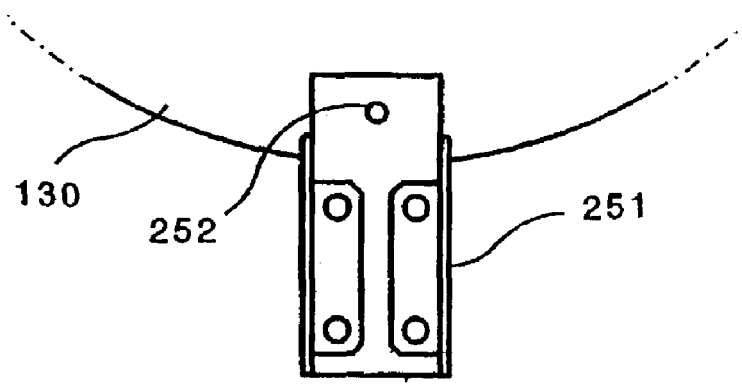
FIG. 3A8B

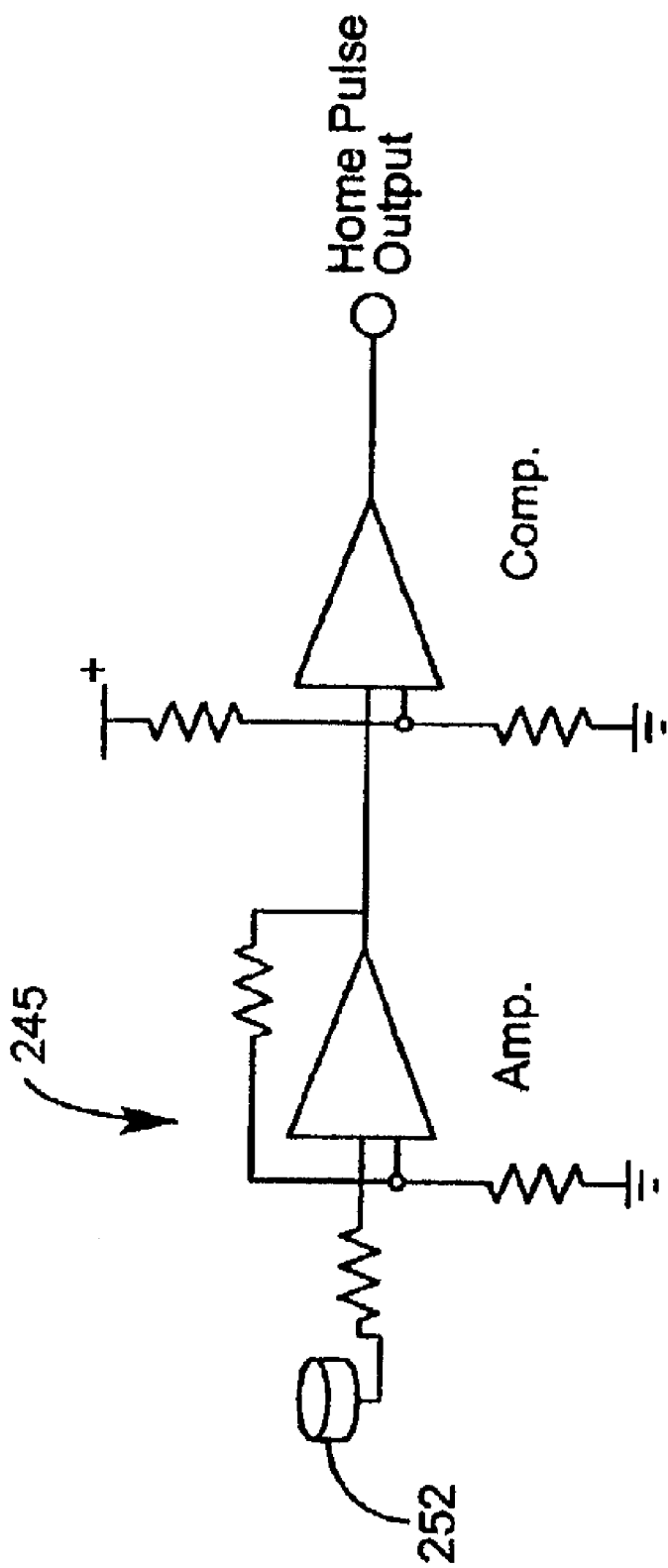
FIG. 3A8C

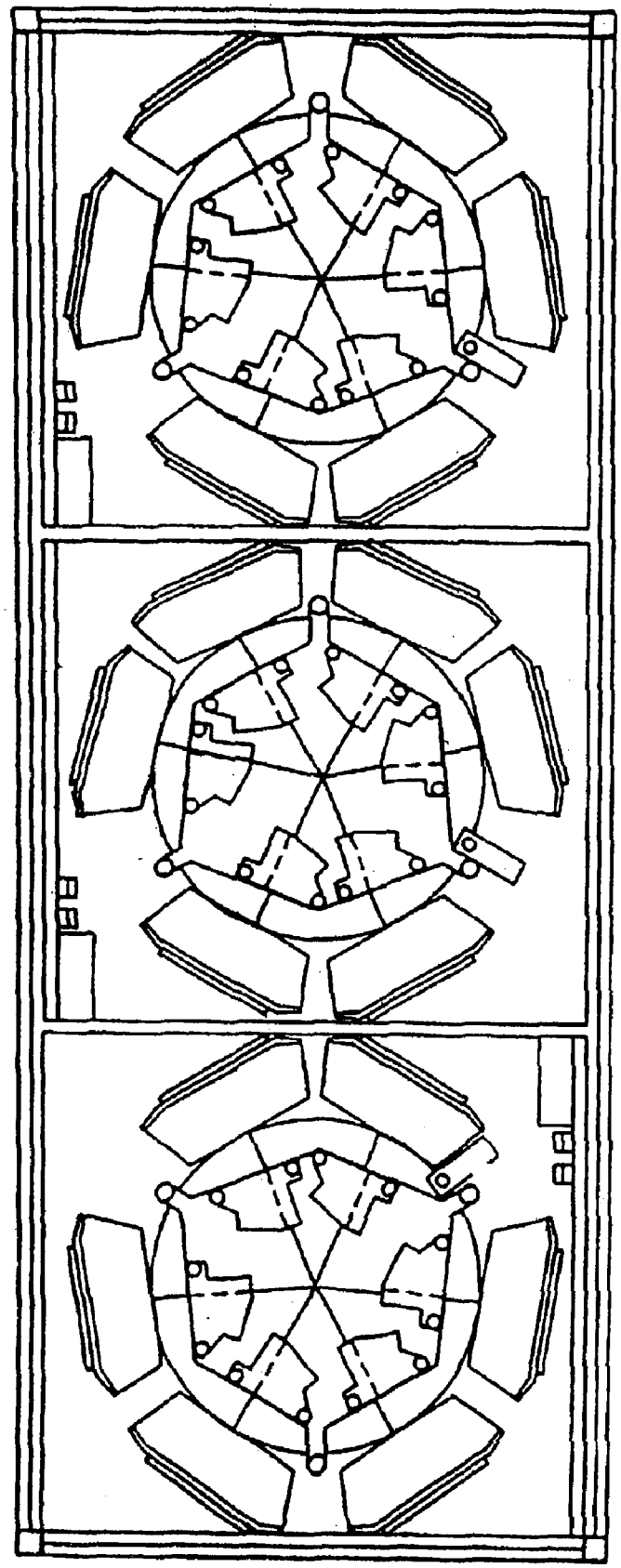
FIG. 3B1

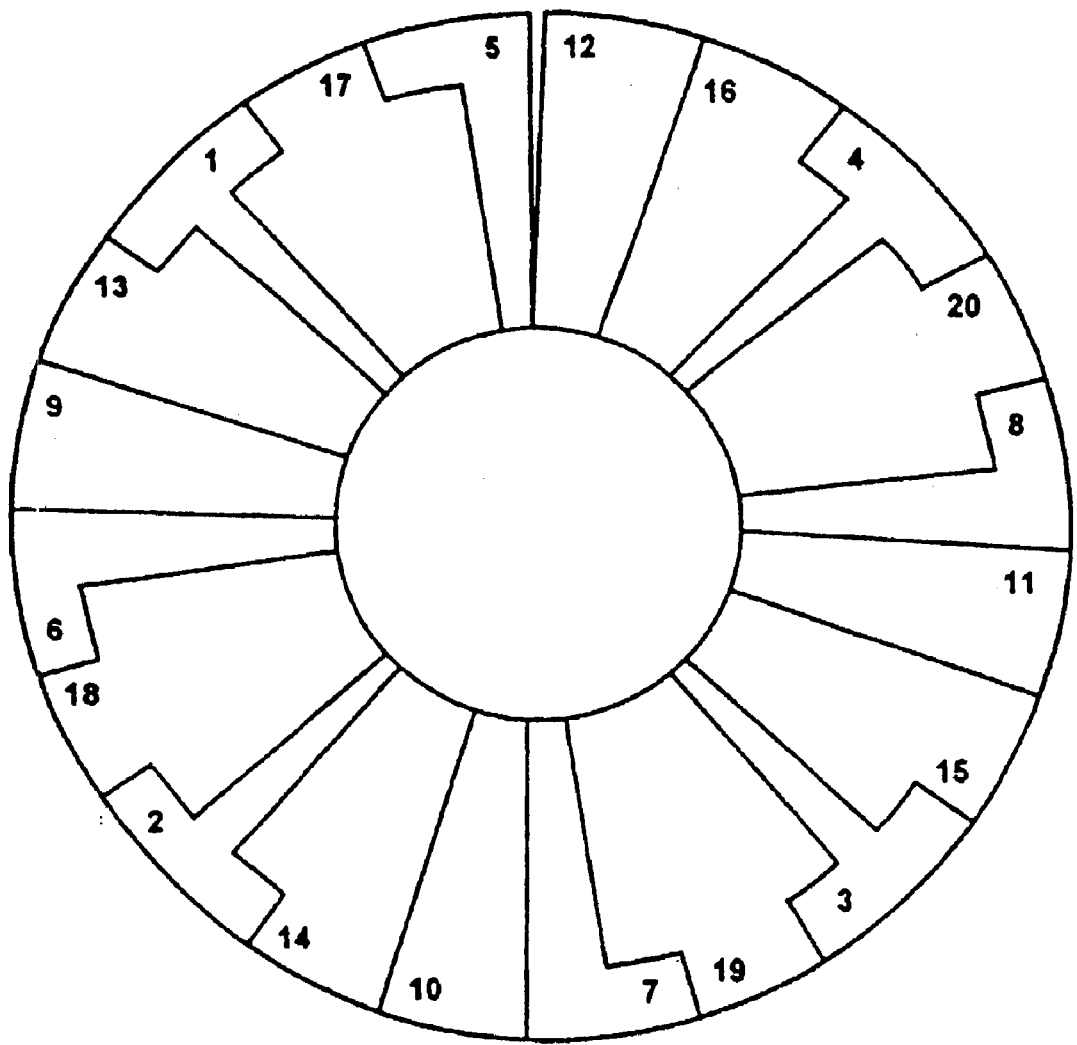
FIG. 3B2

ROTATIONAL SPEED OF DISK (RPM)
TUNNEL SCANNER 1: 4 LINES/5 FOCAL PLANES DISK

WAVELENGTH: 685NM

| FACET | DIFFRACTION FOCAL LENGTH (INCHES) | GEOMETRICAL FOCAL LENGTH (INCHES) | ANGLE A (DEGREES) | ANGLE B (DEGREES) | ANGLE OF DIFFRACTION (DEGREES) | ANGLE OF BEAM FROM VERTICAL (DEGREES) | SCAN ANGLE (DEGREES) |
|---|---|---|---|---|---|---|---|
| 1  | 39.04 | 39.11 | 45.9 | 55.30 | 34.70 | 2.70 | 26.24 |
| 2  | 39.04 | 39.11 | 45.9 | 55.30 | 34.70 | 2.70 | 26.24 |
| 3  | 39.04 | 39.11 | 45.9 | 55.30 | 34.70 | 2.70 | 26.24 |
| 4  | 39.04 | 39.11 | 45.9 | 55.30 | 34.70 | 2.70 | 26.24 |
| 5  | 45.04 | 45.14 | 45.9 | 55.54 | 34.46 | 2.46 | 22.84 |
| 6  | 45.04 | 45.14 | 45.9 | 55.54 | 34.46 | 2.46 | 22.84 |
| 7  | 45.04 | 45.14 | 45.9 | 55.54 | 34.46 | 2.46 | 22.84 |
| 8  | 45.04 | 45.14 | 45.9 | 55.54 | 34.46 | 2.46 | 22.84 |
| 9  | 51.54 | 51.69 | 45.9 | 55.73 | 34.27 | 2.27 | 20.03 |
| 10 | 51.54 | 51.69 | 45.9 | 55.73 | 34.27 | 2.27 | 20.03 |
| 11 | 51.54 | 51.69 | 45.9 | 55.73 | 34.27 | 2.27 | 20.03 |
| 12 | 51.54 | 51.69 | 45.9 | 55.73 | 34.27 | 2.27 | 20.03 |
| 13 | 58.34 | 58.56 | 45.9 | 55.89 | 34.11 | 2.11 | 17.73 |
| 14 | 58.34 | 58.56 | 45.9 | 55.89 | 34.11 | 2.11 | 17.73 |
| 15 | 58.34 | 58.56 | 45.9 | 55.89 | 34.11 | 2.11 | 17.73 |
| 16 | 58.34 | 58.56 | 45.9 | 55.89 | 34.11 | 2.11 | 17.73 |
| 17 | 64.94 | 65.24 | 45.9 | 56.02 | 33.98 | 1.98 | 15.95 |
| 18 | 64.94 | 65.24 | 45.9 | 56.02 | 33.98 | 1.98 | 15.95 |
| 19 | 64.94 | 65.24 | 45.9 | 56.02 | 33.98 | 1.98 | 15.95 |
| 20 | 64.94 | 65.24 | 45.9 | 56.02 | 33.98 | 1.98 | 15.95 |

FIG. 3B3A

| FACET | SCAN MULT. FACTOR (m) | ROTATION. ANGLE (DEGREES) | ACCOUNTING FOR DEAD TIME FOR LASER BEAM 2.59 (DEGREES) | LIGHT COLLECTION FACTOR | MAXIMUM COLLECTION AREA (IGNORING NOTCH) (SQ. IN.) | DESIGN COLLECTION AREA (INCLUDES NOTCH LOSS OF 0.15 SQ.INCHES) |
|---|---|---|---|---|---|---|
| 1 | 1.37 | 19.19 | 21.78 | 1.00 | 1.29 | 1.36 |
| 2 | 1.37 | 19.19 | 21.78 | 1.00 | 1.29 | 1.36 |
| 3 | 1.37 | 19.19 | 21.78 | 1.00 | 1.29 | 1.36 |
| 4 | 1.37 | 19.19 | 21.78 | 1.00 | 1.29 | 1.36 |
| 5 | 1.35 | 16.91 | 19.51 | 1.32 | 1.71 | 1.75 |
| 6 | 1.35 | 16.91 | 19.51 | 1.32 | 1.71 | 1.75 |
| 7 | 1.35 | 16.91 | 19.51 | 1.32 | 1.71 | 1.75 |
| 8 | 1.35 | 16.91 | 19.51 | 1.32 | 1.71 | 1.75 |
| 9 | 1.34 | 14.98 | 17.58 | 1.72 | 2.23 | 2.23 |
| 10 | 1.34 | 14.98 | 17.58 | 1.72 | 2.23 | 2.23 |
| 11 | 1.34 | 14.98 | 17.58 | 1.72 | 2.23 | 2.23 |
| 12 | 1.34 | 14.98 | 17.58 | 1.72 | 2.23 | 2.23 |
| 13 | 1.33 | 13.38 | 15.97 | 2.19 | 2.84 | 2.81 |
| 14 | 1.33 | 13.38 | 15.97 | 2.19 | 2.84 | 2.81 |
| 15 | 1.33 | 13.38 | 15.97 | 2.19 | 2.84 | 2.81 |
| 16 | 1.33 | 13.38 | 15.97 | 2.19 | 2.84 | 2.81 |
| 17 | 1.32 | 12.12 | 14.71 | 2.71 | 3.51 | 3.43 |
| 18 | 1.32 | 12.12 | 14.71 | 2.71 | 3.51 | 3.43 |
| 19 | 1.32 | 12.12 | 14.71 | 2.71 | 3.51 | 3.43 |
| 20 | 1.32 | 12.12 | 14.71 | 2.71 | 3.51 | 3.43 |

FIG. 3B3B

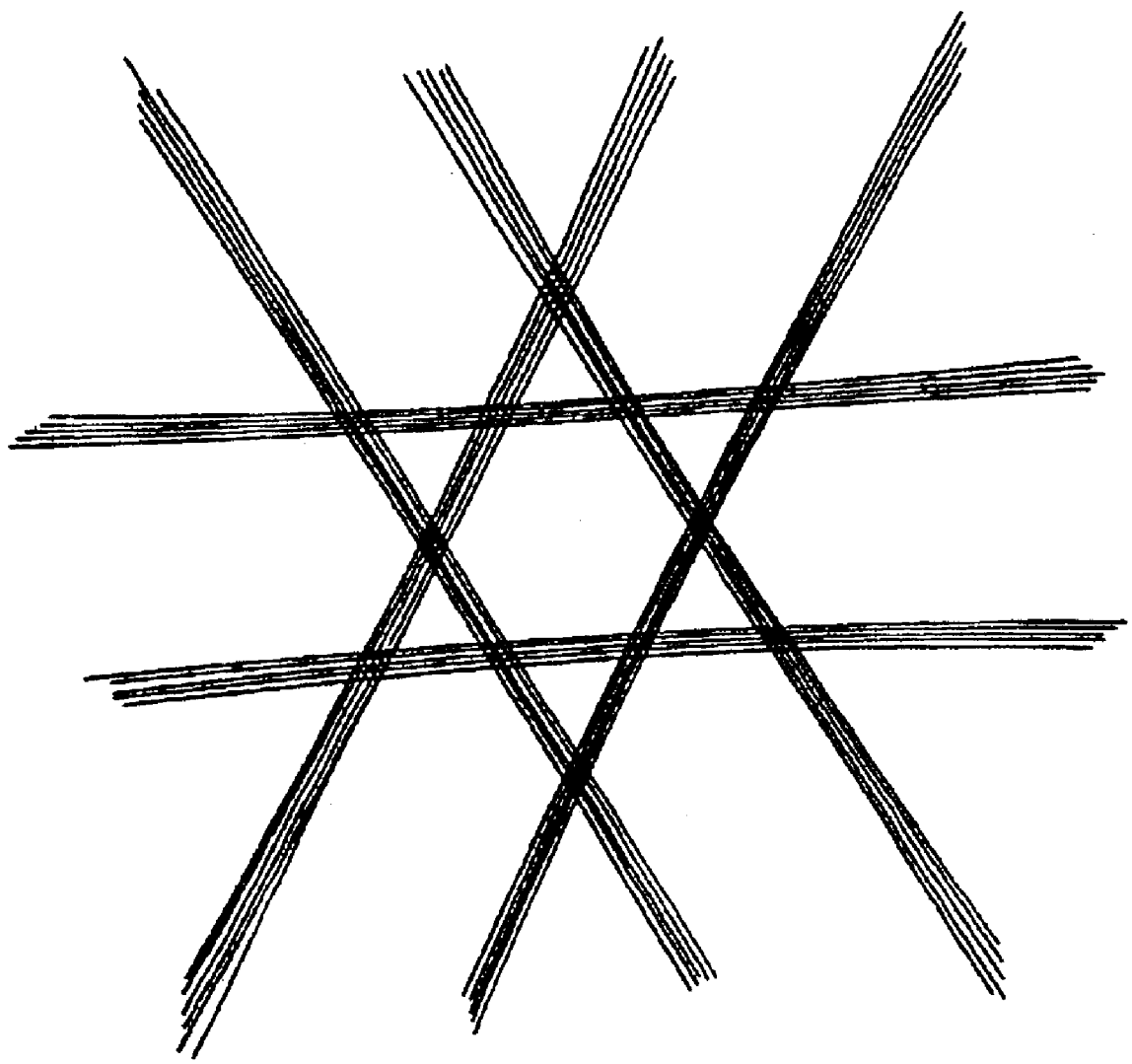
FIG. 3B4

Mirror angles for the 60 degrees

The angle delta is the angular spacing between the mirror and its following neighbour mirror

| Mirror | Angular location of folding mirrors (degrees) | delta | Angular rotation of folding mirrors (degrees) | |
|---|---|---|---|---|
| 1 | 25.61 | 64.39 | 2.28 | CCW |
| 2 | 90.00 | 64.39 | 0.00 | CW |
| 3 | 154.39 | 51.23 | 2.28 | CW |
| 4 | 205.61 | 64.39 | 2.28 | CCW |
| 5 | 270.00 | 64.39 | 0.00 | CW |
| 6 | 334.39 | 51.23 | 2.28 | CW |

FIG. 3B5

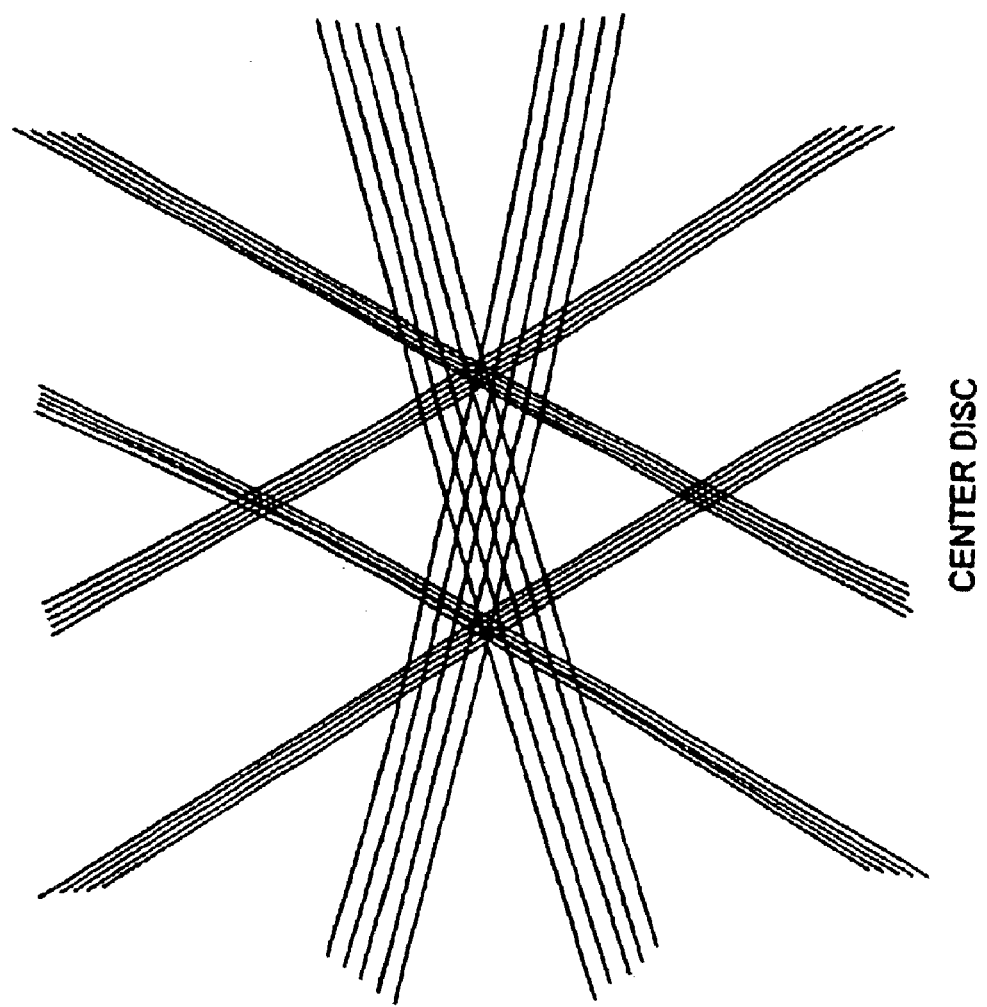
FIG. 3B6 CENTER DISC

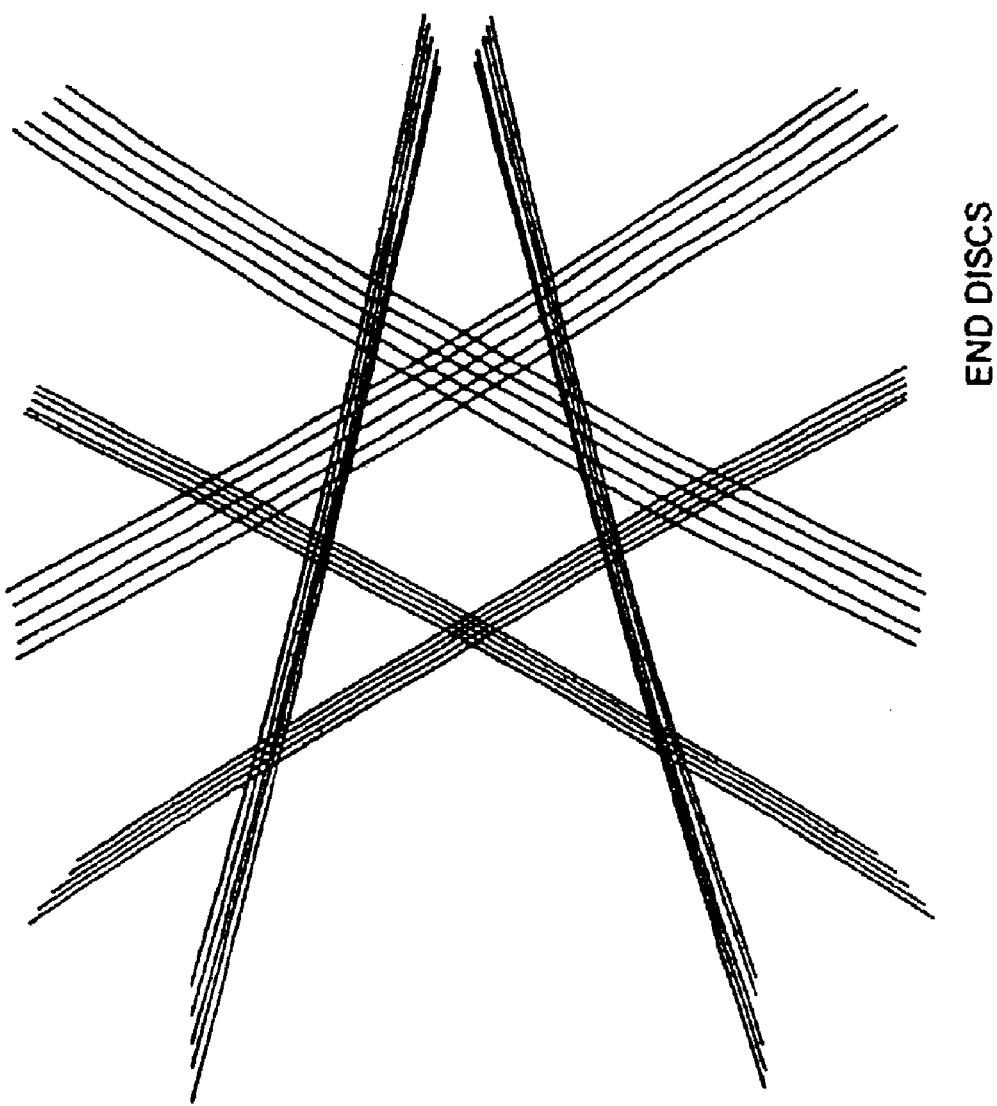
FIG. 3B7  END DISCS

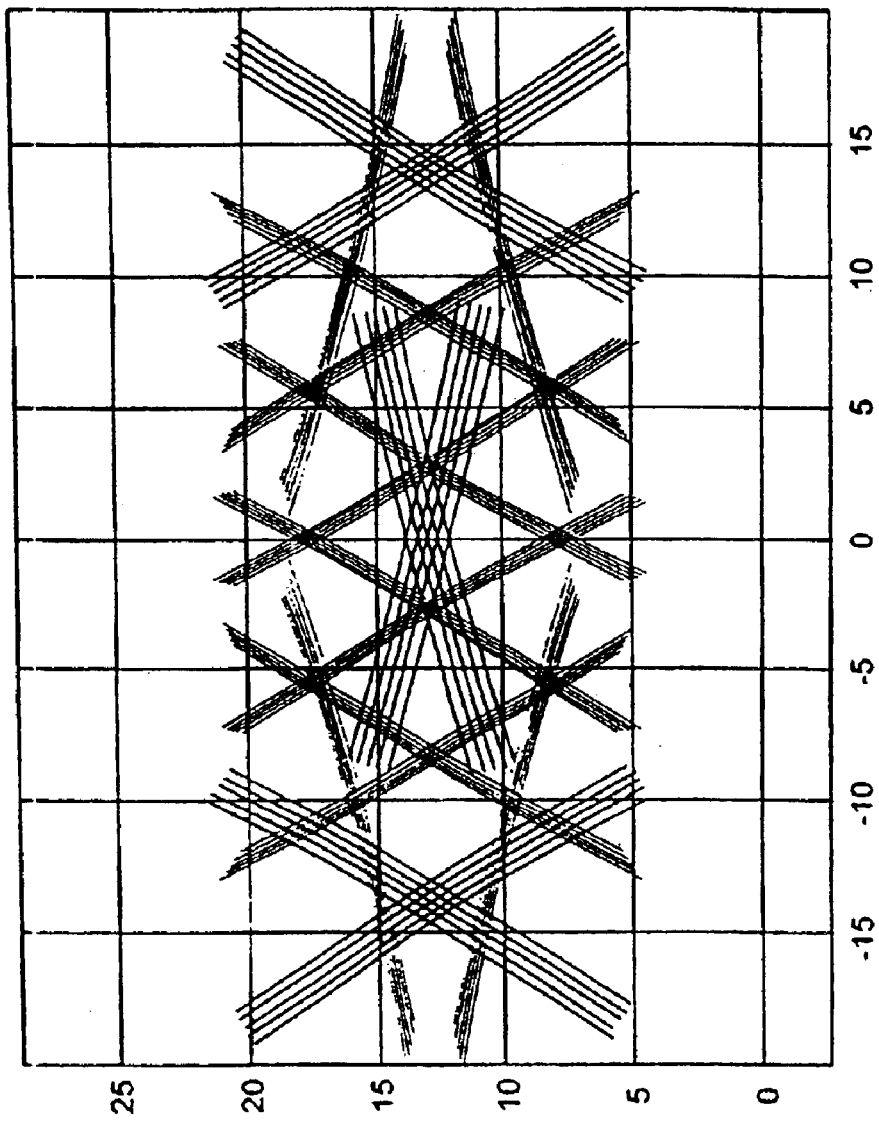
FIG. 3B8

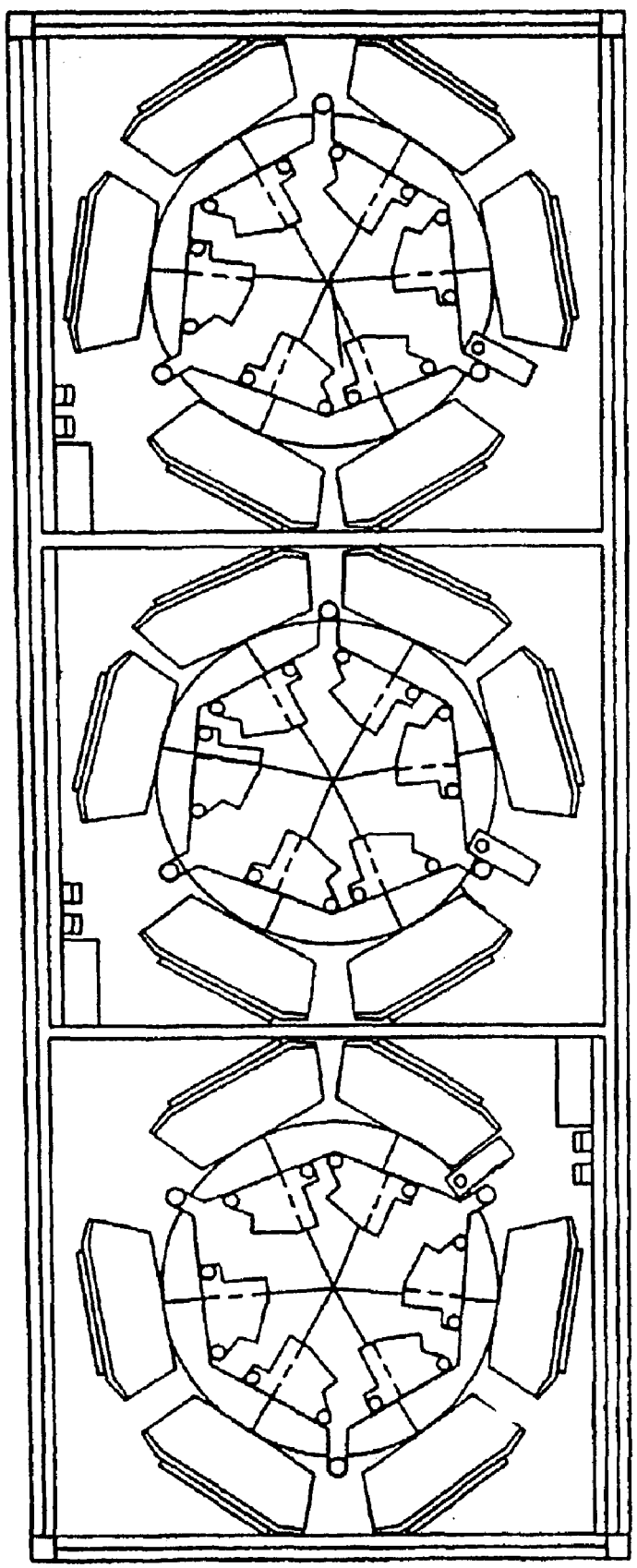
FIG. 3C1
SCANNERS:
- FRONT
- BACK

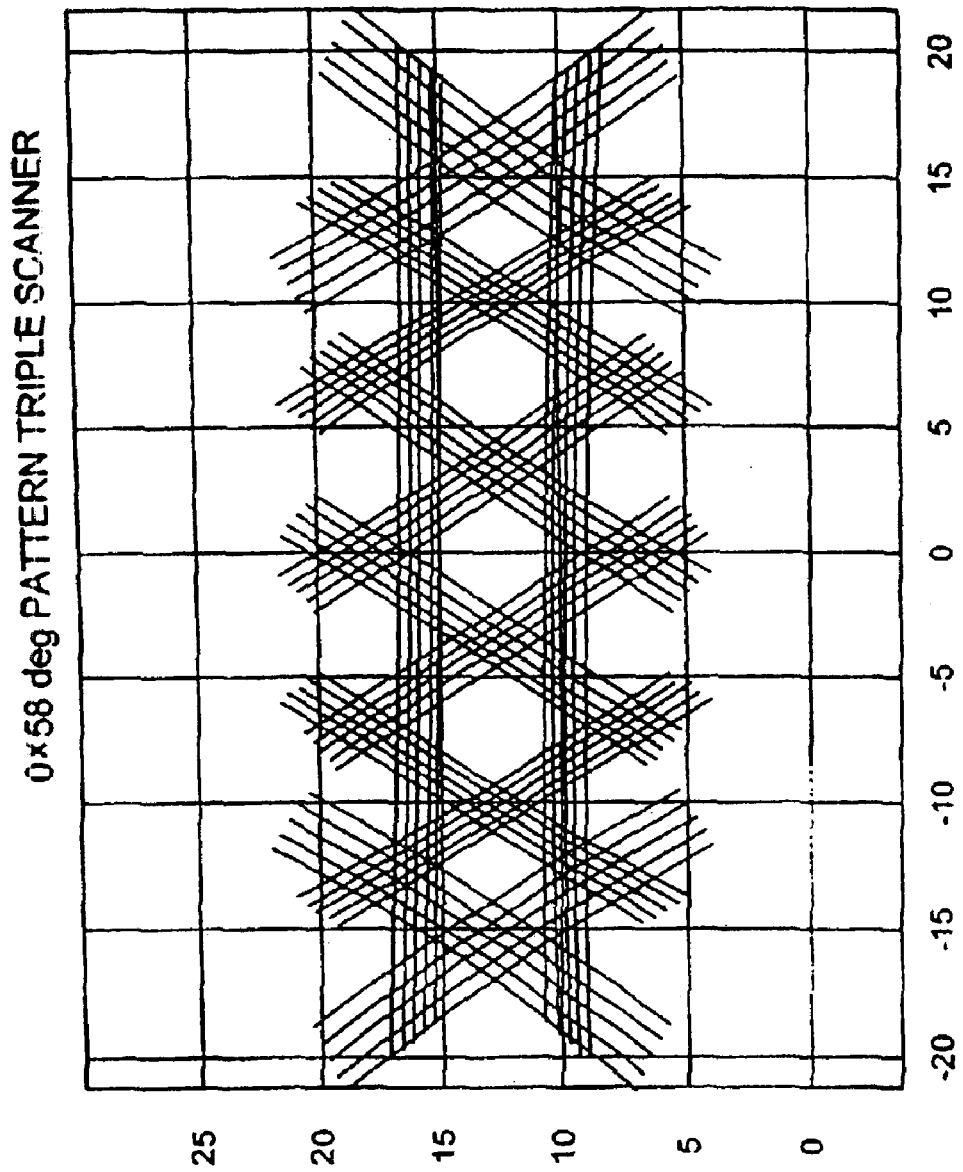
FIG. 3C2

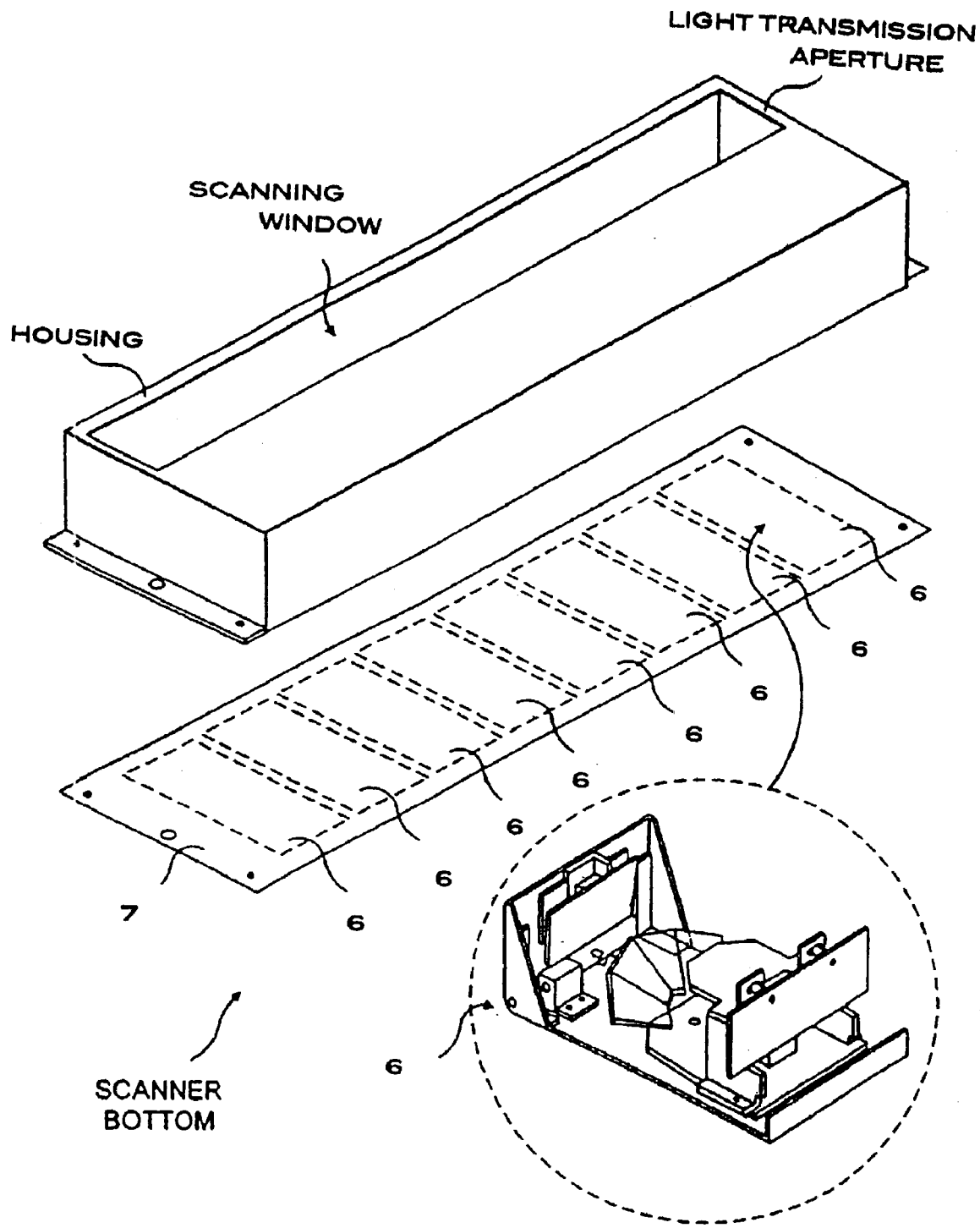
FIG. 3D1

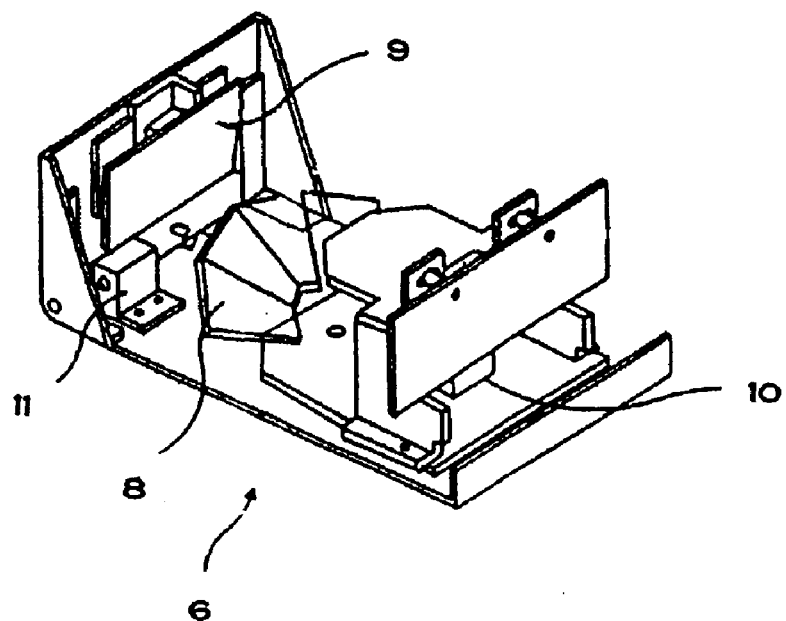
FIG. 3D2
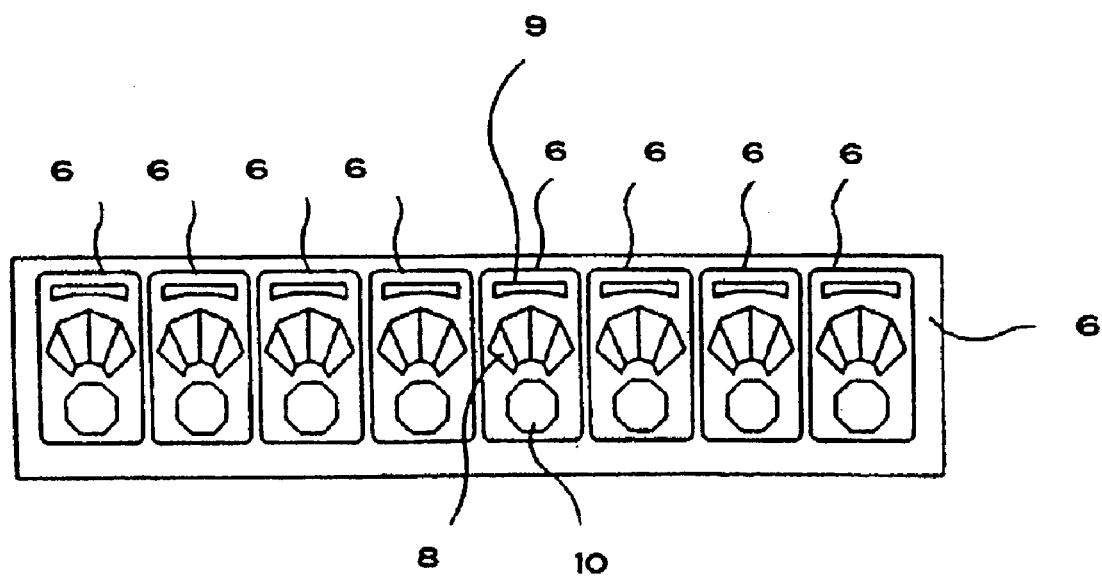
FIG. 3D3

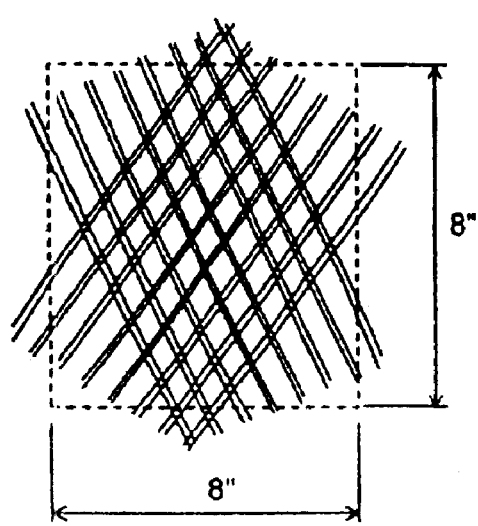 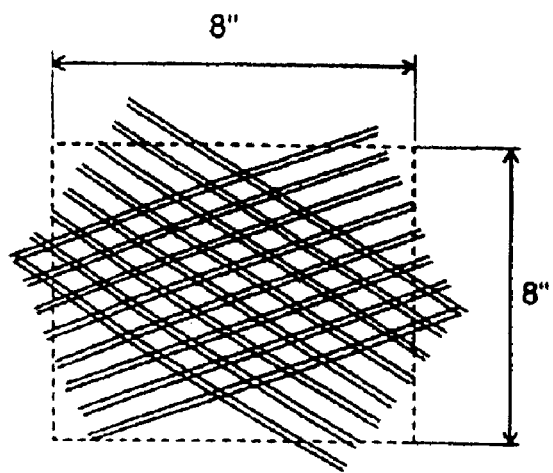
FIG. 3D4  FIG. 3D5
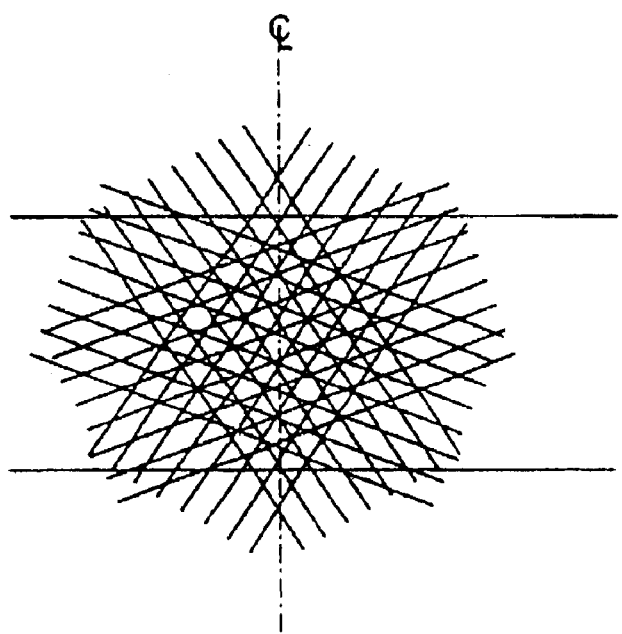
FIG. 3D6

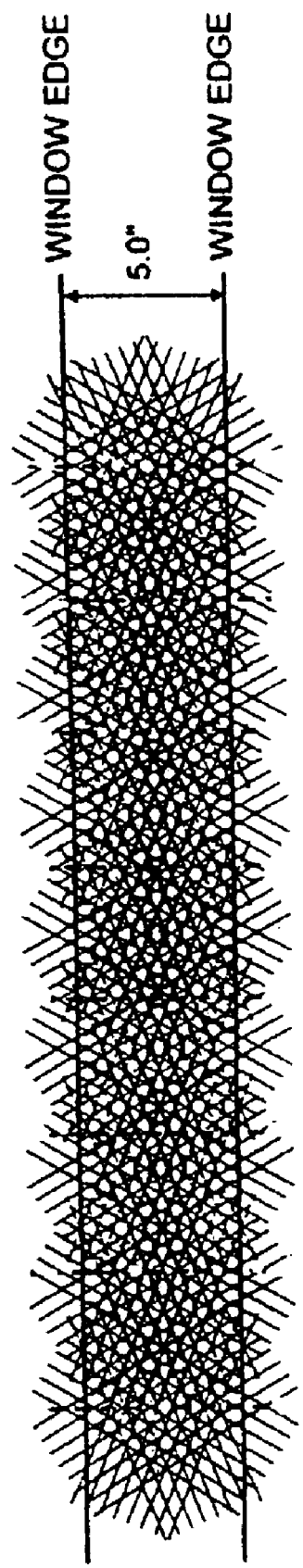
FIG. 3D7

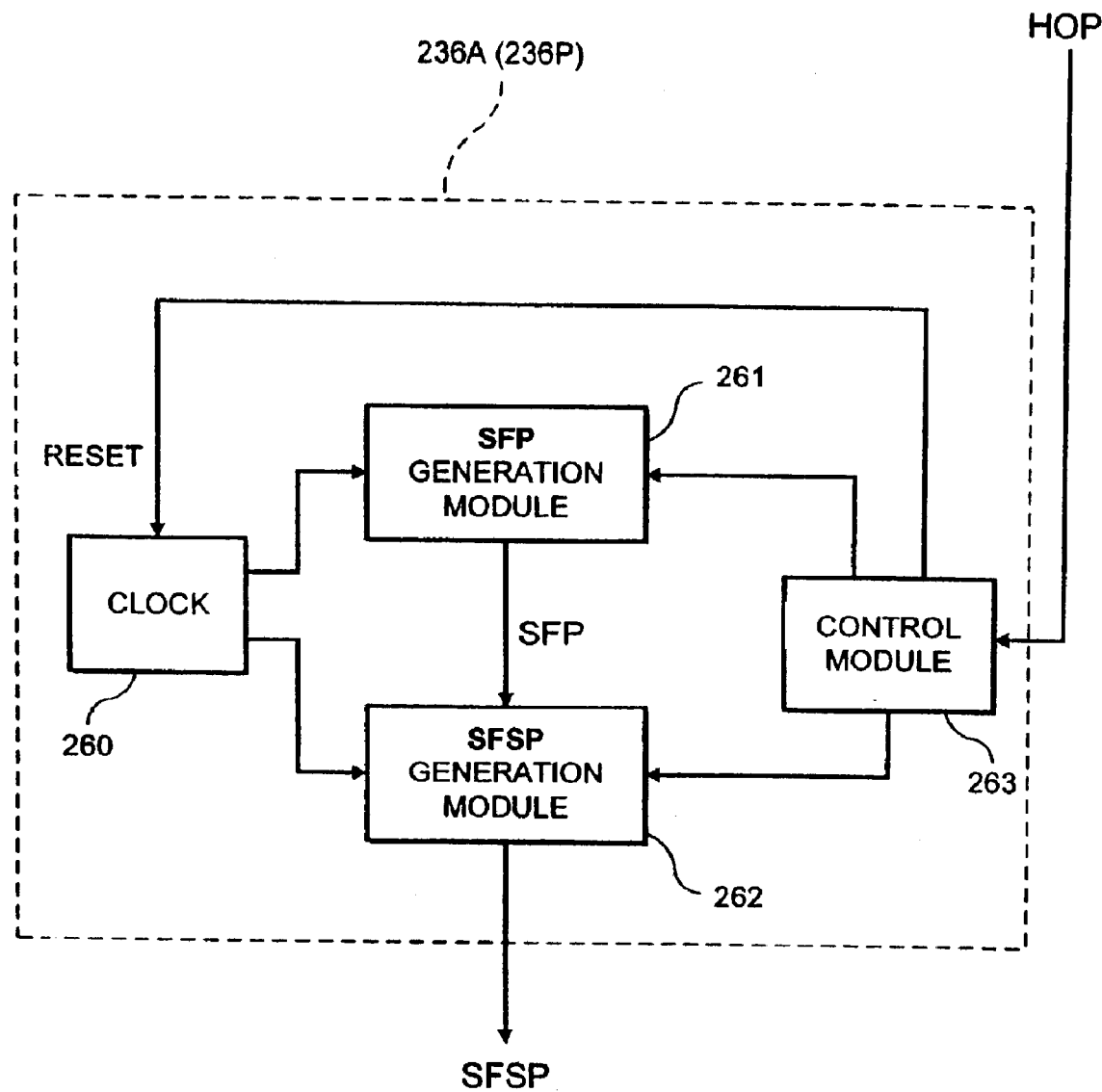
F I G. 10A

DATA TABLE EMBODIED IN SFP GENERATOR ON DECODE PROCESSOR BOARD

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE |
|---|---|---|
| 12 | 7 | SF12P |
| 16 | 146 | SF16P |
| 4 | 271 | SF4P |
| 20 | 446 | SF20P |
| 8 | 561 | SF8P |
| 11 | 716 | SF11P |
| 15 | 855 | SF15P |
| 3 | 980 | SF3P |
| 19 | 1155 | SF19P |
| 7 | 1270 | SF7P |
| 10 | 1425 | SF10P |
| 14 | 1564 | SF14P |
| 2 | 1689 | SF2P |
| 18 | 1864 | SF18P |
| 6 | 1979 | SF6P |
| 9 | 2134 | SF9P |
| 13 | 2273 | SF13P |
| 1 | 2398 | SF1P |
| 17 | 2573 | SF17P |
| 5 | 2688 | SF5P |

W = 5200 RPM

CLOCK PULSE WIDTH = 4 μSEC

FIG. 10B

| SCANNING FACET NO. | SFSP TRIGGERING EVENT | PULSE EVENT FROM SFSP MODULE |
|---|---|---|
| 12 | RULES 1 - 4 IN FIGS. | SFS 12/1P |
| | | SFS 12/2P |
| | | SFS 12/3P |
| | | SFS 12/4P |
| 16 | RULES 1-4 IN FIGS. | SFS 16/1P |
| | | SFS 16/2P |
| | | SFS 16/3P |
| | | SFS 16/4P |
| 4 | RULES 1-4 IN FIGS. | SFS 4/1P |
| | | SFS 4/2P |
| | | SFS 4/3P |
| | | SFS 4/4P |
| 20 | RULES 1-4 IN FIGS. | SFS 20/1P |
| | | SFS 20/2P |
| | | SFS 20/3P |
| | | SFS 20/4P |
| 8 | RULES 1-4 IN FIGS. | SFS 8/1P |
| | | SFS 8/2P |
| | | SFS 8/3P |
| | | SFS 8/4P |
| 11 | RULES 1-4 IN FIGS. | SFS 11/1P |
| | | SFS 11/2P |
| | | SFS 11/3P |
| | | SFS 11/4P |
| ○○○ | | |
| 17 | RULES 1-4 IN FIGS. | SFS 17/1P |
| | | SFS 17/2P |
| | | SFS 17/3P |
| | | SFS 17/4P |
| 5 | RULES 1-4 IN FIGS. | SFS 5/1P |
| | | SFS 5/2P |
| | | SFS 5/3P |
| | | SFS 5/4P |

FIG. 10D

RULE 1: FOR GENERATING SFSX/1P TYPE PULSES

FOR EACH FACET X BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/1P TYPE PULSES WHEN THE COUNT IS EQUAL TO:

$$\text{COUNT (SFXP)}$$

---

RULE 2: FOR GENERATING SFSX/2P TYPE PULSES

FOR EACH FACET X, BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/2P TYPE PULSES WHEN THE COUNT IS EQUAL TO:

$$\text{COUNT (SFXP)} + 1\left[\frac{\text{COUNT (SFX+1P)} - \text{COUNT (SFXP)}}{4}\right]$$

FIG. 10E1

RULE 3: FOR GENERATING SFSX/3P TYPE PULSES

FOR EACH FACET X BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/3 TYPE PULSES WHEN THE COUNT IS EQUAL TO:

$$\text{COUNT (SFXP)} + 2\left[\frac{\text{COUNT (SFX+1P)} - \text{COUNT (SFXP)}}{4}\right]$$

RULE 4: FOR GENERATING SFSX/4P TYPE PULSES

FOR EACH FACET X, BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/4 TYPE PULSES WHEN THE COUNT IS EQUAL TO:

$$\text{COUNT (SFXP)} + 3\left[\frac{\text{COUNT (SFX+1P)} - \text{COUNT (SFXP)}}{4}\right]$$

FIG. 10E2

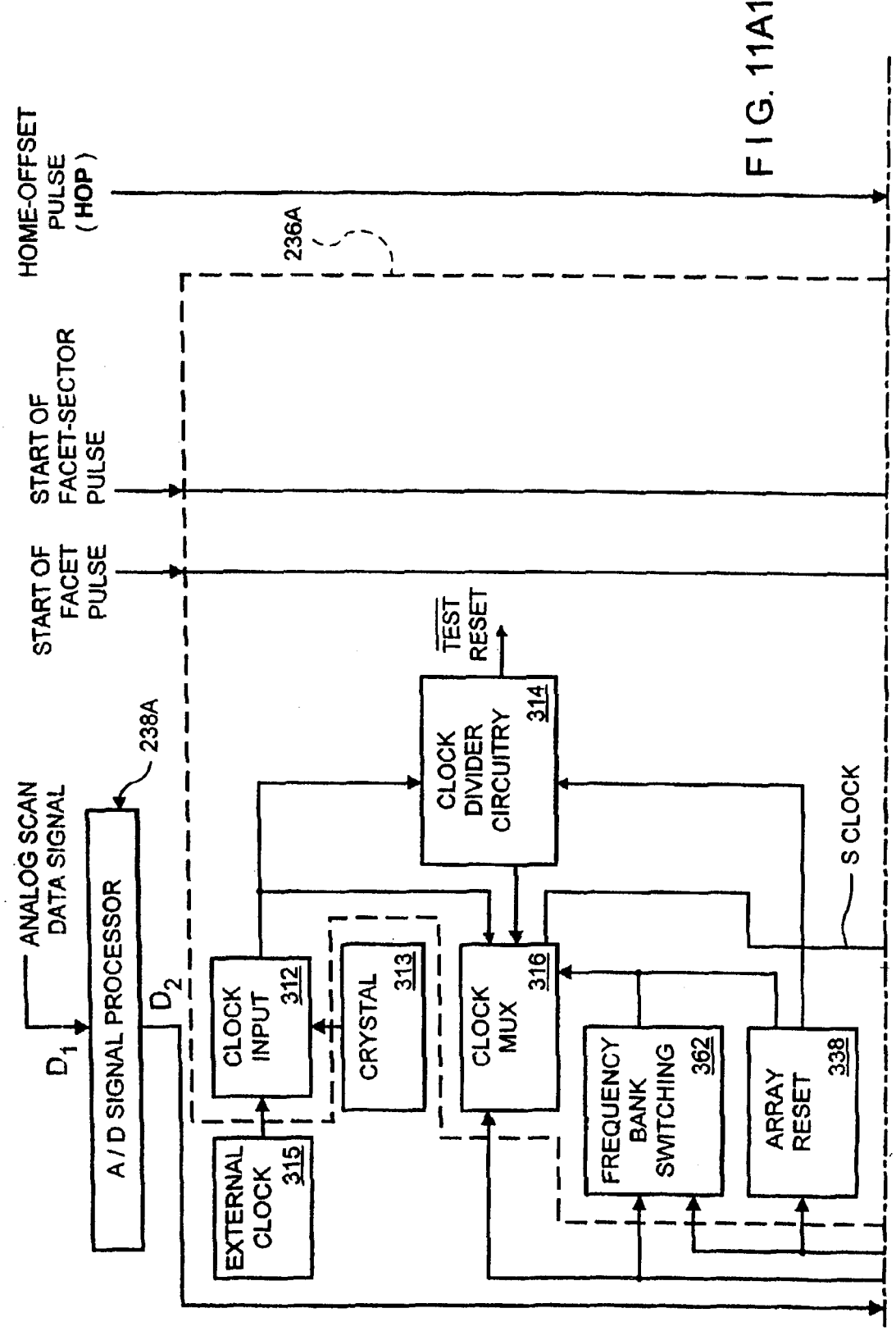
FIG. 11A1

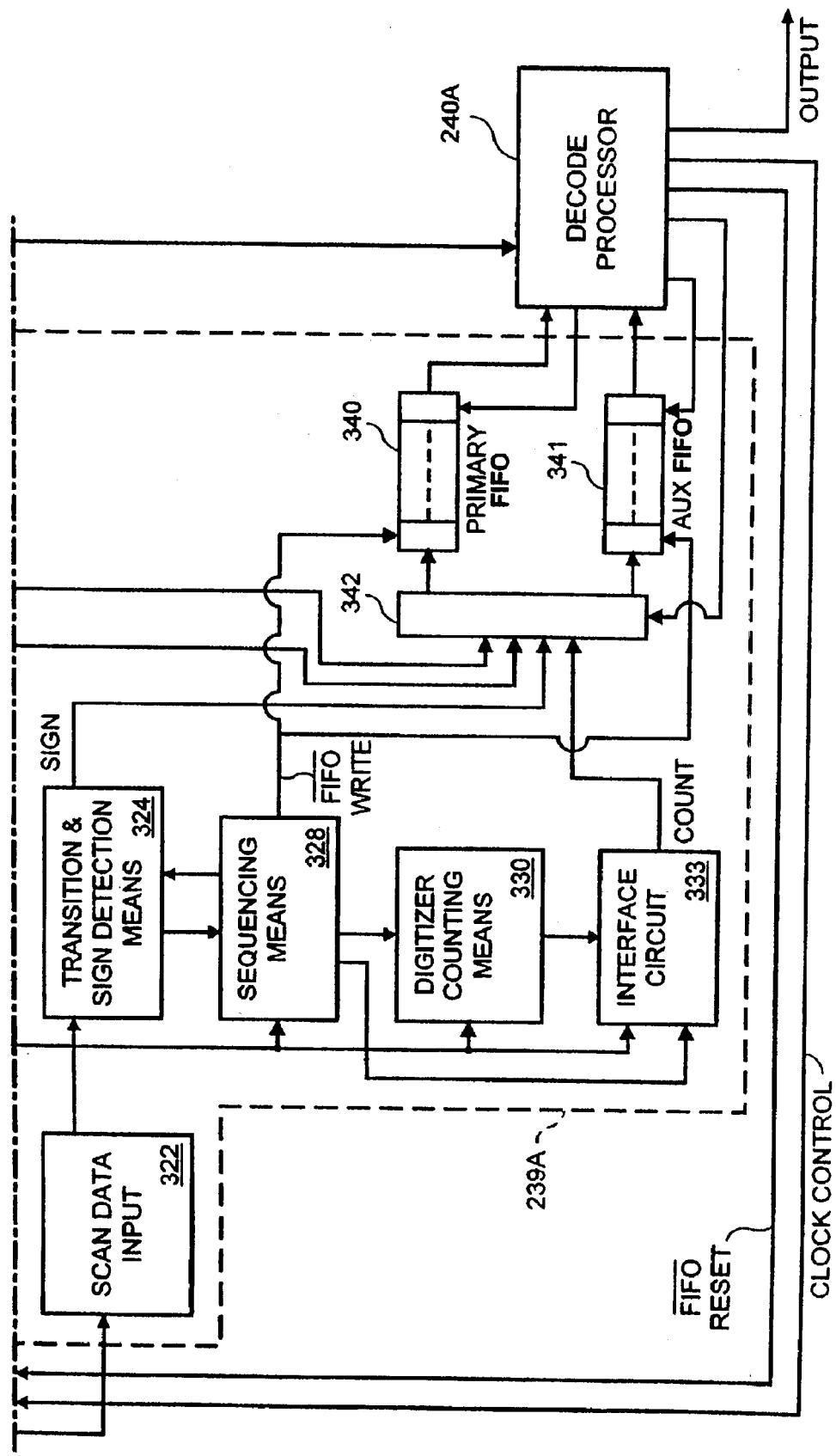
FIG. 11A2

| SCANNER NO. | TOTAL NO OF FACETS ON DISC |
|---|---|
| NO. OF SECTORS / FACET | SCANNING STATION NO. |

F I G. 11C1

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE | TABLES EMBODIED IN DECODE PROCESSOR |
|---|---|---|---|
| 12 | 7 | SF12P | |
| 16 | 146 | SF16P | |
| 4 | 271 | SF4P | |
| 20 | 446 | SF20P | |
| 8 | 561 | SF8P | |
| 11 | 716 | SF11P | |
| 15 | 855 | SF15P | W= 5200 RPM |
| 3 | 980 | SF3P | |
| 19 | 1155 | SF19P | CLOCK PULSE WIDTH = 4.0 μSEC |
| 7 | 1270 | SF7P | |
| 10 | 1425 | SF10P | |
| 14 | 1564 | SF14P | |
| 2 | 1689 | SF2P | |
| 18 | 1864 | SF18P | |
| 6 | 1979 | SF6P | |
| 9 | 2134 | SF9P | |
| 13 | 2273 | SF13P | |
| 1 | 2398 | SF1P | |
| 17 | 2573 | SF17P | |
| 5 | 2688 | SF5P | |

F I G. 11C2

TABLE EMBODIED IN DECODE PROCESSOR

| SCANNING FACET NO. | SFSP TRIGGERING EVENT | PULSE EVENT FROM SFSP MODULE | MINIMUM AND MAXIMUM FACET ANGLES CORRESPONDING TO FACET-SECTOR IDENTIFIED BY SFSP EVENT |
|---|---|---|---|
| 12 | RULES 1 - 4 IN FIGS. | SFS 12/1P | |
| | | SFS 12/2P | |
| | | SFS 12/3P | |
| | | SFS 12/4P | |
| 16 | RULES 1-4 IN FIGS. | SFS 16/1P | |
| | | SFS 16/2P | |
| | | SFS 16/3P | |
| | | SFS 16/4P | |
| 4 | RULES 1-4 IN FIGS. | SFS 4/1P | |
| | | SFS 4/2P | |
| | | SFS 4/3P | |
| | | SFS 4/4P | |
| 20 | RULES 1-4 IN FIGS. | SFS 20/1P | |
| | | SFS 20/2P | |
| | | SFS 20/3P | |
| | | SFS 20/4P | |
| 8 | RULES 1-4 IN FIGS. | SFS 8/1P | |
| | | SFS 8/2P | |
| | | SFS 8/3P | |
| | | SFS 8/4P | |
| 11 | RULES 1-4 IN FIGS. | SFS 11/1P | |
| | | SFS 11/2P | |
| | | SFS 11/3P | |
| | | SFS 11/4P | |
| ⋮ | ⋮ | ⋮ | ⋮ |
| 17 | RULES 1-4 IN FIGS. | SFS 17/1P | |
| | | SFS 17/2P | |
| | | SFS 17/3P | |
| | | SFS 17/4P | |
| 5 | RULES 1-4 IN FIGS. | SFS 5/1P | |
| | | SFS 5/2P | |
| | | SFS 5/3P | |
| | | SFS 5/4P | |

FIG. 11D

| SCANNING FACET NO. | SFSP TRIGGERING EVENTS | PULSE EVENT FROM SFSP MODULE |
|---|---|---|
| 12 | DETECTION OF 1$^{ST}$, 2$^{ND}$, 3$^{RD}$ AND 4$^{TH}$ SFS PULSE AFTER DETECTION OF HOME PULSE (HOP) | SFS 12/1P |
|  |  | SFS 12/2P |
|  |  | SFS 12/3P |
|  |  | SFS 12/4P |
| 16 | DETECTION OF 5$^{TH}$, 6$^{TH}$, 7$^{TH}$ AND 8$^{TH}$ SFS PULSE AFTER DETECTION OF HOP | SFS 16/1P |
|  |  | SFS 16/2P |
|  |  | SFS 16/3P |
|  |  | SFS 16/4P |
| 4 | DETECTION OF 9$^{TH}$, 10$^{TH}$, 11$^{TH}$ AND 12$^{TH}$ SFSP AFTER DETECTION OF HOP | SFS 4/1P |
|  |  | SFS 4/2P |
|  |  | SFS 4/3P |
|  |  | SFS 4/4P |
| 20 | DETECTION OF 13$^{TH}$, 14$^{TH}$, 15$^{TH}$ AND 16$^{TH}$ SFSP AFTER DETECTION OF HOP | SFS 20/1P |
|  |  | SFS 20/2P |
|  |  | SFS 20/3P |
|  |  | SFS 20/4P |
| 8 | DETECTION OF 17$^{TH}$, 18$^{TH}$, 19$^{TH}$ AND 20$^{TH}$ SFSP AFTER DETECTION OF HOP | SFS 8/1P |
|  |  | SFS 8/2P |
|  |  | SFS 8/3P |
|  |  | SFS 8/4P |
| 11 | DETECTION OF 21$^{ST}$, 22$^{ND}$, 23$^{RD}$ AND 24$^{TH}$ SFSP AFTER DETECTION OF HOP | SFS 11/1P |
|  |  | SFS 11/2P |
|  |  | SFS 11/3P |
|  |  | SFS 11/4P |
| ⋮ | ⋮ | ⋮ |
| 17 | DETECTION OF 73$^{RD}$, 74$^{TH}$, 75$^{TH}$ AND 76$^{TH}$ SFSP AFTER DETECTION OF HOP | SFS 17/1P |
|  |  | SFS 17/2P |
|  |  | SFS 17/3P |
|  |  | SFS 17/4P |
| 5 | DETECTION OF 77$^{TH}$, 78$^{TH}$, 79$^{TH}$ AND 80$^{TH}$ SFSP AFTER DETECTION OF HOP | SFS 5/1P |
|  |  | SFS 5/2P |
|  |  | SFS 5/3P |
|  |  | SFS 5/4P |

FIG. 13B

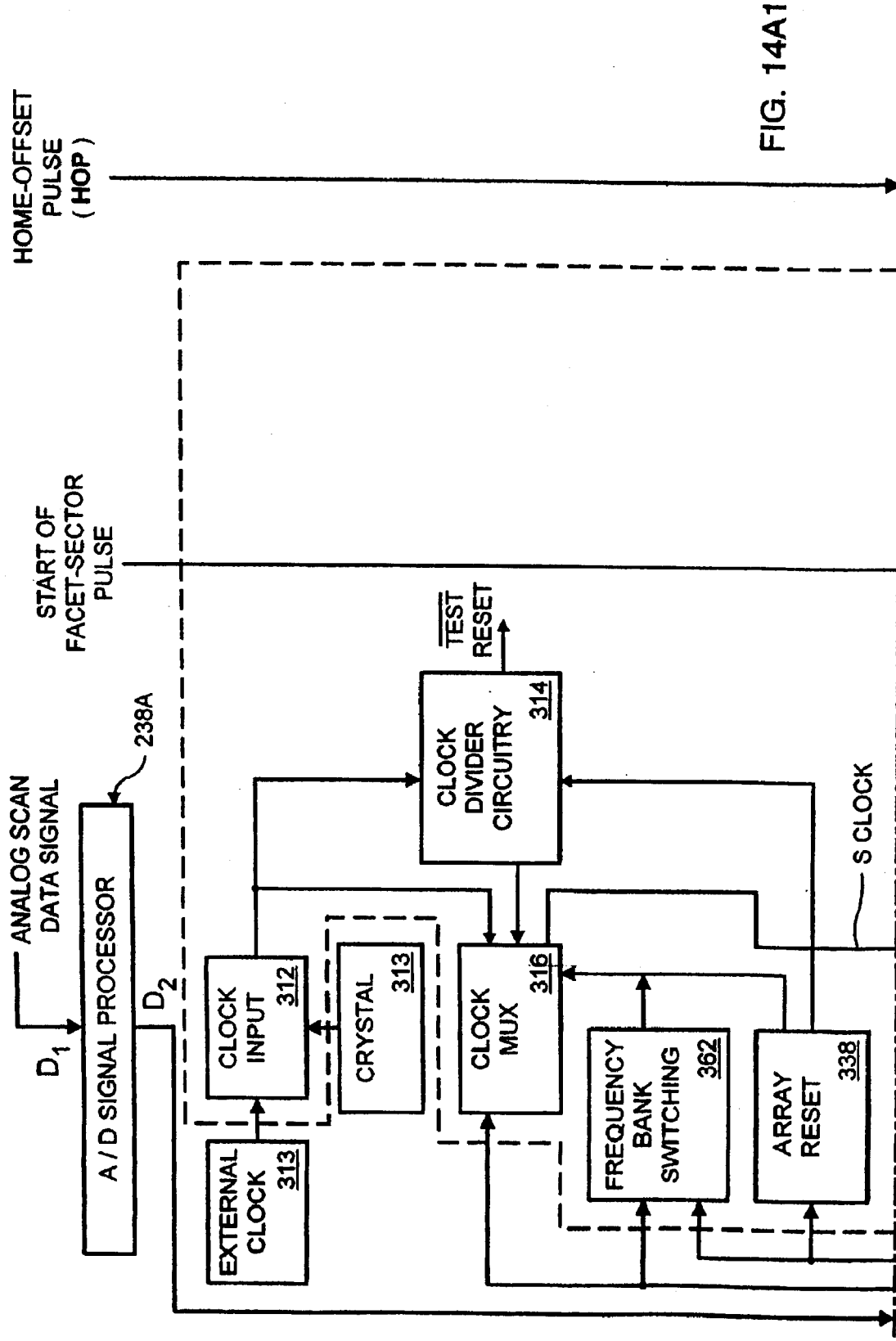

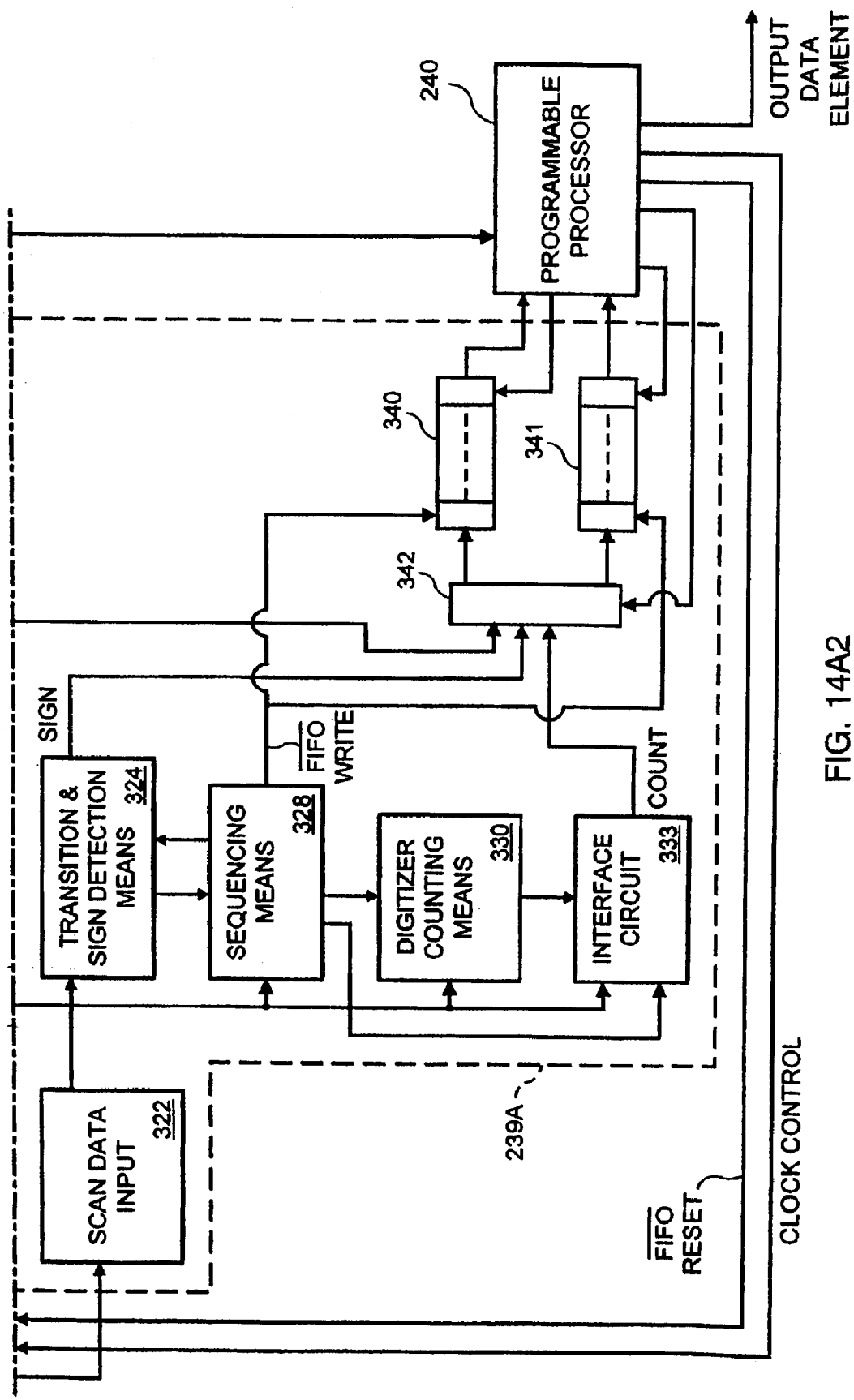
FIG. 14A2

| SCANNER NO. | SCANNING STATION NO. |
|---|---|
| TOTAL NO. OF FACETS ON DISC | NO. OF SECTORS PER FACET |

FIG. 14C1

TABLE EMBODIED IN DECODE PROCESSOR

| SCANNING FACET NO. | SFSP TRIGGERING EVENTS | PULSE EVENT FROM SFSP MODULE | MINIMUM AND MAXIMUM FACET ANGLES CORRESPONDING TO FACET-SECTOR IDENTIFIED BY SFSP EVENT |
|---|---|---|---|
| 12 | DETECTION OF 1ST, 2ND, 3RD AND 4TH SFS PULSE AFTER DETECTION OF HOME PULSE (HOP) | SFS 12/1P | $Q_{ROT\ MIN}, Q_{ROT\ MAX}$ |
| | | SFS 12/2P | |
| | | SFS 12/3P | |
| | | SFS 12/4P | |
| 16 | DETECTION OF 5TH, 6TH, 7TH AND 8TH SFS PULSE AFTER DETECTION OF HOP | SFS 16/1P | |
| | | SFS 16/2P | |
| | | SFS 16/3P | |
| | | SFS 16/4P | |
| 4 | DETECTION OF 9TH, 10TH, 11TH AND 12TH SFSP AFTER DETECTION OF HOP | SFS 4/1P | |
| | | SFS 4/2P | |
| | | SFS 4/3P | |
| | | SFS 4/4P | |
| 20 | DETECTION OF 13TH, 14TH, 15TH AND 16TH SFSP AFTER DETECTION OF HOP | SFS 20/1P | |
| | | SFS 20/2P | |
| | | SFS 20/3P | |
| | | SFS 20/4P | |
| 8 | DETECTION OF 17TH, 18TH, 19TH AND 20TH SFSP AFTER DETECTION OF HOP | SFS 8/1P | |
| | | SFS 8/2P | |
| | | SFS 8/3P | |
| | | SFS 8/4P | |
| 11 | DETECTION OF 21ST, 22ND, 23RD AND 24TH SFSP AFTER DETECTION OF HOP | SFS 11/1P | |
| | | SFS 11/2P | |
| | | SFS 11/3P | |
| | | SFS 11/4P | |
| ⋮ | | | |
| 17 | DETECTION OF 73RD, 74TH, 75TH AND 76TH SFSP AFTER DETECTION OF HOP | SFS 17/1P | |
| | | SFS 17/2P | |
| | | SFS 17/3P | |
| | | SFS 17/4P | |
| 5 | DETECTION OF 77TH, 78TH, 79TH AND 80TH SFSP AFTER DETECTION OF HOP | SFS 5/1P | |
| | | SFS 5/2P | |
| | | SFS 5/3P | |
| | | SFS 5/4P | |

FIG. 14C2

"DUAL-LASER TACHOMETER WITH PACKAGE LENGTH MEASUREMENT MEANS"

DUAL-LASER TACHOMETER SUBSYSTEM DIRECT-PICKUP CONFIGURATION
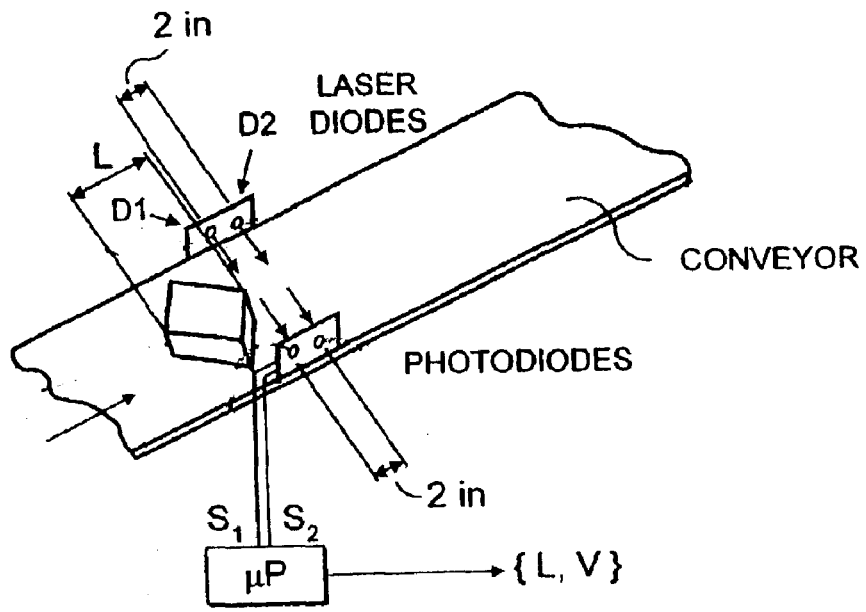
FIG. 15A
PHOTODIODES OUTPUT
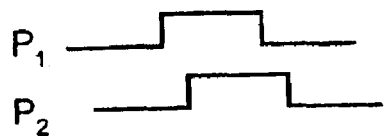
FIG. 15A1
INPUT TO MICROPROCESSOR
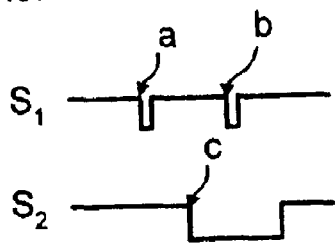
FIG. 15A2

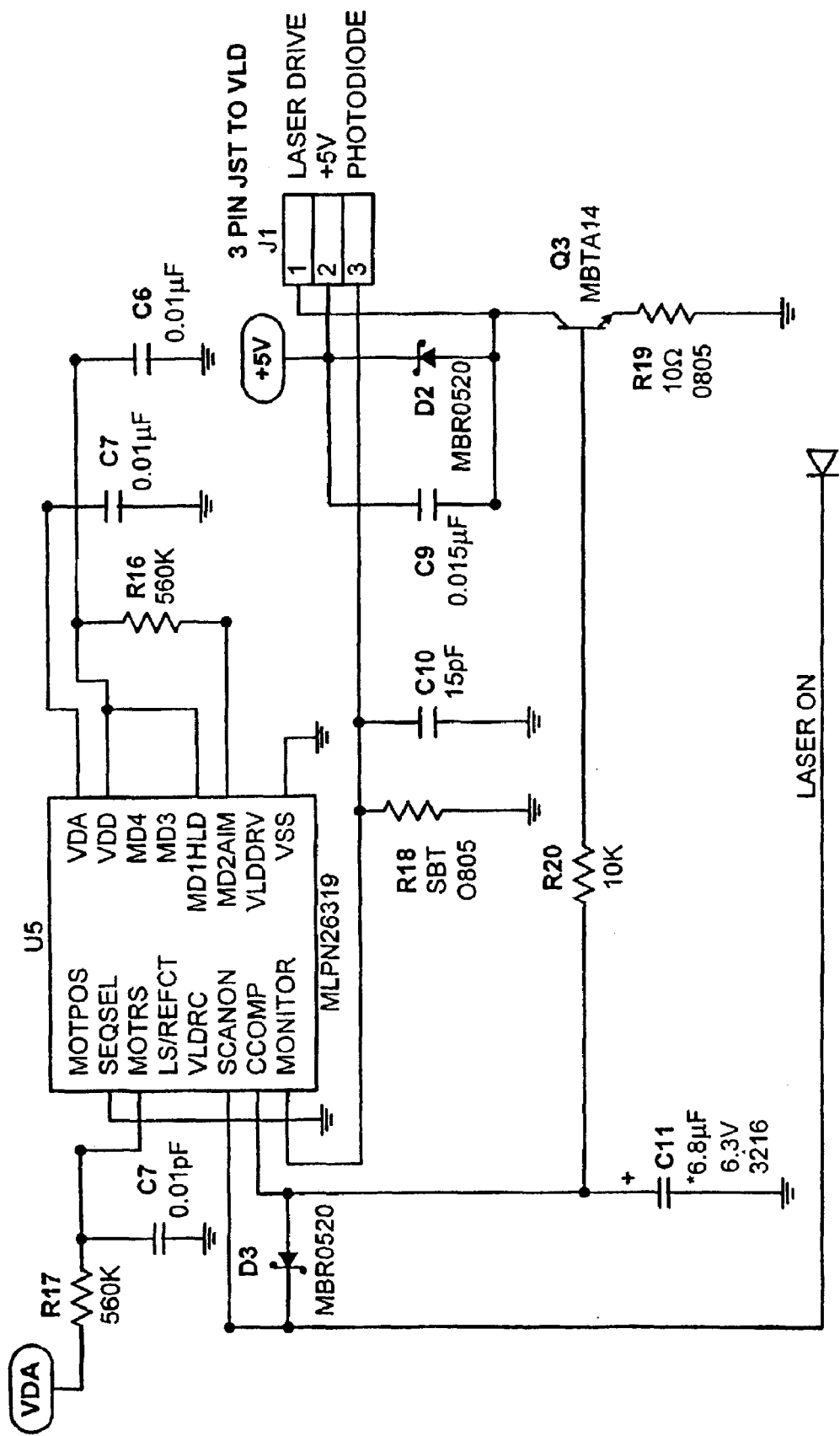
FIG. 15A3

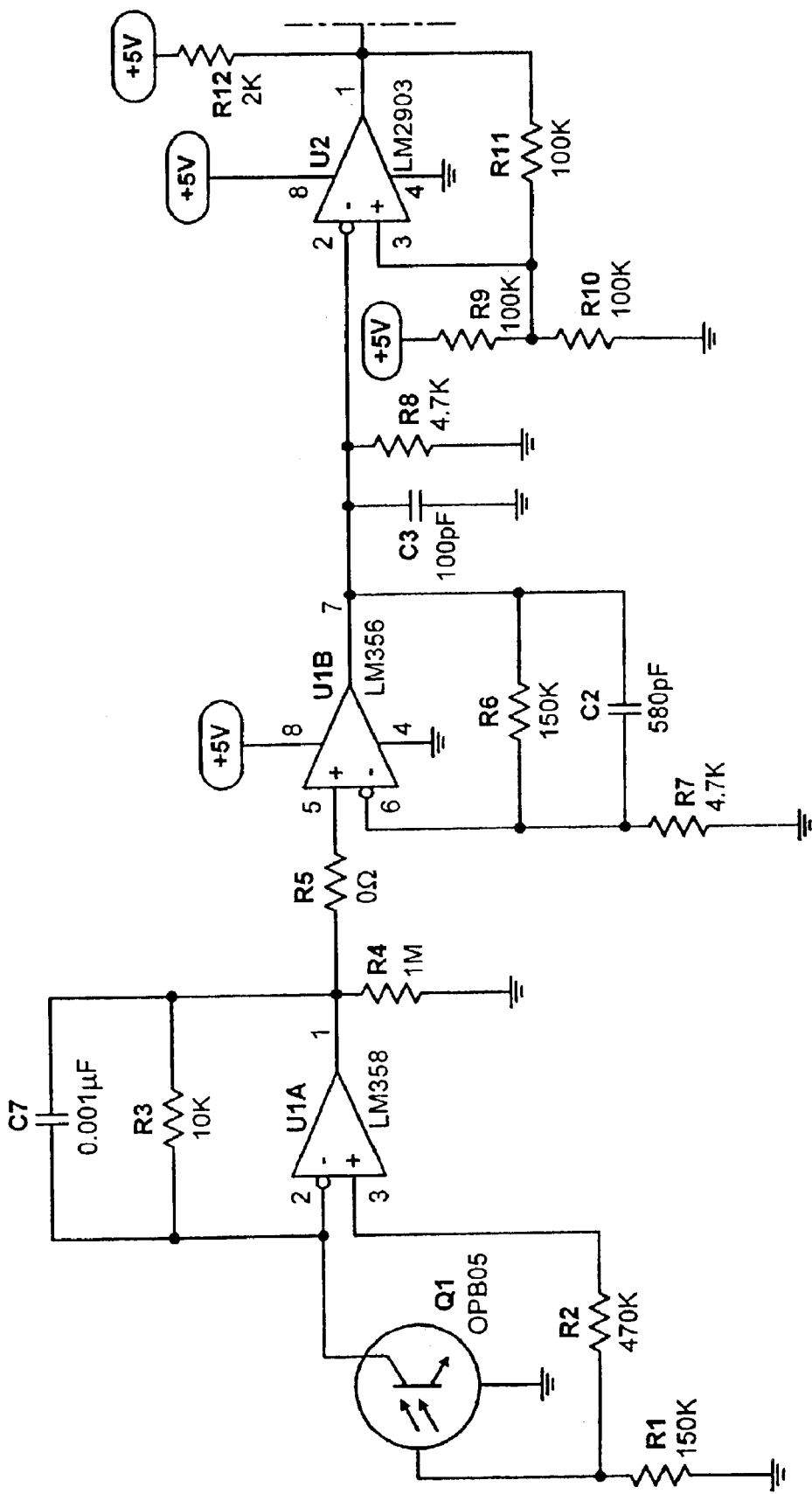
FIG. 15A4A

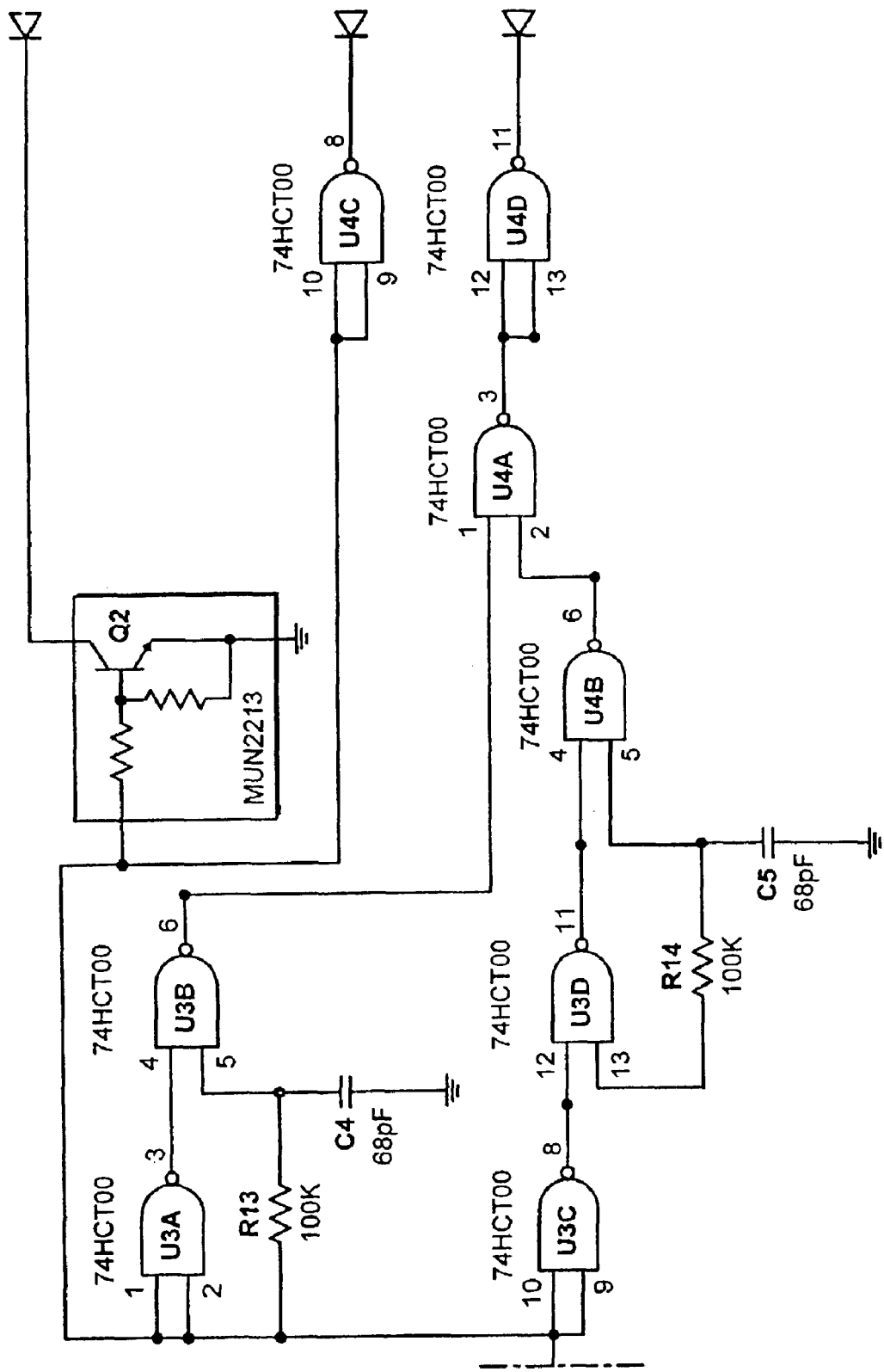
FIG. 15A4B

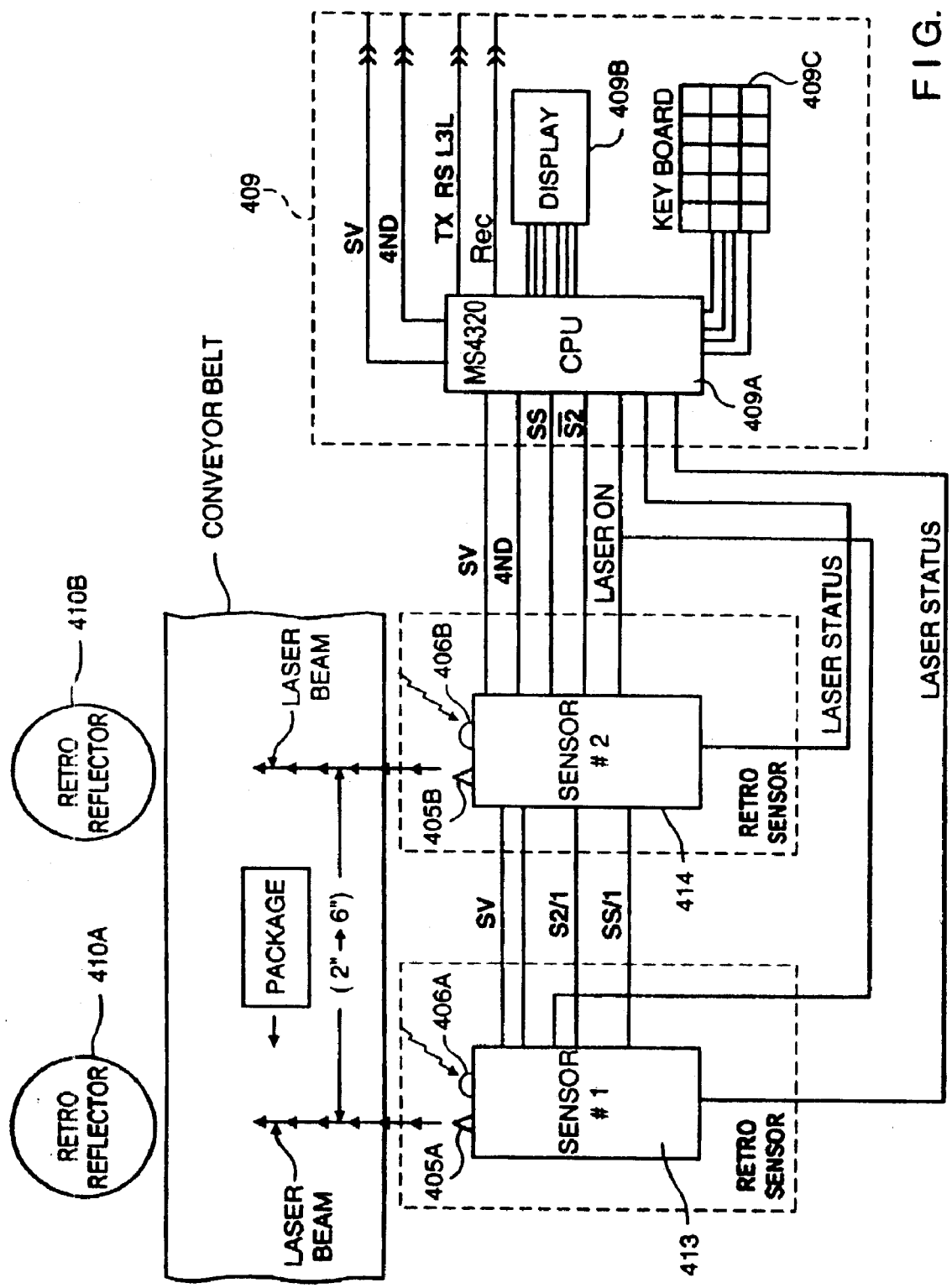
FIG. 15B1

(FOR RETRO - REFLECTIVE CONFIGURATION)
FLOW CHART FOR THE VELOCITY AND LENGTH SENSOR

D = DISTANCE BETWEEN 2 SENSORS (TYPICAL VALUE: 3 INCHES)
VC = VELOCITY COUNTS (33 BITS)
LC = LENGTH COUNTS (32 BITS)
T = 0.651 MICROSECONDS (LENGTH ON ONE MACHINE CYCLE)
VS = VELOCITY COUNT RECEIVED FLAG
LS = LENGTH COUNT RECEIVED FLAG
CC = ALL COUNTS AND FLAGS CLEARED FLAG

POWER UP, TURN ON LASERS AND THEN THE INTERRUPTS.

BOTH VS AND LS ARE SET ? — NO

YES

LENGTH = D*LC / VC (in inches),
VELOCITY = D / T / VC (in inches / seconds)

TRANSMIT VELOCITY AND LENGTH, CLEAR VS AND LS.

FIG. 15C

External Interrupt 0 (sensor 1)
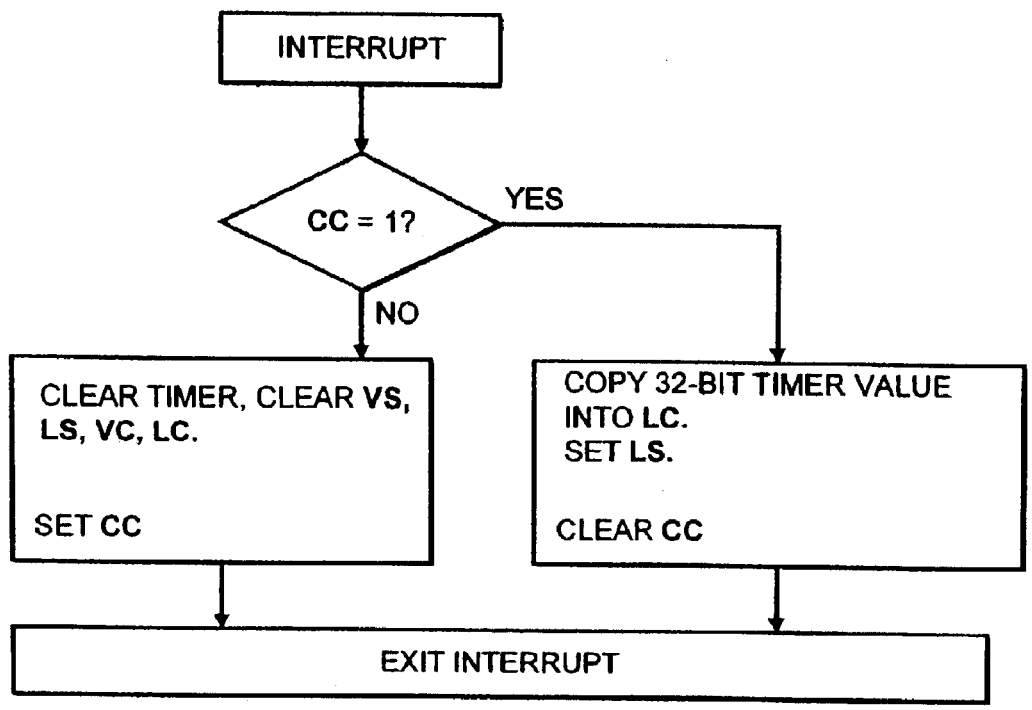
FIG. 15C1
External Interrupt 1 (sensor 2)
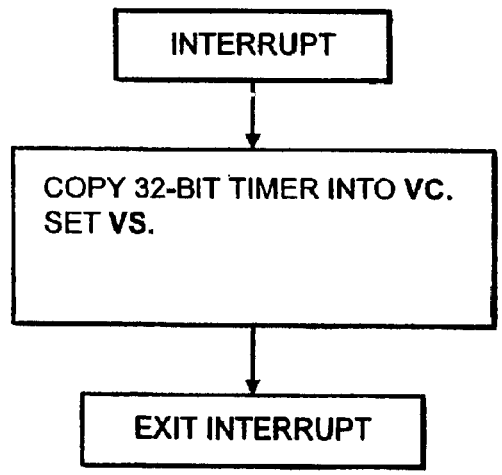
FIG. 15C2

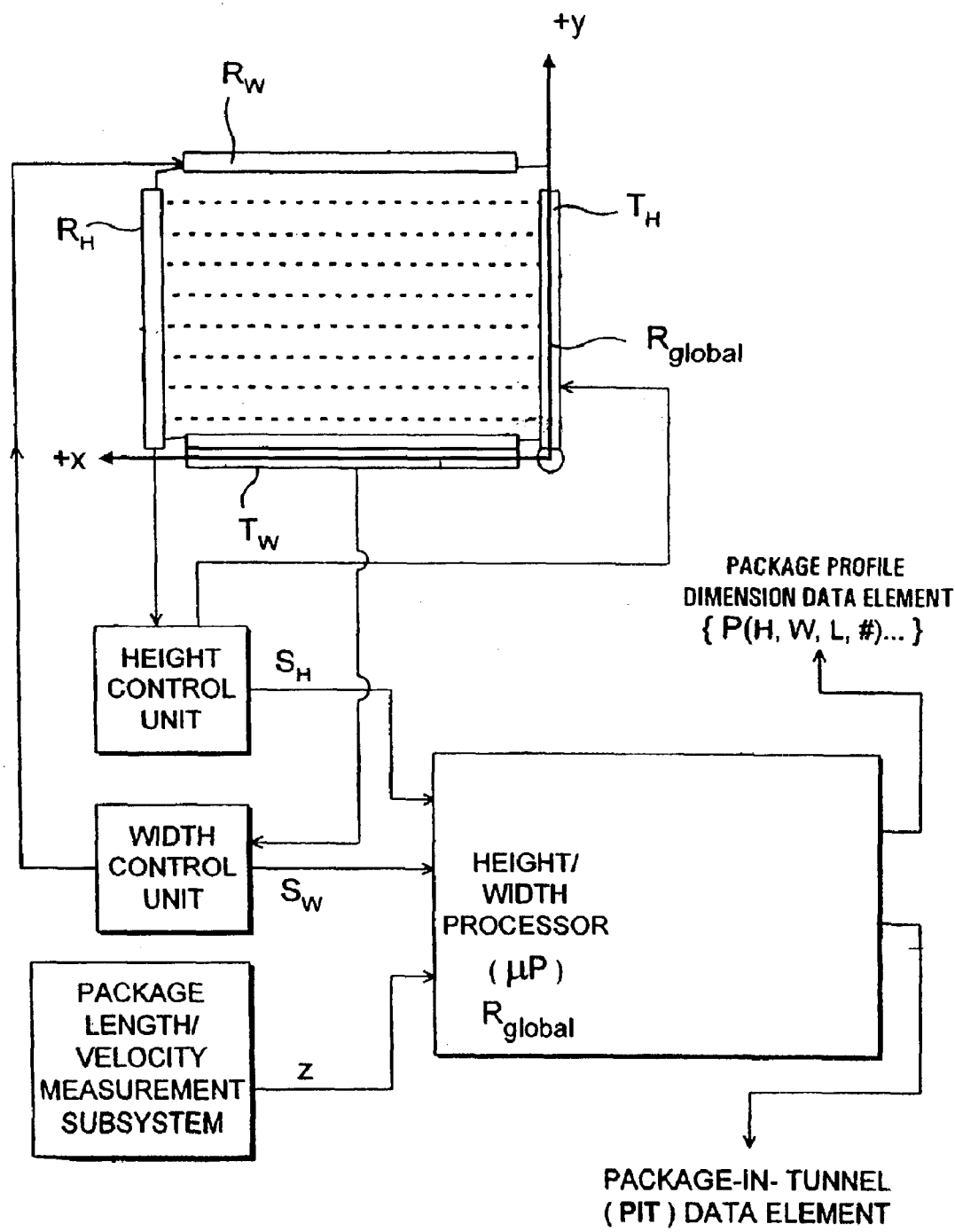
F I G. 16A

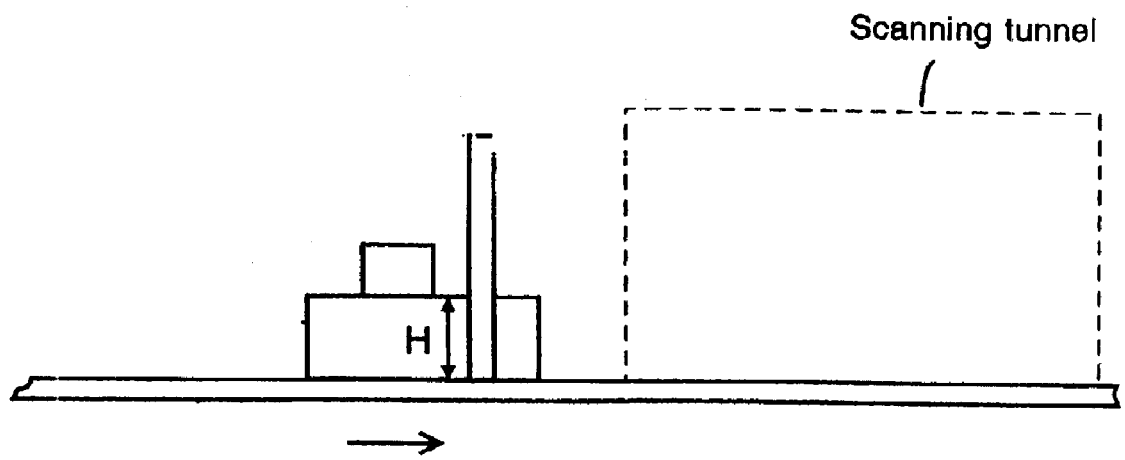
F I G. 18A
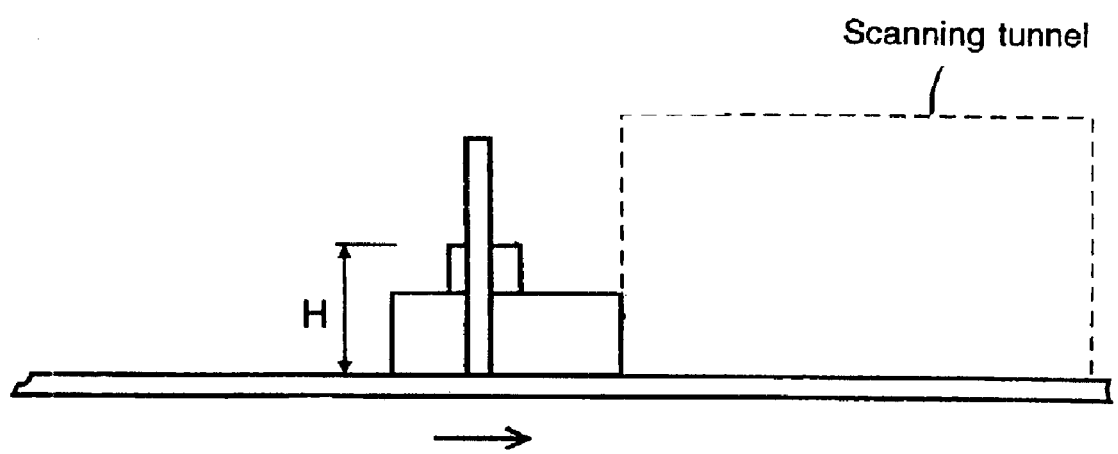
F I G. 18B
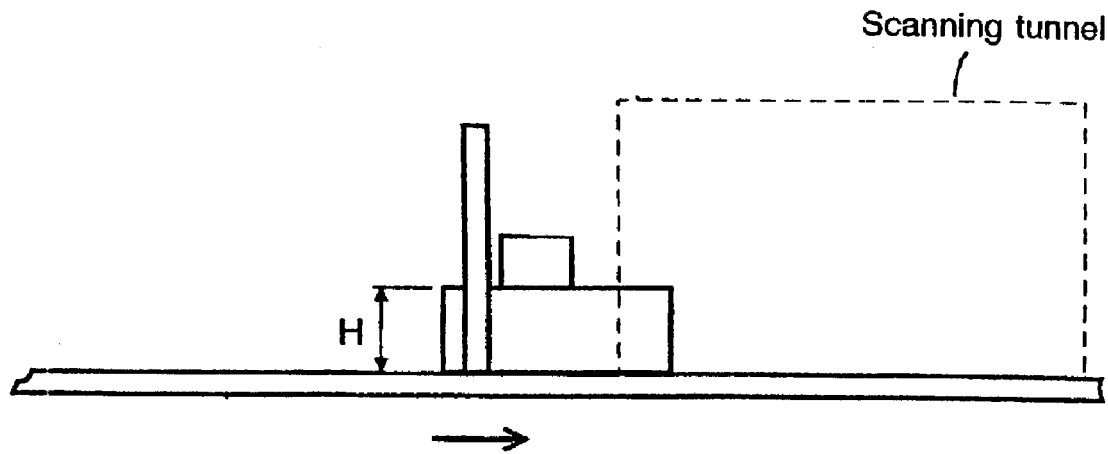
F I G. 18C

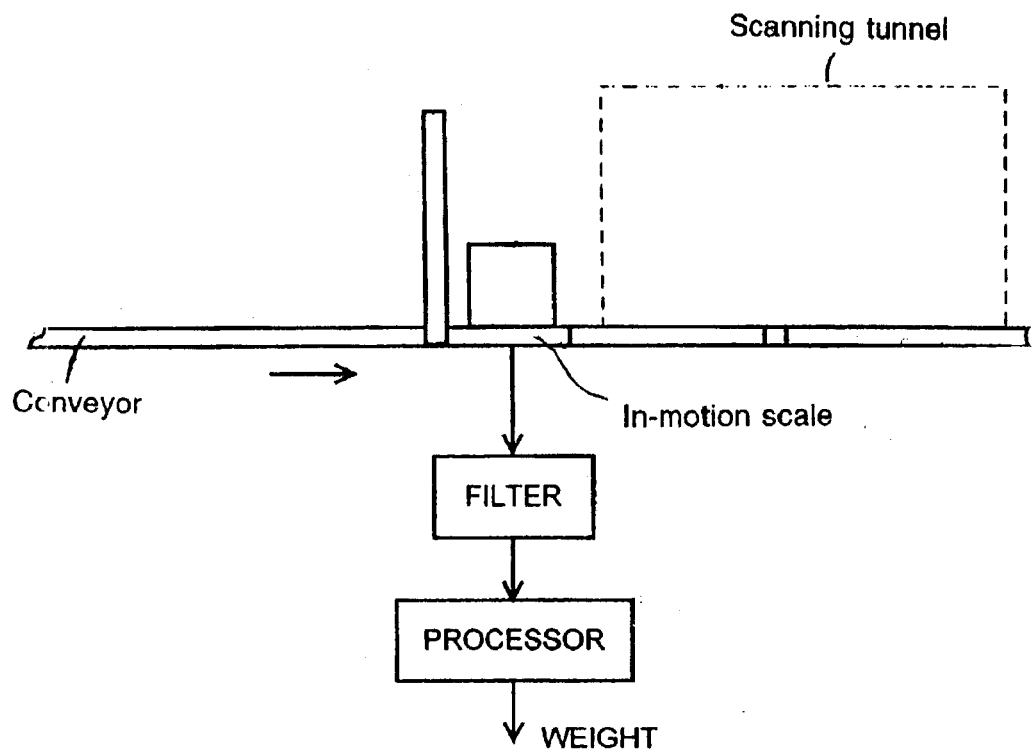
F I G. 20A
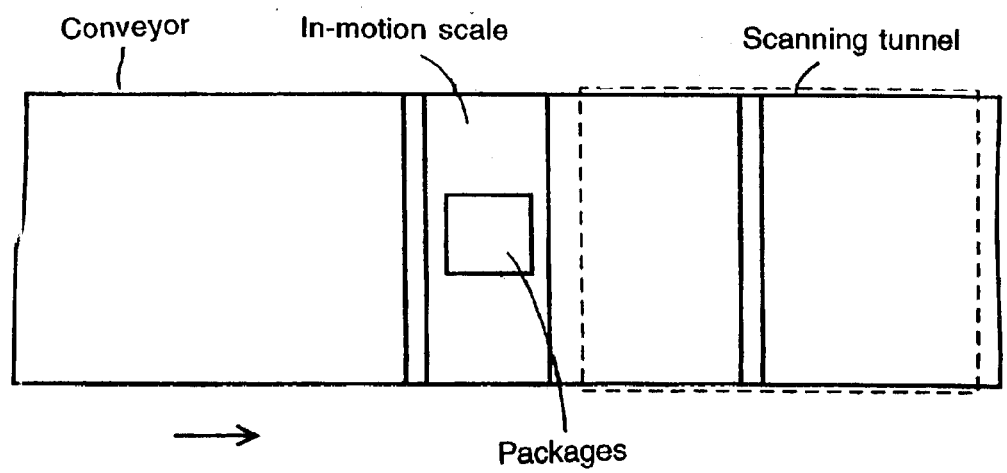
F I G. 20B

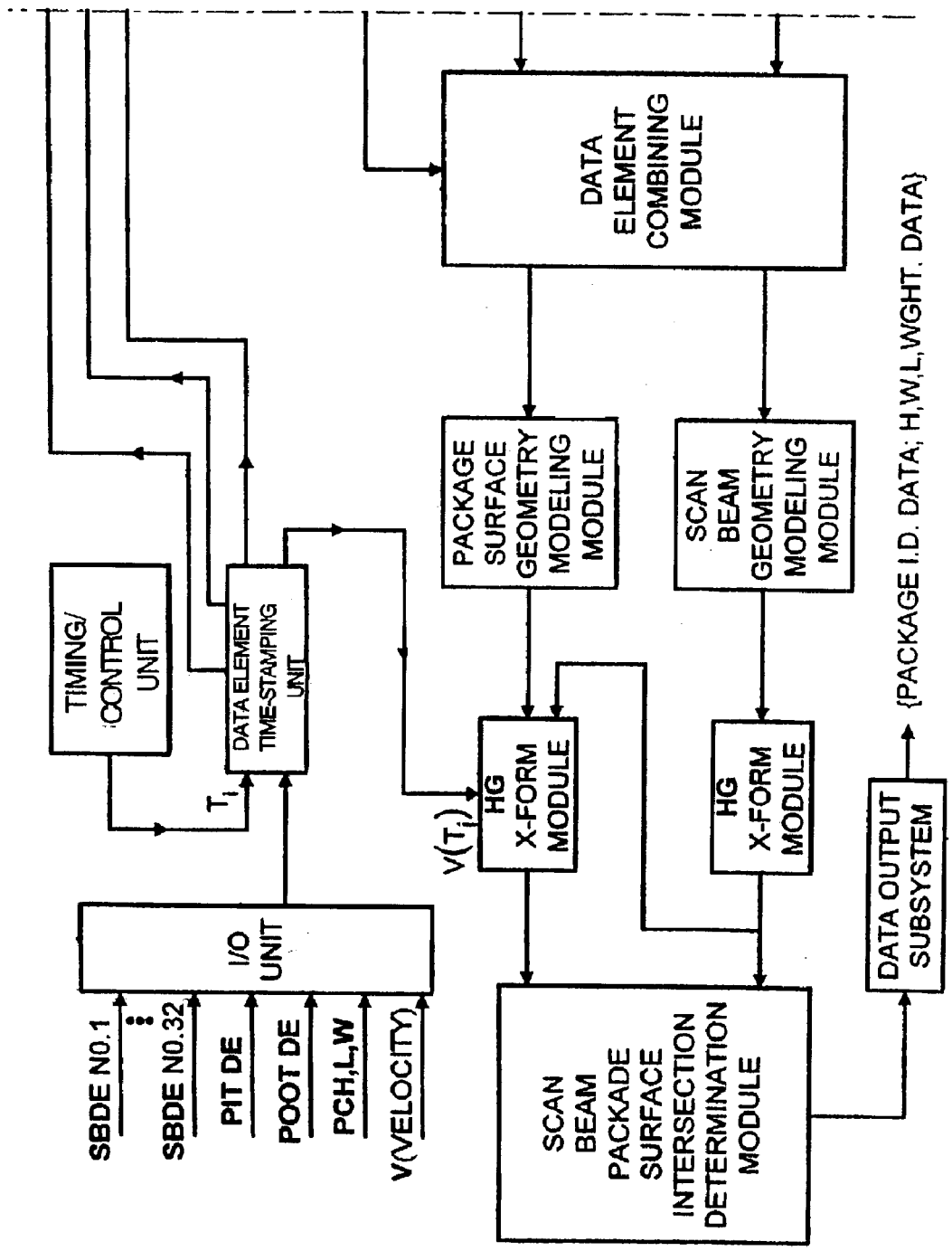
FIG. 22A1

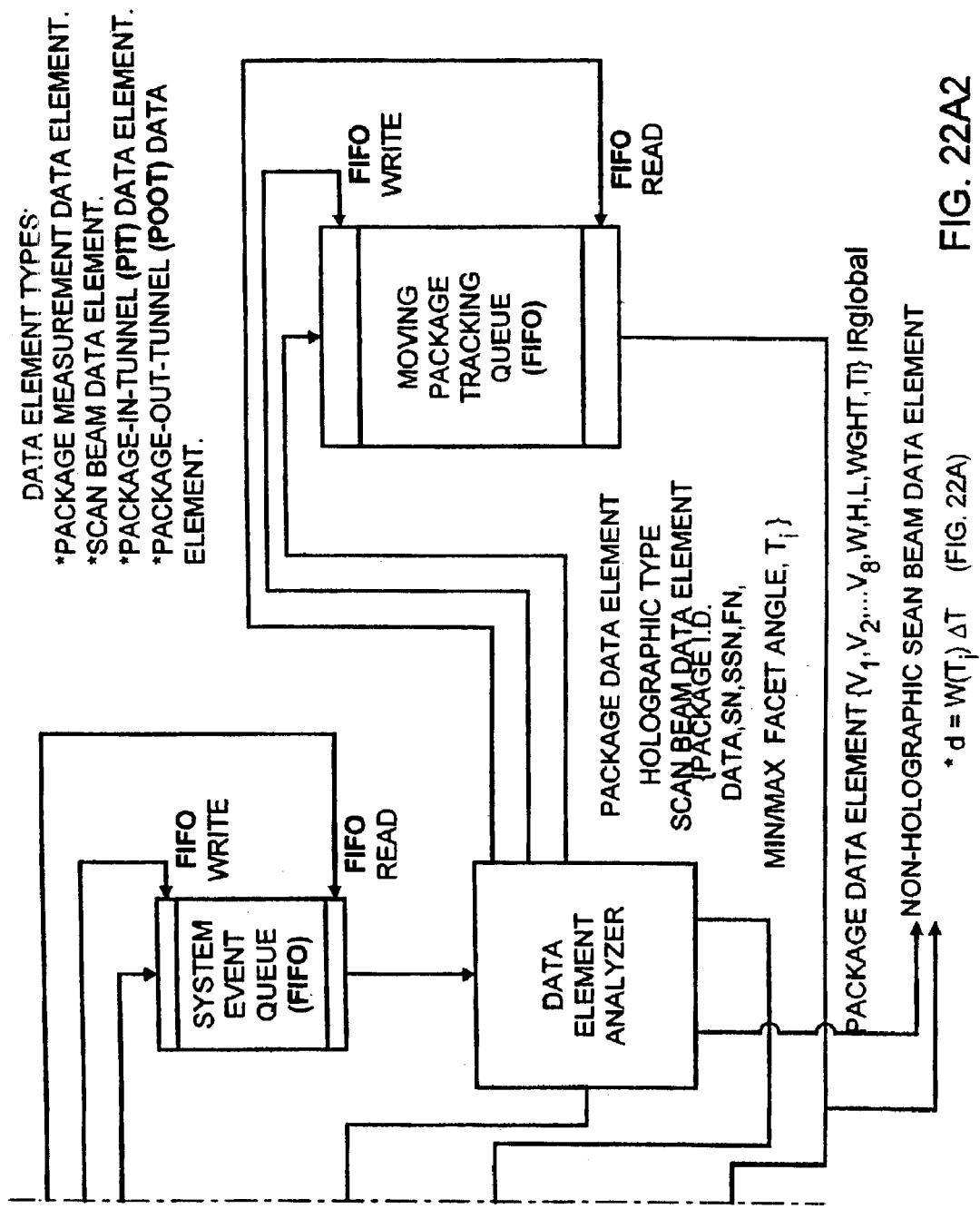
FIG. 22A2

DATA ELEMENT HANDLING RULES

1. WHEN A PACKAGE DATA ELEMENT (PDE) OF ANY TYPE IS REMOVED FROM THE SYSTEM EVENT QUEUE, THEN IT IS PLACED IN THE MOVING PACKAGE TRACKING QUEUE

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN THE MOVING PACKAGE TRACKING QUEUE AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIG. 22

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE IS REMOVED THERE FROM

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT:

FIG. 23A1

(a) IF THE TIME STAMP $T_i$ ON THE REMOVED POOT DATA ELEMENT INDICATES THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE (b) IF THE TIME STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM THE MOVING PACKAGE TRACKING QUEUE.

FIG. 23A2

VECTOR-BASED SURFACE MODELLING OF PACKAGES MOVING IN SCANNING TUNNEL

MATHEMATICAL FORM OF EACH SURFACE ON THE PACKAGE: VECTOR-BASED MODEL CONSISTING OF (1) AT LEAST THREE VERTICE POINTS WITHIN THE PLANE OF THE PACKAGE SURFACE, AND (2) NORMAL VECTOR FOR THE PLANE.

PROCEDURE:

(1) USE POSITION VECTOR ( REFERENCED TO X=0, Y=0, Z=0 IN $R_{global}$), FOR SPECIFYING THE POSITION OF EACH VERTEX IN THE PACKAGE SURFACE PLANE; AND (2) USE NORMAL VECTOR FOR SPECIFYING THE SURFACE DIRECTION OF THE PACKAGE SURFACE (AT WHICH LIGHT REFLECTS)

(3) THESE FOUR VECTORS SPECIFY THE SURFACE OF THE PACKAGE IN COORDINATE REFERENCE FROM $R_{global}$

FIG. 24A

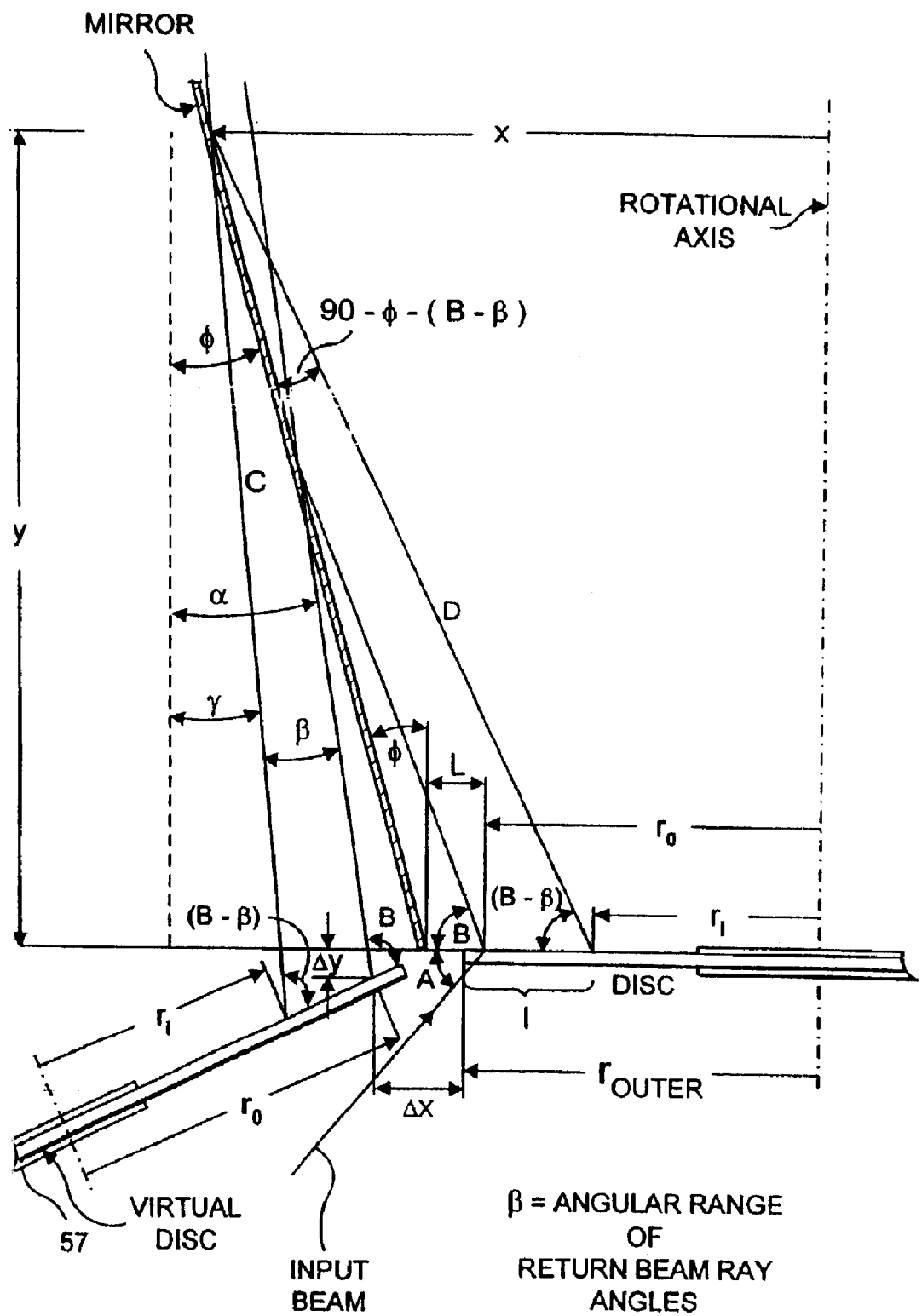
FIG. 25A1

(1) THE RADIUS TO BEAM-INCIDENT-POINT ON THE HOLOGRAPHIC SCANNING DISC, ASSIGNED THE SYMBOLIC NOTATION "$r_0$"

(2) SCANLINE SEPARATION BETWEEN ADJACENT SCANLINES AT THE FOCAL PLANE OF THE (i, j)-TH SCANLINE, ASSIGNED THE SYMBOLIC NOTATION "$S_{SL}$"

(3) THE SCANLINE LENGTH (MEASURED INTO THE PAPER) FOR THE (i, j)-TH SCANLINE, ASSIGNED THE SYMBOLIC NOTATION "$L_{SL}$"

(4) THE DISTANCE MEASURED FROM THE SCANNING DISC TO THE FOCAL PLANE OF THE (i, j)-TH SCANLINE, ASSIGNED THE SYMBOLIC NOTATION "$a_i$"

(5) THE DISTANCE FROM RADIUS TO BEAM-INCIDENT-POINT $r_0$ TO BEAM FOLDING MIRROR, ASSIGNED THE SYMBOLIC NOTATION "$L$"

(6) THE TILT ANGLE OF THE J-TH BEAM FOLDING MIRROR ASSOCIATED WITH GENERATION OF THE (i, j)-TH SCANLINE, ASSIGNED THE SYMBOLIC NOTATION "$\phi_j$"

(7) THE TILT ANGLE OF THE VIRTUAL SCANNING DISC, ASSIGNED THE SYMBOLIC NOTATION "$2\phi$"

(8) THE LATERAL SHIFT OF THE BEAM INCIDENT POINT ON THE VIRTUAL SCANNING DISC, ASSIGNED THE SYMBOLIC NOTATION "$\Delta X$"

(9) THE VERTICAL SHIFT OF THE BEAM INCIDENT POINT ON THE VIRTUAL SCANNING DISC, ASSIGNED THE SYMBOLIC NOTATION "$\Delta Y$"

(10) THE DISTANCE FROM THE ROTATION AXIS TO THE BEAM INCIDENT POINT ON THE VIRTUAL SCANNING DISC, ASSIGNED THE SYMBOLIC NOTATION "$r_0 + \Delta X$"

(11) THE DISTANCE FROM THE BEAM INCIDENT POINT ON THE VIRTUAL SCANNING DISC TO THE FOCAL PLANE WITHIN WHICH THE (i, j)-TH SCANLINE RESIDES, ASSIGNED THE SYMBOLIC NOTATION "$f_i$"

(12) THE DIAMETER OF THE CROSS-SECTION OF THE LASER BEAM SCANNING STATION, ASSIGNED THE SYMBOLIC NOTATION "$d_{BEAM}$"

(13) THE ANGULAR GAP BETWEEN ADJACENT HOLOGRAPHIC SCANNING FACETS, ASSIGNED THE SYMBOLIC NOTATION "$d_{GAP}$"

(14) THE OUTER RADIUS OF THE AVAILABLE LIGHT COLLECTION REGION ON THE HOLOGRAPHIC SCANNING DISC, ASSIGNED THE SYMBOLIC NOTATION "$r_{OUTER}$"

FIG. 25B1

(15) THE INNER RADIUS OF THE AVAILABLE LIGHT COLLECTION REGION ON THE HOLOGRAPHIC SCANNING FACET, ASSIGNED THE SYMBOLIC NOTATION "$r_{INNER}$"

(16) ONE-HALF OF THE DEPTH OF FIELD OF THE (i, J)-TH SCANLINE, ASSIGNED THE SYMBOLIC NOTATION "$\delta$"

(17) THE DISTANCE FROM THE MAXIMUM READ DISTANCE ($f_i + 5"$) TO THE INNER RADIUS $r_i$ OF THE SCANNING FACET, ASSIGNED THE SYMBOLIC NOTATION "C"

(18) THE OUTER RAY ANGLE MEASURED RELATIVE TO THE NORMAL TO THE i-TH HOLOGRAPHIC FACET, ASSIGNED THE SYMBOLIC NOTATION "$\alpha$"

(19) THE INNER RAY ANGLE MEASURED RELATIVE TO THE NORMAL TO THE i-TH HOLOGRAPHIC FACET, ASSIGNED THE SYMBOLIC NOTATION "$\gamma$"

(20) THE LIGHT COLLECTION ANGLE MEASURED FROM THE FOCAL POINT OF THE i-TH FACET TO THE LIGHT COLLECTION AREA OF THE SCANNING FACET, ASSIGNED THE SYMBOLIC NOTATION "$\beta$"

(21) THE INTERSECTION OF THE BEAM FOLDING MIRROR AND LINE C, ASSIGNED THE SYMBOLIC NOTATION "X"

(21A) THE INTERSECTION OF THE BEAM FOLDING MIRROR AND LINE C, ASSIGNED THE SYMBOLIC NOTATION "Y"

(22) THE DISTANCE MEASURED FROM THE INNER RADIUS TO THE POINT OF MIRROR INTERSECTION, ASSIGNED THE SYMBOLIC NOTATION "D"

(23) THE DISTANCE MEASURED FROM THE BASE OF THE SCANNER HOUSING TO THE TOP OF THE j-TH BEAM FOLDING MIRROR, ASSIGNED THE SYMBOLIC NOTATION "h"

(24) THE DISTANCE MEASURED FROM THE SCANNING DISC TO THE BASE OF THE HOLOGRAPHIC SCANNER, ASSIGNED THE SYMBOLIC NOTATION "d"

(25) THE FOCAL LENGTH OF THE i-TH HOLOGRAPHIC SCANNING FACET FROM THE SCANNING FACET TO THE CORRESPONDING FOCAL PLANE WITHIN THE SCANNING VOLUME, ASSIGNED THE SYMBOLIC NOTATION "$f_i$"

(26) INCIDENT BEAM ANGLE, ASSIGNED THE SYMBOLIC NOTATION "$A_i$"

FIG. 25B2

(27) DIFFRACTED BEAM ANGLE, ASSIGNED THE SYMBOLIC NOTATION "$B_i$"

(28) THE ANGLE OF THE J-TH LASER BEAM MEASURED FROM THE VERTICAL, ASSIGNED THE SYMBOLIC NOTATION "$\alpha$"

(29) THE SCAN ANGLE OF THE LASER BEAM, ASSIGNED THE SYMBOLIC NOTATION "$\theta_{si}$"

(30) THE SCAN MULTIPLICATION FACTOR FOR THE i-TH HOLOGRAPHIC FACET, ASSIGNED THE SYMBOLIC NOTATION "$M_i$"

(31) THE FACET ROTATION ANGLE FOR THE i-TH HOLOGRAPHIC FACET, ASSIGNED THE SYMBOLIC NOTATION "$\theta_{ROTi}$"

(32) ADJUSTED FACET ROTATION ANGLE ACCOUNTING FOR DEADTIME, ASSIGNED THE SYMBOLIC NOTATION "$\theta'_{ROTi}$"

(33) THE LIGHT COLLECTION EFFICIENCY FACTOR FOR THE i-TH HOLOGRAPHIC FACET, NORMALIZED RELATIVE TO THE 16TH FACET, ASSIGNED THE SYMBOLIC NOTATION "$\xi_i$"

(34) THE MAXIMUM LIGHT COLLECTION AREA FOR THE i-TH HOLOGRAPHIC FACET, ASSIGNED THE SYMBOLIC NOTATION "$Area_i$"

(35) THE BEAM SPEED AT THE CENTER OF THE (i, j)-TH SCANLINE, ASSIGNED THE SYMBOLIC NOTATION "$V_{CENTER}$"

(36) THE ANGLE OF SKEW OF THE DIFFRACTED LASER BEAM AT THE CENTER OF THE i-TH HOLOGRAPHIC FACET, ASSIGNED THE SYMBOLIC NOTATION "$\phi_{SKEW}$"

(37) THE MAXIMUM BEAM SPEED OF ALL LASER BEAMS PRODUCED BY THE HOLOGRAPHIC SCANNING DISC, ASSIGNED THE SYMBOLIC NOTATION "$V_{MAX}$"

(38) THE MINIMUM BEAM SPEED OF ALL LASER BEAMS PRODUCED BY THE HOLOGRAPHIC SCANNING DISC, ASSIGNED THE SYMBOLIC NOTATION "$V_{MIN}$"

(39) THE RATIO OF THE MAXIMUM BEAM SPEED TO THE MINIMUM BEAM SPEED, ASSIGNED THE SYMBOLIC NOTATION "$V_{MAX}/V_{MIN}$"

(40) THE DEVIATION OF THE LIGHT RAYS REFLECTED OFF THE PARABOLIC LIGHT REFLECTING MIRROR BENEATH THE SCANNING DISC, FROM THE BRAGG ANGLE FOR THE FACET, ASSIGNED THE SYMBOLIC NOTATION "$\delta_e$"

FIG. 25B3

PARAMETER EQUATION USED IN THE SPREADSHEET DESIGN OF THE SCANNER (1) $\Delta x := L(1 + \cos(2\phi))$ (2) $\Delta y := L \sin(2\phi)$ (3) $\Delta y := r_0 + \Delta x$ (4) $C := \sqrt{(f+\delta)^2 + l^2 + 2(f+\delta)l \cos(B)}$ LAW OF COSINES, WHERE: $l = r_{outer} - r_{inner}$ $\beta = \alpha - \gamma = B + 2\phi - 90 - \gamma$ (5) $\alpha := B - 90 + 2\phi$ (6) $r := \alpha - \cos\left[\dfrac{(f+\delta)^2 + C^2 - l^2}{2(f+\delta)C}\right]$ (7) $\beta := \alpha - \gamma$ (8) $X := D \cos(B - \beta) + r_i$ (9) $Y := D \sin(B - \beta)$

(10) $D := \dfrac{[r_0 + L - r_i] \sin(90 + \phi)}{\sin(90 - B + \beta - \phi)}$ (LAW OF SINES)

$$(12) \quad f_i := \sqrt{a_i^2 + \left[m S_{SL} - \left[r_0 + \Delta x\right]\right]^2}$$

m IS A FACTOR THAT VARIES FROM SCAN LINE TO SCAN LINE AND DETERMINED BY SCAN LINE SEPARATION AND DISTANCE FROM THE ROTATIONAL AXIS OF THE DISC.

$$(13) \quad B_i := \mathrm{atan}\left[\left[\frac{m S_{SL} - \left[r_0 + \Delta x\right]}{a_i}\right]\right] + 90 - 2\phi$$

$$(14) \quad \theta_{Si} := 2\,\mathrm{atan}\left[\left[\frac{\frac{1}{2}\mathrm{ScanLineLength}}{f_i}\right]\right]$$

$$(15) \quad M_i := \frac{r_0}{f_i} + \cos(\lambda_i) + \cos(B_i)$$

$$(16) \quad \theta_{roti} := \frac{\theta_{Si}}{M_i}$$

$$(17) \quad \theta'_{roti} := \theta_{roti} + \underbrace{\frac{d_{beam}}{r_0} + \frac{d_{gap}}{r_0}}_{\Theta_{dead}}$$

$$(18) \quad \xi_i := \left[\frac{f_i}{f_{16}}\right]^2 \frac{\sin[B_{16}]}{\sin(B_i)} H_i$$

$$(19) \quad \mathrm{Area}_i := \pi \left[r_{outer}^2 + r_{inner}^2\right] \frac{\xi_i}{\sum_{i=1}^{16}[\xi_i]} \qquad i = 1,2,\ldots 16$$

FIG. 25C2

VECTOR MODELING OF LASER SCAN BEAMS IN HOLOGRAPHIC SCANNING SUBSYSTEMS

MATHEMATICAL FORM FOR EACH LASER SCAN BEAM: VECTOR-BASED MODEL OF OPTICAL PATH OF BEAM FROM DISC TO MIRROR TO FOCAL PLANE ($\infty$)

PROCEDURE:

(1) USE POSITION VECTOR REFERENCED FROM X=0, Y=0, Z=0 IN $R_{local\ scanner}$ FOR SPECIFYING THE STARTING POINT OF LASER SCAN BEAM ON DISC, AND DIRECTION VECTOR FOR SPECIFYING THE DIRECTION OF LASER BEAM TO THE BEAM FOLDING MIRROR; AND (2) USE POSITION VECTOR FOR SPECIFYING POINT ON MIRROR WHERE BEAM IS REFLECTED FROM BEAM FOLDING MIRROR TOWARDS FOCAL PLANE OF FACET, EXTENDING TO INFINITY, AND DIRECTION VECTOR FOR SPECIFYING THE DIRECTION OF LASER BEAM TOWARDS DESIGNATED FOCAL PLANE (3) THESE FOUR VECTORS SPECIFY THE LASER BEAM RAY IN LOCAL COORDINATE REFERENCE $R_{local\ scanner}$

FIG. 27

AUTOMATED SYSTEM AND METHOD FOR IDENTIFYING AND MEASURING PACKAGES TRANSPORTED THROUGH AN OMNIDIRECTIONAL LASER SCANNING TUNNEL

CROSS-REFERENCE TO RELATED US APPLICATIONS

This is a Continuation of application Ser. No. 10/076,912 filed Feb. 14, 2002 now U.S. pat. No. 6,616,048, which is a Continuation of application Ser. No. 09/157,778 filed Sep. 21, 1998, now U.S. Pat. No. 6,517,004; which is a Continuation-in-Part of application Ser. No. 09/047,146 filed Mar. 24, 1998, now U.S. Pat. No. 6,360,947; Ser. No. 08/949,915 filed Oct. 14, 1997, now U.S. Pat. No. 6,158,659; Ser. No. 08/854,832 filed May 12, 1997, now U.S. Pat. No. 6,085,978; Ser. No. 08/886,806 filed Apr. 22, 1997, now U.S. Pat. No. 5,984,185; Ser. No. 08/726,522 filed Oct. 7, 1996, now U.S. Pat. No. 6,073,846; and Ser. No. 08/573,949 filed Dec. 18, 1995, now abandoned; each said application being commonly owned by Assignee, Metrologic Instruments, Inc., of Blackwood, N.J., and incorporated herein by reference as if fully set forth herein.

BACKGROUND OF THE INVENTION

1. Field of Invention

The present invention relates generally to an automated tunnel-type laser scanning package identification and measuring system arranged about a high-speed conveyor system used in diverse package routing and transport applications, and also a method of identifying and measuring packages having bar code symbols on surfaces facing any direction with a 3-D scanning volume.

2. Brief Description of the Prior Art

In many environments, there is a great need to automatically identify and measure objects (e.g. packages, parcels, products, luggage, etc.) as they are transported along a conveyor structure. While over-the-head laser scanning systems are effective in scanning upwardly-facing bar codes on conveyed objects, there are many applications where it is not practical or otherwise feasible to ensure that bar code labels are upwardly-facing during transportation under the scanning station.

Various types of "tunnel" scanning systems have been proposed so that bar codes can be scanned independent of their orientation within the scanning volume of the system. One such prior art tunnel scanning system is disclosed in U.S. Pat. No. 5,019,714 to Knowles. In this prior art scanning system, a plurality of single scanline scanners are orientated about a conveyor structure in order to provide a limited degree of omni-directional scanning within the "tunnel-like" scanning environment. Notably, however, prior art tunnel scanning systems, including the system disclosed in U.S. Pat. No. 5,019,714, are incapable of scanning bar code symbols in a true omni-directional sense, i.e. independent of the direction that the bar code faces as it is transported along the conveyor structure. At best, prior art scanning systems provide omni-directional scanning in the plane of the conveyor belt or in portions of planes orthogonal thereto. However, true omnidirectional scanning along the principal planes of a large 3-D scanning volume has not been hitherto possible.

Also, while numerous systems have been proposed for automatically identifying and measuring the dimensions and weight of packages along a high-speed conveyor, prior art systems have been very difficult to manufacture, maintain, and operate in a reliable manner without the use of human supervision.

Thus, there is a great need in the art for an improved tunnel-type automated laser scanning package identification/measuring system and a method of identifying and measuring packages transported along a high-speed conveyor system, while avoiding the shortcomings and drawbacks of prior art scanning systems and methodologies.

OBJECTS AND SUMMARY OF THE PRESENT INVENTION

Accordingly, a primary object of the present invention is to provide a novel omni-directional tunnel-type automated package identification and measuring system that is free of the shortcomings and drawbacks of prior art tunnel-type laser scanning systems and methodologies.

Another object of the present invention is to provide a fully automated package identification and measuring system, wherein an omni-directional holographic scanning tunnel is used to read bar codes on packages entering the tunnel, while a package dimensioning subsystem is used to capture information about the package prior to entry into the tunnel.

Another object of the present invention is to provide a fully automated package identification and measuring system, wherein mathematical models are created on a real-time basis for the geometry of the package and the position of the laser scanning beam used to read the bar code symbol thereon.

Another object of the present invention is to provide a fully automated package identification and measuring system, wherein the mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

Another object of the present invention is to provide a fully automated package identification and measuring system, wherein bar code symbols that have been placed on any surface of any package, including USPS trays and tubs, and other customer mailed products, including the bottom surface of the product, are automatically scanned during movement through the system.

Another object of the present invention is to provide such a tunnel-type system which can be used for high speed mail and parcel sorting systems (e.g. Large Package Sorting Systems (LPSS), Singulate and Scan Induction Units (SSIU), as well as luggage checking and tracking systems used in airport terminals, bus-stations, train stations, and the like.

Another object of the present invention is to provide such a tunnel-type system, which can read different bar code symbologies (e.g., Interleaved two of five, Code 128 and Code three of nine), code lengths, and formats in accordance with AIM and ANSI Standards.

Another object of the present invention is to provide such a tunnel-type system, in which a user-interface is provided for programming the bar code symbologies, code lengths and code formats handled by each laser scanning unit within the system.

Another object of the present invention is to provide such a tunnel-type system, for reading bar code symbols on packages having various types of symbol formats, such as ZIP Code symbols (six digits), Package Identification Code (PIC) symbols (sixteen characters), and Tray bar code symbols (ten digits).

Another object of the present invention is to provide such a tunnel-type system, for omni-directional scanning of bar code symbols on packages, parcels and products transported along a high-speed conveyor system at velocities in the range of about 100 to 520 feet per minute or greater.

Another object of the present invention is to provide such a tunnel-type system, in which a plurality of holographic laser scanning subsystems are mounted from a scanner support framework arranged about a high-speed conveyor belt, and arranged so that each scanning subsystem projects a highly-defined 3-D omni-directional scanning volume with a large depth-of-field, above the conveyor structure so as to collectively provide omni-directional scanning with each of the three principal scanning planes of the tunnel-type scanning system.

Another object of the present invention is to provide such a tunnel-type system, in which each holographic laser scanning subsystem projects a highly-defined 3-D omni-directional scanning volume that has a large depth-of-field and is substantially free of spatially and temporally coincident scanning planes, to ensure substantially zero crosstalk among the numerous laser scanning channels provided within each holographic laser scanning subsystem employed in the system.

Another object of the present invention is to provide such a tunnel-type system, in which a split-type conveyor is used with a gap disposed between its first and second conveyor platforms, for mounting of an omni-directional projection-type laser scanning subsystem that is below the conveyor platforms and ends the substantially the entire width of the conveyor platform.

Another object of the present invention is to provide such a tunnel-type system, wherein a plurality of holographic laser scanners are arranged about the conveyor system to produce a bi-directional scanning pattern along the principal axes of a three-dimensional laser scanning volume.

A further object of the present invention is to provide such a tunnel-type system, in which each holographic laser scanner employed in the system project a three-dimensional laser scanning volume having multiple focal planes and a highly confined geometry extending about a projection axis extending from the scanning window of the holographic scanner and above the conveyor belt of the system.

Another object of the present invention is to provide an improved tunnel-type system, wherein bar code symbols downwardly facing the conveyor belt can be automatically scanned as they are transported through the system in a high-speed manner.

Another object of the present invention is to provide an improved method of identifying and measuring packages within a tunnel-scanning environment through which objects of various types can be conveyed at high transport speeds.

Another object of the present invention is to provide an automated package identification and measuring system characterized by: lower labor costs; higher load efficiency; perfect destination accuracy; extremely fast id throughput; more accurate shipping charges; fast, accurate tracking and sorting; and precision package weights, shapes, measurements.

Another object of the present invention is to provide an automated package identification and measuring system which can read bar codes anywhere on a parcel moving down a fast conveyor line: top; sides; front; rear; and bottom.

Another object of the present invention is to provide an automated package identification and measuring system which enables fully automated package handling on real world-sized bar codes.

Another object of the present invention is to provide an automated package identification and measuring system which doe not require any human intervention during handling.

Another object of the present invention is to provide an automated package identification and measuring system which can sort the package after bar code data on the package has been read and captured by the system software.

Another object of the present invention is to provide an automated package identification and measuring system which can measure and weigh the package, eliminating the "guesstimating" often required by human operators.

Another object of the present invention is to provide an automated package identification and measuring system which enables exact weighing and measuring of packages, and thus minimizes wasted cargo space and more carrying capacity on every shipment, thereby allowing shippers to bill customers with greater precision, with fees keyed to package volume, shape, weight, and destination.

Another object of the present invention is to provide a novel method of automated package identification and measuring.

A further object of the present invention is to provide a novel way of and means for digitizing digital scan data while correlating laser scanning information.

A further object of the present invention is to provide a novel way of and means for decoding digital scan count data while correlating laser scanning information for use in various types of object tracking operations.

These and other objects of the present invention will become apparent hereinafter and in the Claims to Invention.

BRIEF DESCRIPTION OF THE DRAWINGS

For a more complete understanding of the present invention, the following Detailed Description of the Illustrative Embodiment should be read in conjunction in connection with the accompanying Drawings, wherein:

FIG. 1B is a first perspective view of the tunnel-type package indentification and measurement of the illustrative embodiment of the present invention;

FIG. 2C is a table setting for data specifying the position and orientation of the sixteen omni-directional holographic laser scanners mounted within the tunnel scanning subsystem of the illustrative embodiment of the invention, wherein the position of each single-disc holographic scanner is specified with respect to the center of the holographic scanning disc contained within each such scanning unit, and the position of each triple-disc holographic scanner is specified with respect to the center of the middle holographic scanning disc contained within each such scanning unit;

FIG. 3A1 is a perspective, partially cut-away view of the single-disc holographic laser scanning subsystem (e.g. indicated as L/F Corner #1, L/F Corner #2, L/B Corner #1, L/B Corner #2, R/F Corner #1, R/F Corner #2, R/B Corner #1 and R/B Corner #2 in FIG. 1B and the Scanner Positioning Table shown in FIG. 2C), mounted within the corners of the tunnel-type scanning system of the illustrative embodiment, showing the holographic scanning disc surrounded by one of its six beam folding mirrors, parabolic light collection mirrors, laser beam production modules, photodetectors, and analog and digital signal processing boards mounted on the optical bench of the subsystem;

FIG. 3A2 is a plan view of the single-disc holographic laser scanning subsystem employed in the tunnel scanning subsystem of the illustrative embodiment, showning the holographic scanning disc surrounded by six laser scanning stations comprising a beam folding mirror, parabolic light collection mirror, laser beam production module (employing a VLD), each of which is enclosed is a compact housing adapted for adjustable support by the scanner support framework employed in the tunnel scanning subsystem of the illustrative embodiment;

FIG. 3A3 is an cross-sectional view of the single-disc holographic laser scanning subsystem shown in FIG. 3A2, showing it holographic scanning disc rotatably supported by its scanning motor mouned on the optical bench of the subsystem;

FIG. 3A4 is a schematic representation of the layout of the volume-transmission type holographic optical element (HOEs) mounted between the glass support plates of the holographic scanning disc employed within the single-disc holographic scanning susbsystem employed within the tunnel scanning system of the illustrative embodiment;

FIGS. 3A5A through 3A5C, taken together, set forth a table showing the design parameters used to construct with the single-disc holographic scanning subsystem employed in the tunnel scanning system of the illustrative embodiment;

FIG. 3A6 is a schematic representation of the laser scanning pattern projected from the single-disc holographic laser scanning subsystem employed in the tunnel-type scanning system of the present invention;

FIGS. 3A7A through 3A7C, taken together, show the subcomponents confifgured together on the analog signal processing boards, decode signal processing boards and within the housing of the single-disc holographic laser scanning subsystems of the present invention;

FIG. 3A8A is an elevated view of the home pulse mark sensing module of the present invention deployed about each holographic scanning disc in the system of the present invention;

FIG. 3A8B is a plan view of the home pulse mark sensing module shown in FIG. 3A8A;

FIG. 3A8C is a schematic diagram of an analog signal processing circuit which can be used to implement the home-pulse detector employed in the holographic laser scanning subsystems of the present invention;

FIG. 3B1 is a plan view of the triple-disc holographic scanning subsystem (e.g. indicated as Top/Front, Top/Back, Left Side/Front, Left Side/Back, Right Side/Front and Right Side/Back in FIG. 1Band the Scanner Positioning Table shown in FIG. 2C), mounted on the top and sides of the tunnel-type scanning system of the illustrative embodiment, showing three holographic scanning discs mounted on an optical bench with 13.3 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3B2 is a schematic representation of the layout of the volume-transmission type holographic optical elements (HOEs) mounted between the glass support plates of each holographic scanning disc employed within the triple-disc holographic scanning subsystem shown in FIG. 3B1;

FIGS. 3B3 through 3B3B, taken together, set forth a table showing the design parameters used to construct with the each holographic scanning subsystem employed in the triple-disc holographic laser scanner shown in FIG. 3B1;

FIG. 3B4 is a schematic representation of the laser scanning pattern projected the single-disc holographic laser scanning subsystem employed in the triple-disc holographic laser scanner shown in FIG. 3B4, when none beam folding mirrors associated therewith are angularly located or rotated;

FIG. 3B5 is a table settting forth the angular location and rotatation of each beam folding mirror in the center and end-located holographic scanning subsytems employed in the triple-disc holographic laser scanner shown in FIG. 3B4;

FIG. 3B6 is a schematic representation of the laser scanning pattern projected from center holographic laser scanning subsystem employed in the triple-disc holographic laser scanner shown in FIG. 3B4, wherein each of beam folding mirrors associated therewith are angularly located and rotated as shown in the table of FIG. 3B5, to achieve the desired scanning pattern;

FIG. 3B7 is a schematic representation of the laser scanning pattern projected from ended-located holographic laser scanning subsystem employed in the triple-disc holographic laser scanner shown in FIG. 3B4, wherein each of beam folding mirrors associated therewith are angularly located and rotated to achieve the desired scanning pattern;

FIG. 3B8 is a schematic representation of the laser scanning pattern projected from the triple-disc holographic laser scanner shown in FIG. 3B4;

FIG. 3C1 is a plan view of the triple-disc holographic scanning subsystem (e.g. indicated as Front and Back in FIG. 1B and the Scanner Positioning Table shown in FIG. 2C), mounted on the top of the tunnel-type scanning system of the illustrative embodiment, showing three holographic scanning discs mounted on an optical bench with 14.0 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3C2 is a schematic representation of the laser scanning pattern projected from the triple-disc holographic laser scanner shown in FIG. 3C1;

FIG. 3D1 is an exploded diagram of the fixed laser projection scanner mounted beneath the conveyor belt surface of the system, and between the first and second conveyor belt platforms of the conveyor subsystem employed in the tunning scanning system of the illustrative embodiment of the present invention, showing the optical bench upon which eight fixed projection-type laser scanning subsystems are mounted and enclosed within a scanner housing having a rugged glass scanning window bridging the gap provided between the first and second conveyor belt platforms;

FIG. 3D2 is a perspective diagram of the projection-type laser scanning subsystem mounted within the bottom-mounted fixed projection scanner shown in FIG. 3D1, showing an eight-sided polygon scanning element rotatably mounted closely adjacent a stationary mirror array comprised of four planar mirrors, and a light collecting mirror being centrally mounted for focusing light onto a photodetector disposed slightly beyond the polygon scanning element;

FIG. 3D3 is a plan view of the eight fixed-projection laser scanning subsystems mounted on the optical bench of the bottom-mounted laser scanner shown in FIG. 3D1;

FIG. 3D4 is a schematic representation of the partial scanning pattern produced by the eight-sided polygon scanning element and two stationary mirrors mounted adjacent the central plane of each fixed-projection laser scanning subsystem mounted on the optical bench of the bottom-mounted laser scanner shown in FIG. 3D1;

FIG. 3D5 is a schematic representation of the partial scanning pattern produced by the eight-sided polygon scanning element and two outer stationary mirrors mounted adjacent the two inner-located stationary mirrors in each fixed-projection laser scanning subsystem mounted on the optical bench of the bottom-mounted laser scanner shown in FIG. 3D1;

FIG. 3D6 is a schematic representation of the complete scanning pattern produced by the eight-sided polygon scanning element and four stationary mirrors mounted about the central plane of each fixed-projection laser scanning subsystem mounted on the optical bench of the bottom-mounted laser scanner shown in FIG. 3D1;

FIG. 3D7 is a schematic representation of the resultant (collective) omni-directional scanning pattern produced through the conveyor mounted scanning window, by the eight fixed-projection laser scanning subsystems mounted on the optical bench of the bottom-mounted laser scanner shown in FIG. 3D1;

FIG. 4 is a schematic block diagram illustrating that the holographic and fixed-projection laser scanning subsystems, the package dimensioning/measurement subsystem, package velocity and length measurement subsystem, the package-in-tunnel indication subsytem, the package-out-of-tunnel subsystem, the package weighing-in-motion subsytem, the data-element queuing, handling and processing subsystem, the input/output port multiplier subsystem, and the conveyor belt control subsystem employed integrated together within the automated tunnel scanning package indentification and measurement system of the illustrative embodiment of the present invention;

FIG. 5A is a schematic diagram showing the directions of omnidirectional scanning provided in the X-Y plane of the 3-D scanning volume of tunnel scanning system hereof, by the Front and Back holographic laser scanning subsystems, and bottom-mounted fixed projection scanning subsystem employed in the tunnel-type scanning system of the present invention;

FIG. 6 is a schematic diagram showing the direction of omni-directional scanning provided in the X-Y plane of the 3-D scanning volume of tunnel scanning system hereof, by the Left Side Front, Left Side Back, Right Side Front and Right Side Back holographic laser scanning subsystems employed in the tunnel-type scanning system of the illustrative embodiment;

FIG. 7 is a schematic diagram showing the direction of omni-directional scanning provided in the Y-Z plane of the 3-D scanning volume of tunnel scanning system hereof, by the Front and Back holographic laser scanning subsystems employed in the tunnel-type scanning system of the illustrative embodiment;

FIG. 8A is a schematic diagram showing the direction of omni-directional scanning provided in the Y-Z plane of the 3-D scanning volume of tunnel scanning system hereof, by the holographic laser scanning subsystems (indicated by R/B Corner #1, R/B Corner #2, L/F Corner #1 and R/B Corner #2) employed in the tunnel-type scanning system of the illustrative embodiment;

FIG. 8B is a schematic diagram showing the direction of omni-directional scanning provided in the X-Y plane of the 3-D scanning volume of tunnel scanning system hereof, by the holographic laser scanning subsystems (indicated by R/B Corner #1, R/B Corner #2, R/F Corner #1 and R/B Corner

Figure 1:
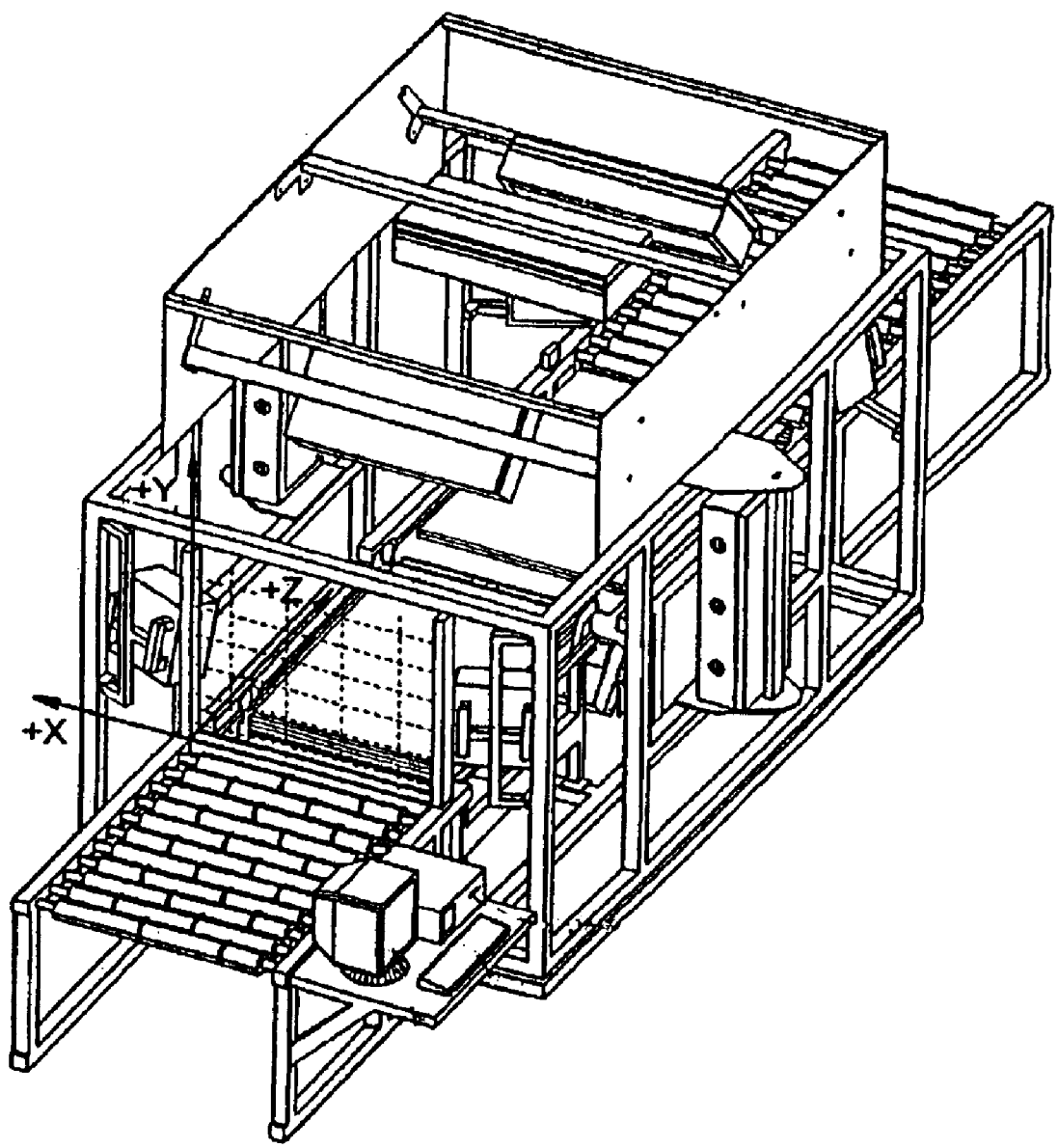
FIG. 1 is a perspective view of the automated tunnel-type laser scanning package indentification and measurement (e.g. dimensioning and weighing) system of the present invention.
Figure 1A:
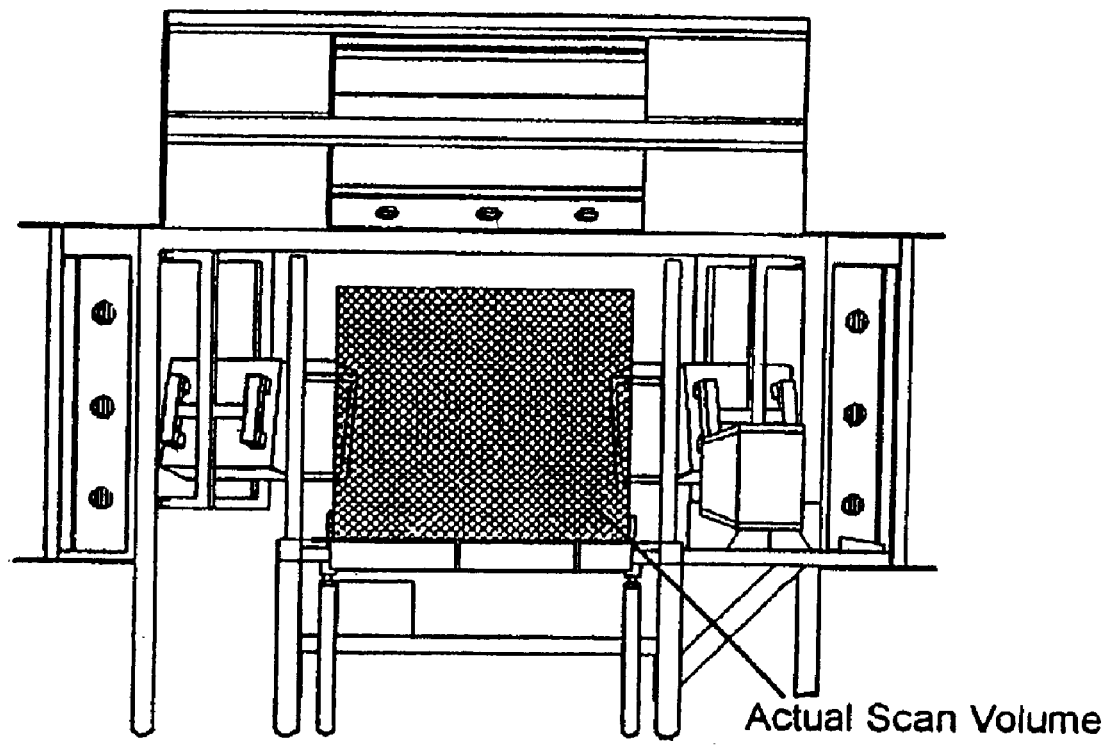
FIG. 1A is an end elevated view of the system shown in FIG. 1.
Figure 2A:
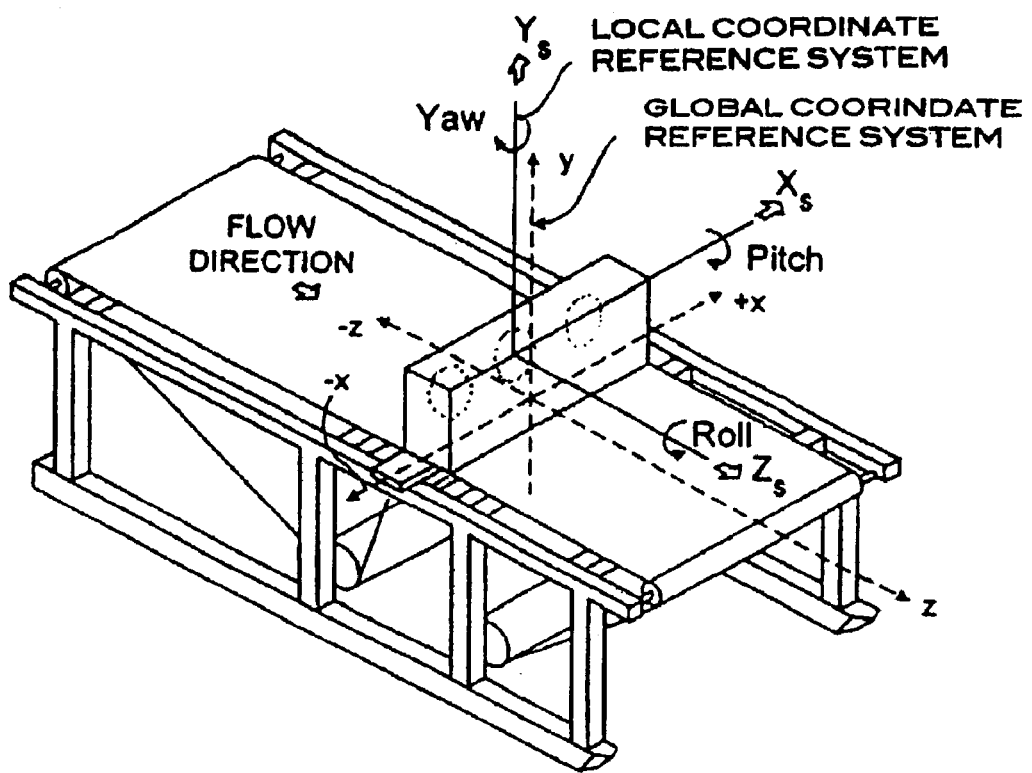
FIG. 2A is a perspective view of the split-conveyor subsystem removed from scanner support framework of the system, showing a coordinate reference framework symbollically embedded within the conveyor subsystem and shown with graphical indications describing the directions of yaw, pitch and roll of each triple-scanning disc holographic scanner supported from the scanner support framework of the tunnel scanning system shown in FIGS. 1 and 1A.
Figure 2B:
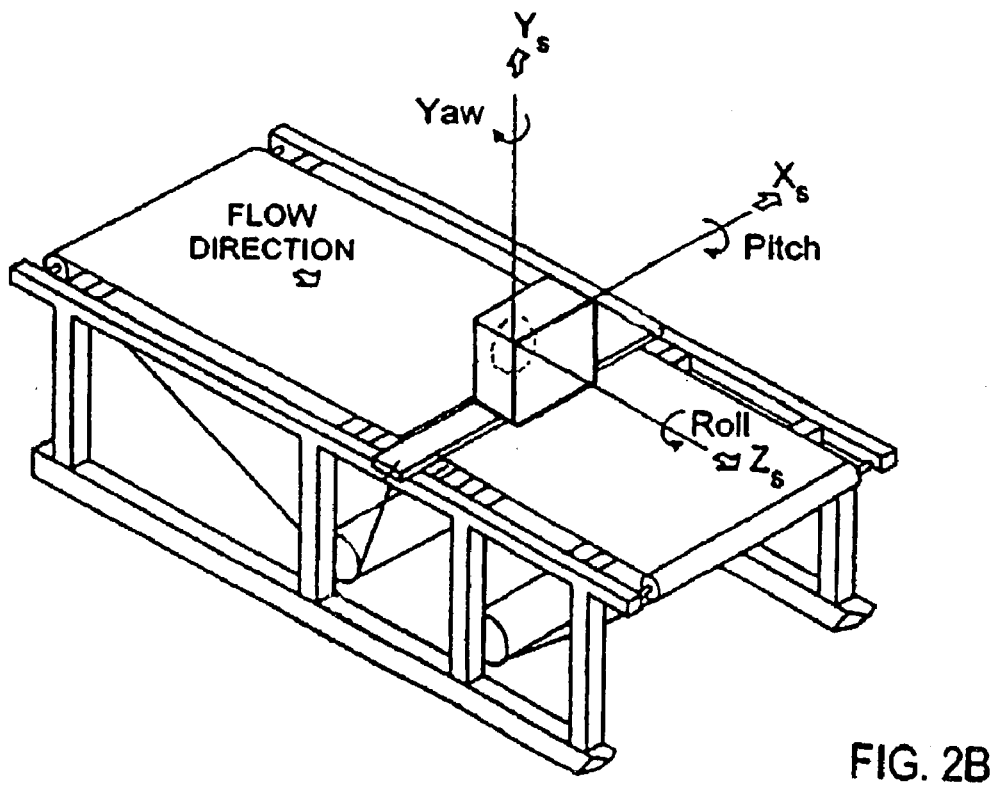
FIG. 2B is a perspective view of the split-conveyor subsystem removed from scanner support framework of the package indentification and measurement system, showing a coordinate reference framework symbollically embedded within the conveyor system and shown with graphical indications describing the directions of yaw, pitch and roll of each single-scanning disc holographic scanner supported from the scanner support framework of the tunnel scanning subsystem shown in FIGS. 1 and 1A.
Figure 4:
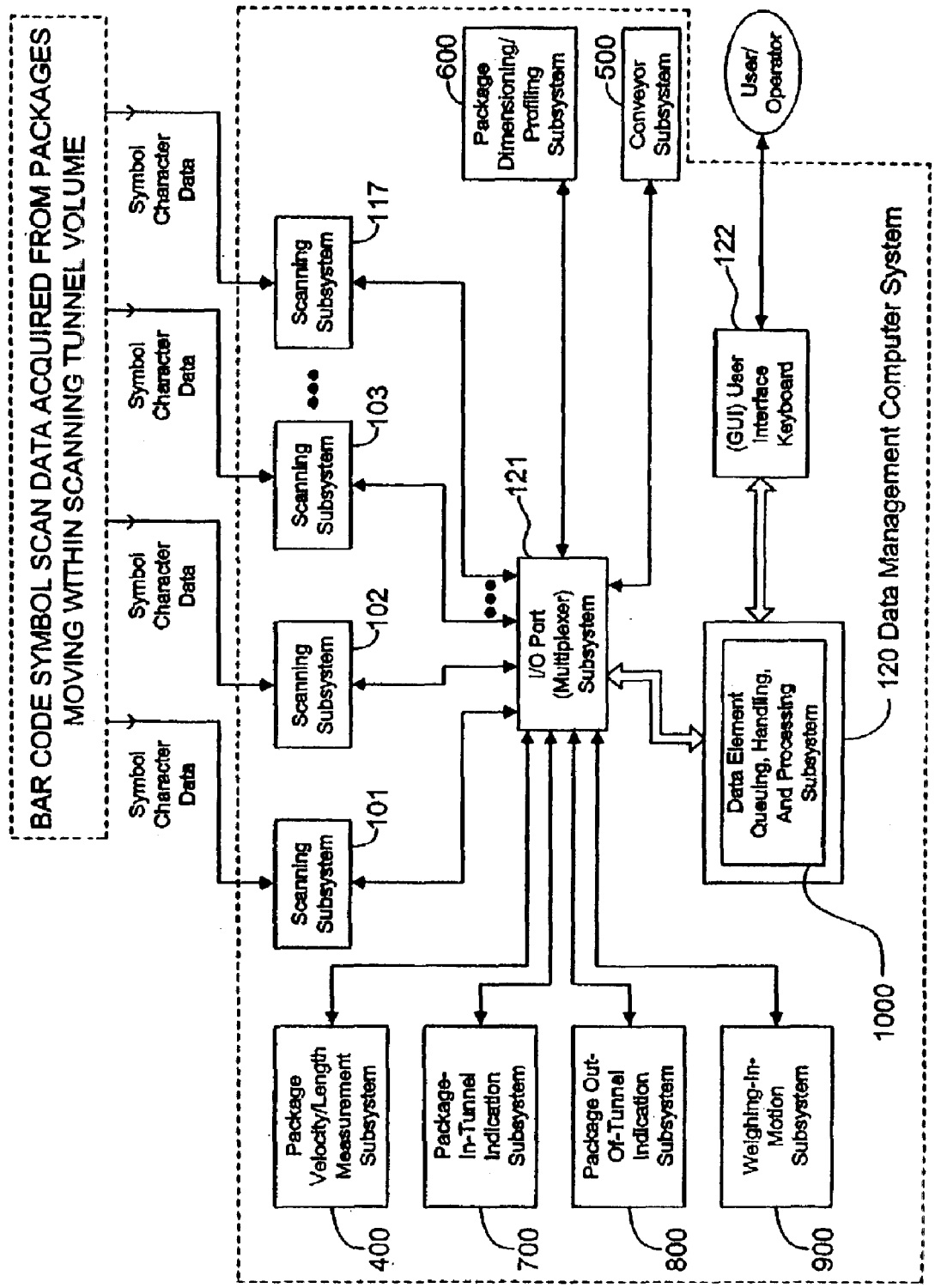
Figure 9A:
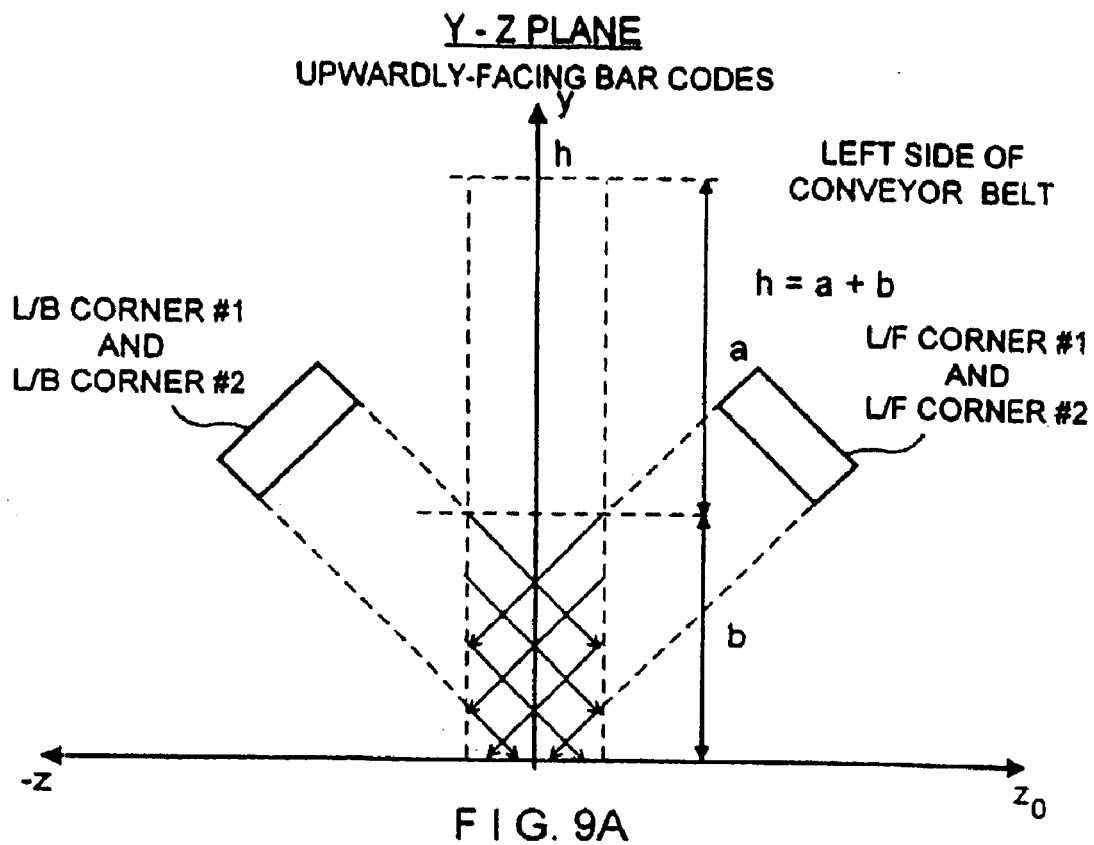
Figure 9B:
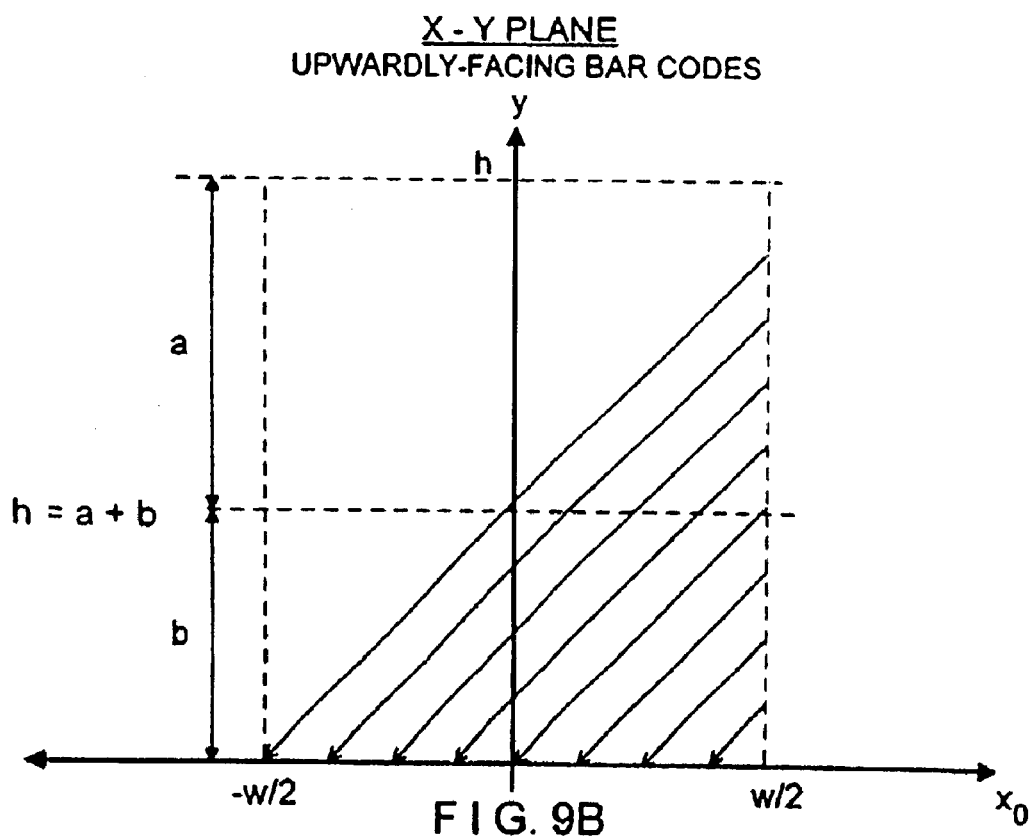
Figure 10:
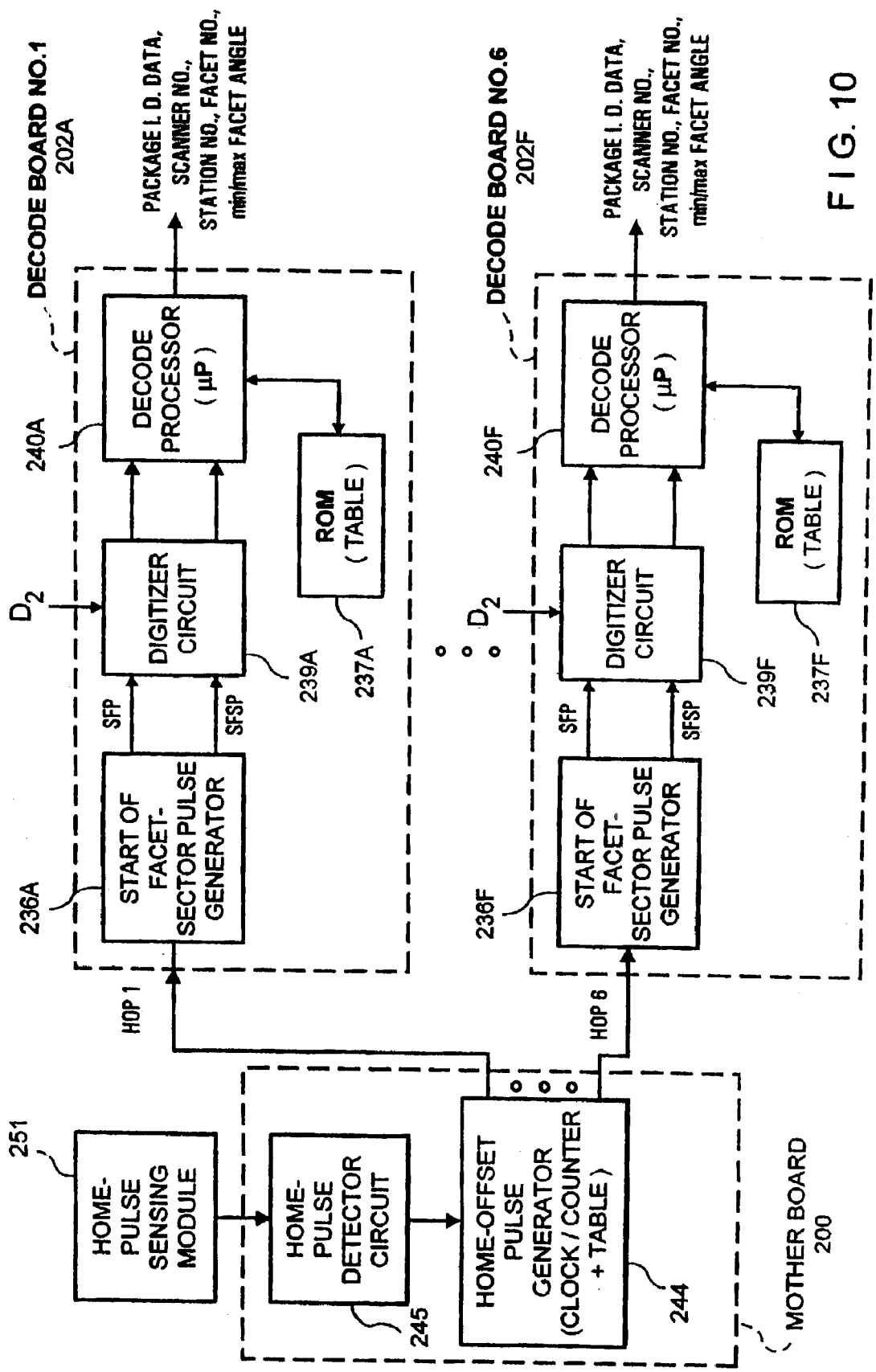
Figure 10C:
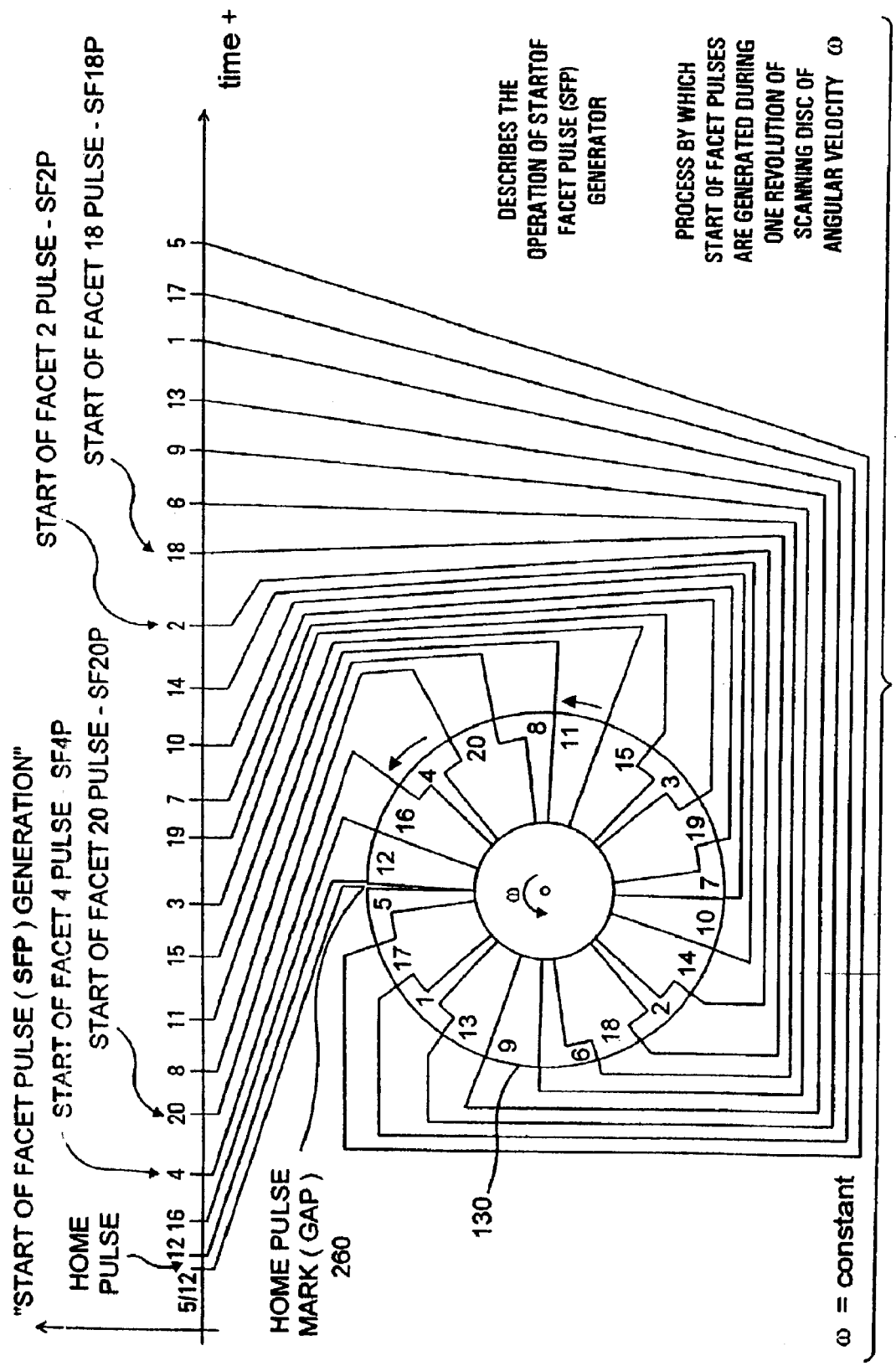
Figure 10F:
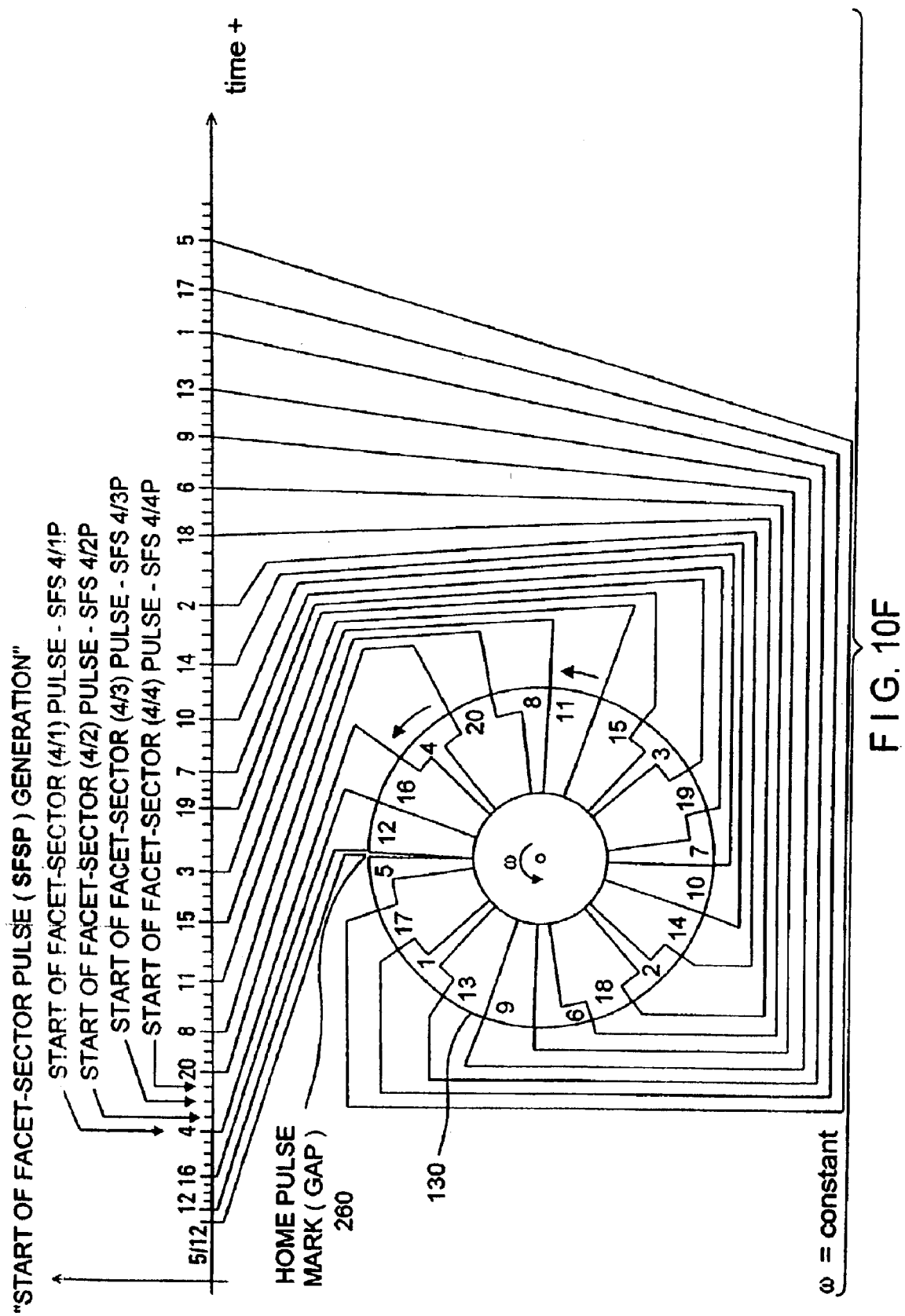
Figure 11B:
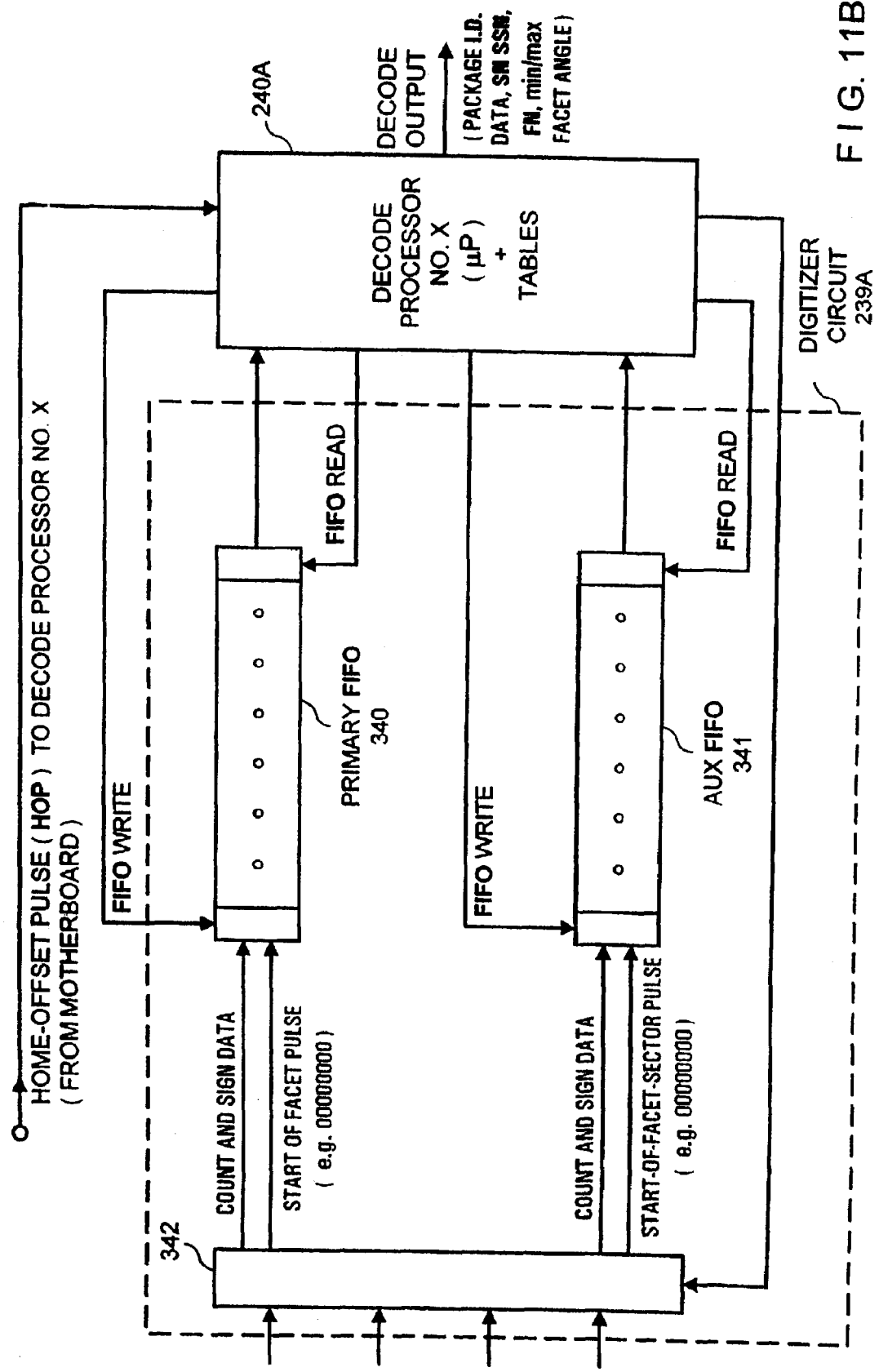
Figure 11E:
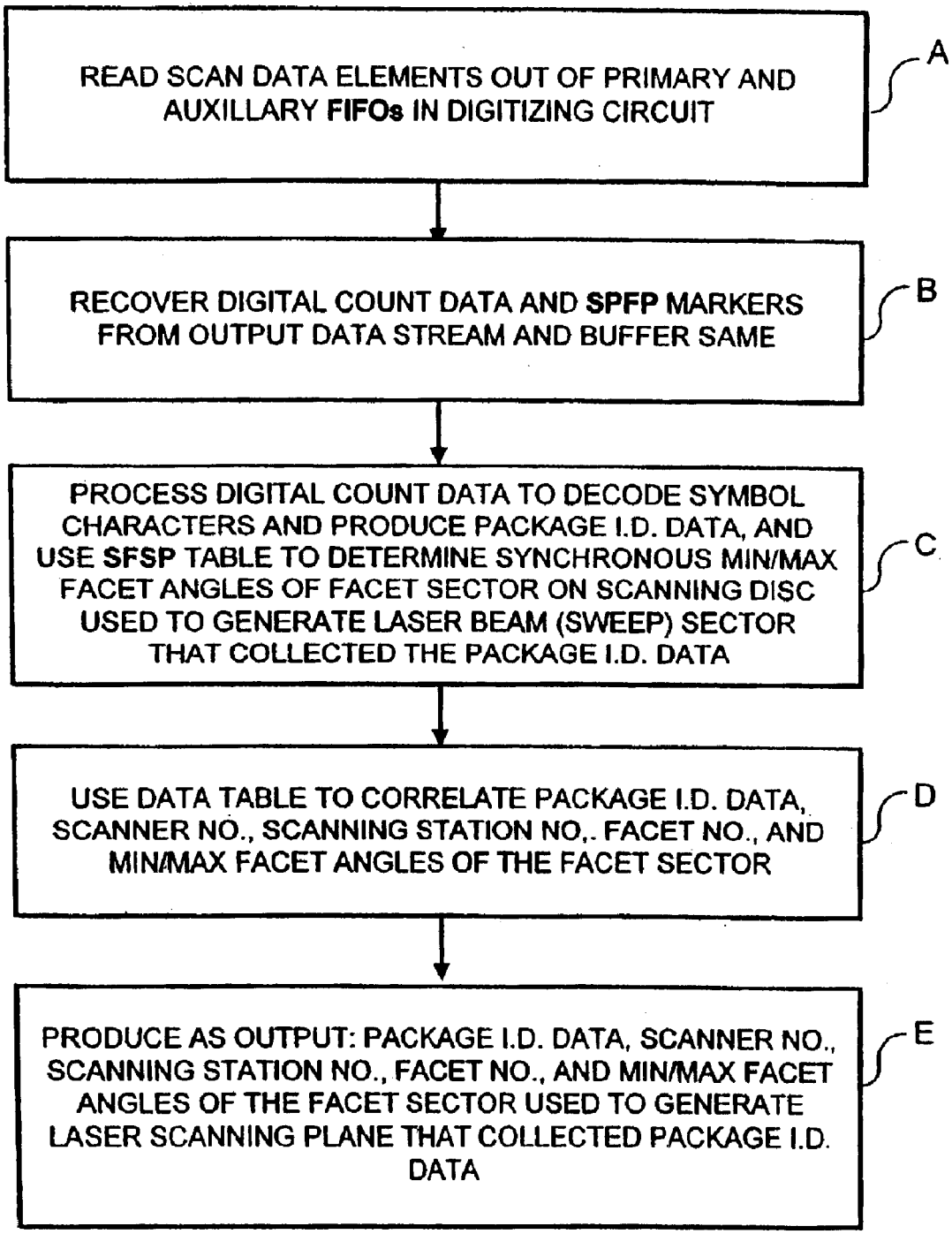
Figure 12:
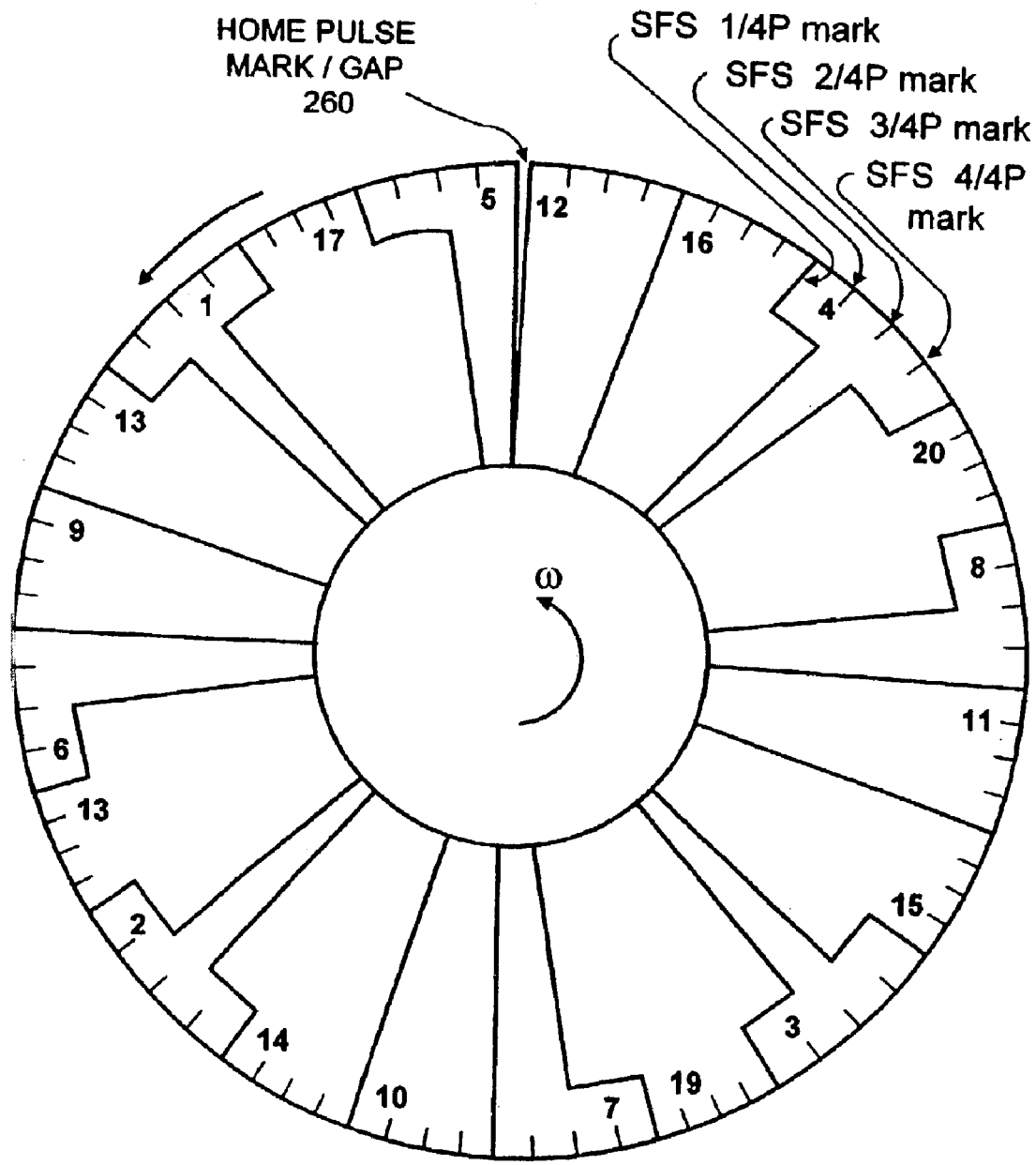
Figure 13:
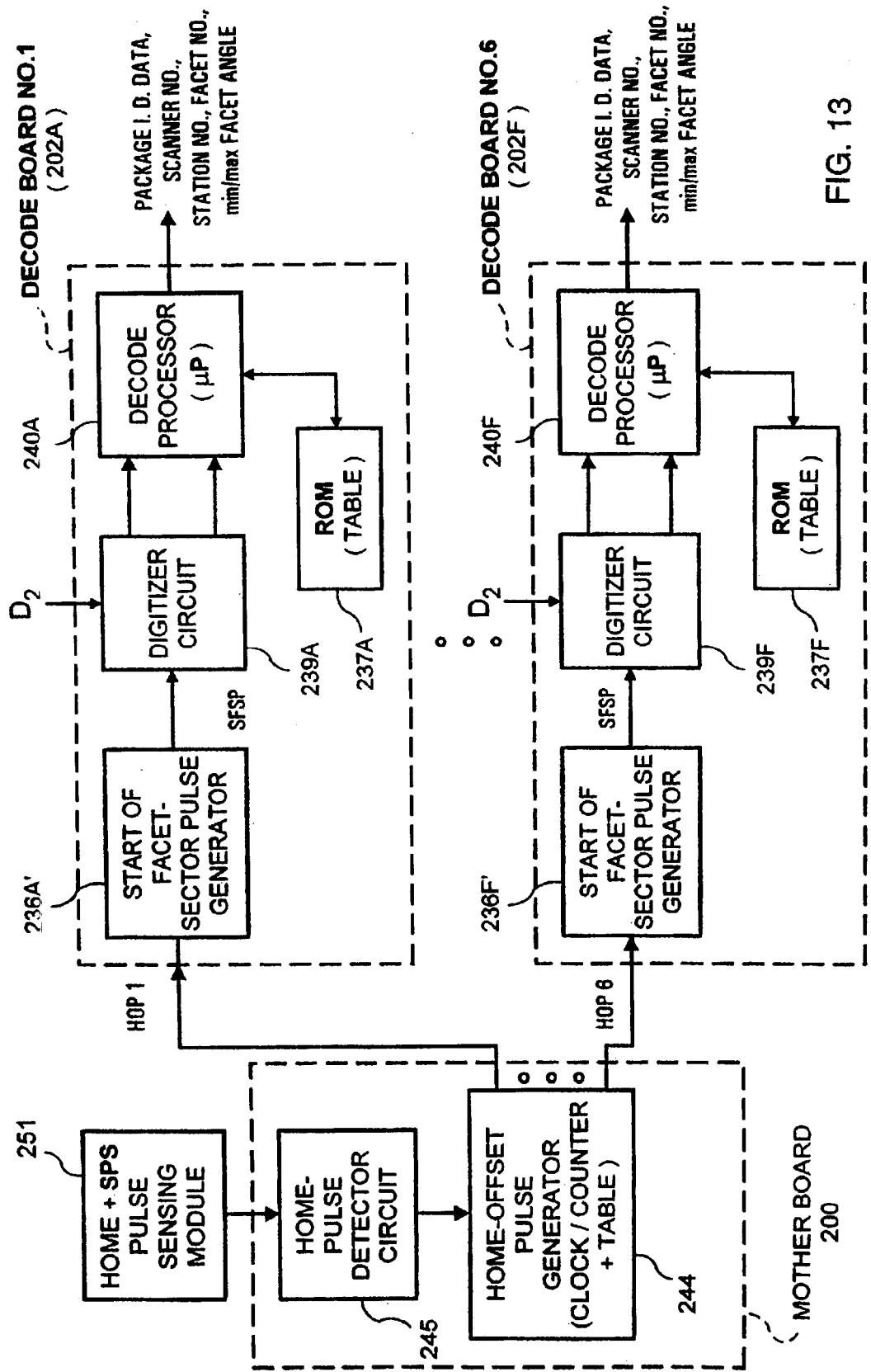
Figure 13A:
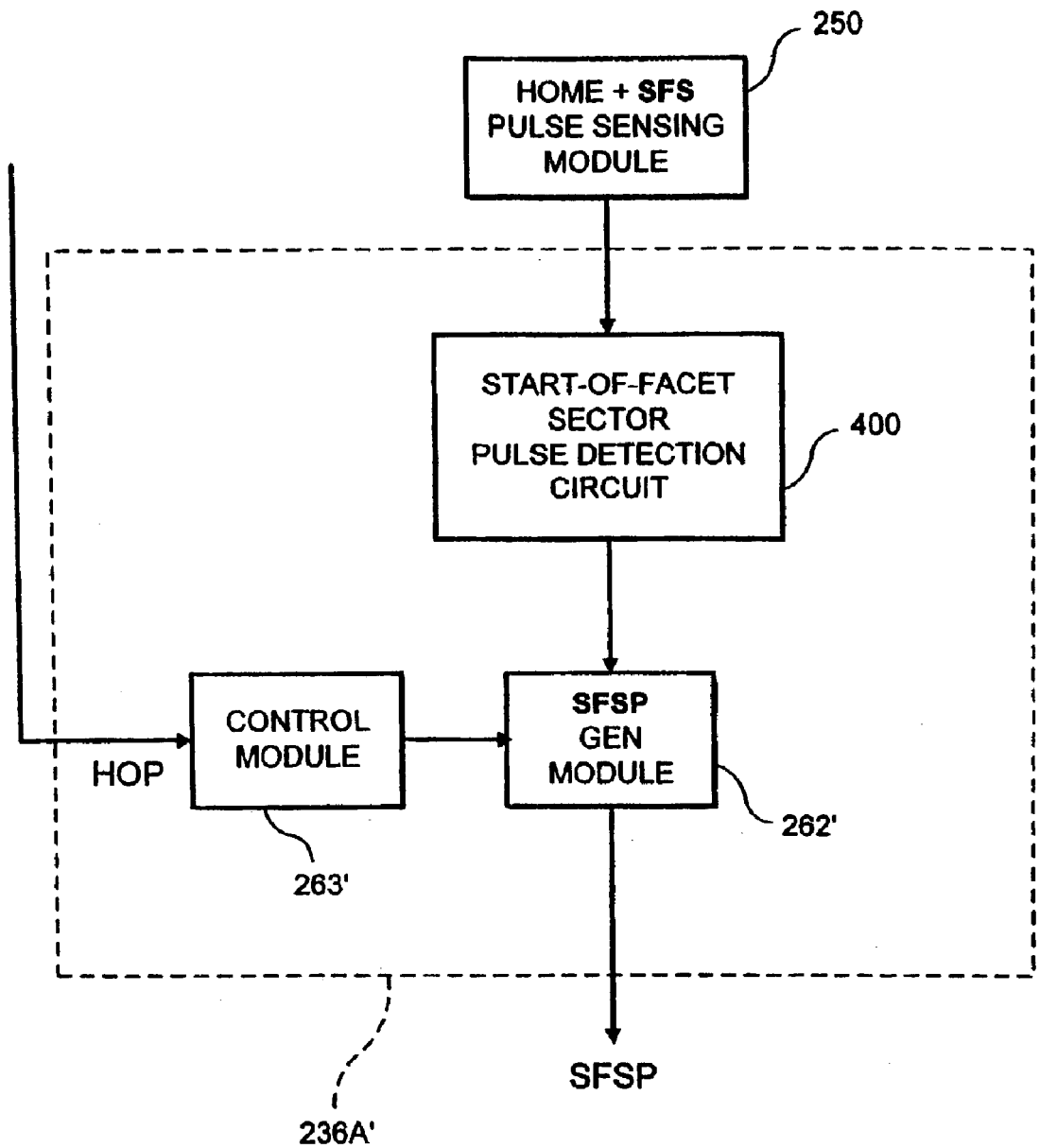
Figure 13C:
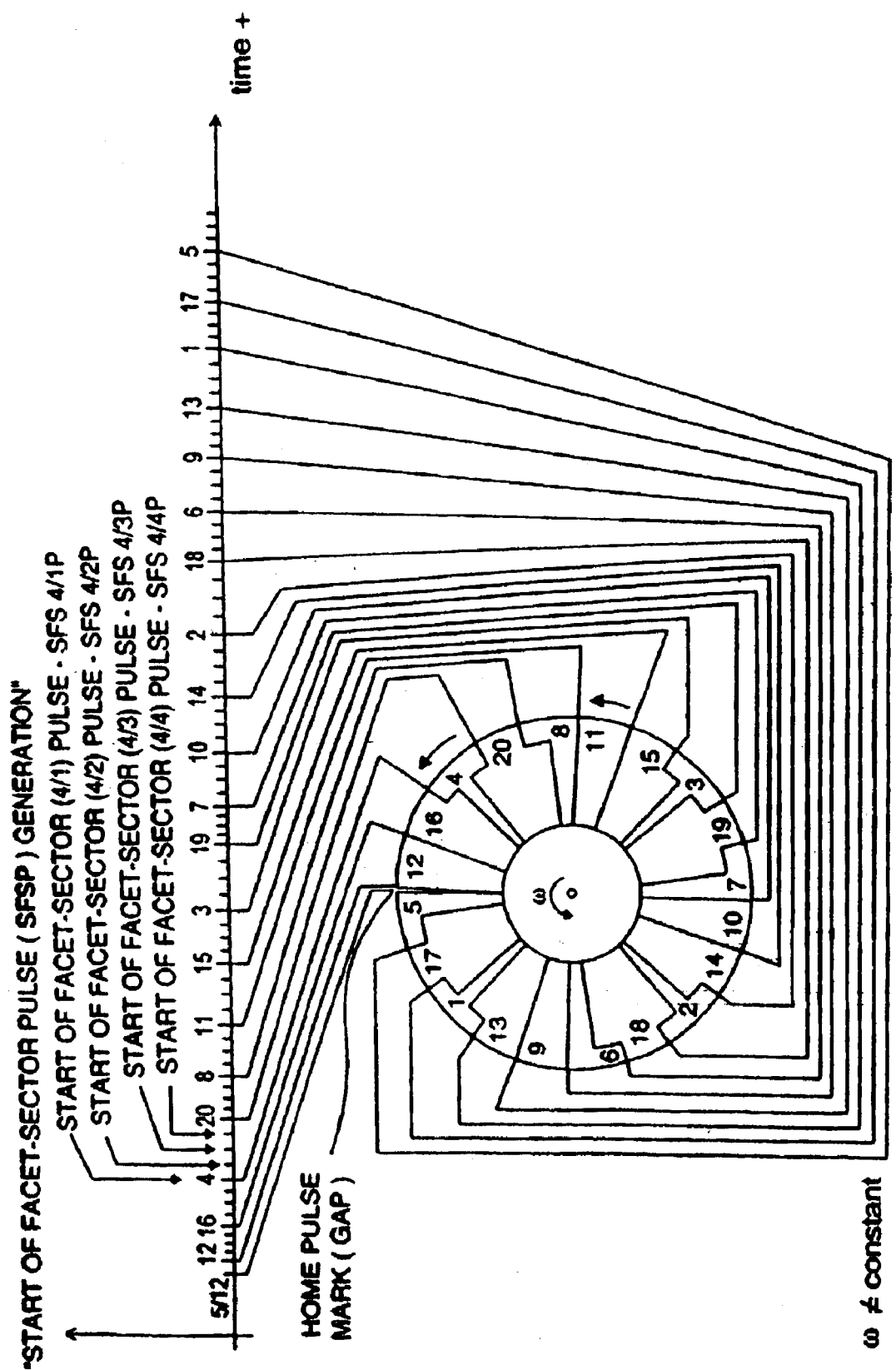
Figure 14B:
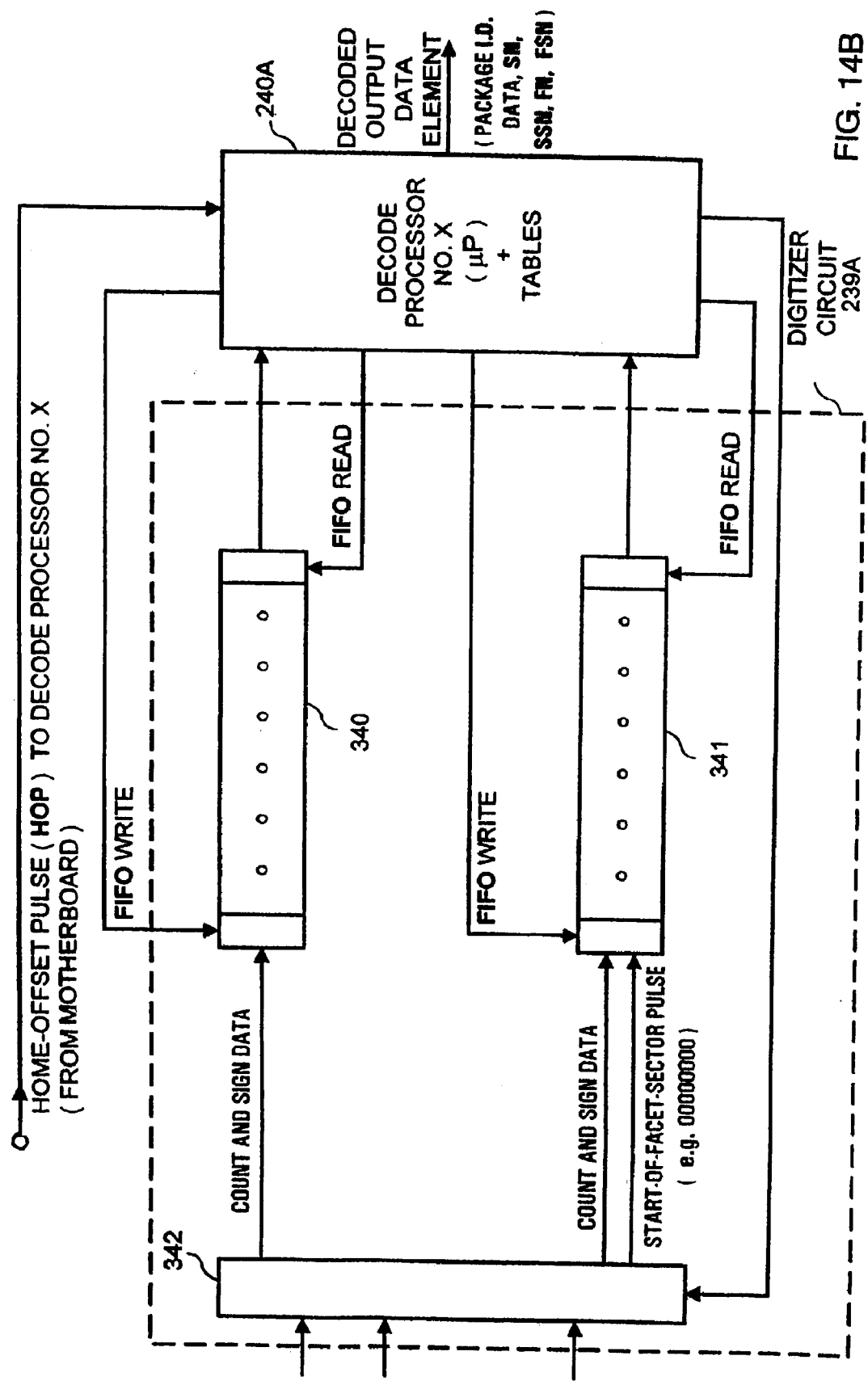
Figure 14D:
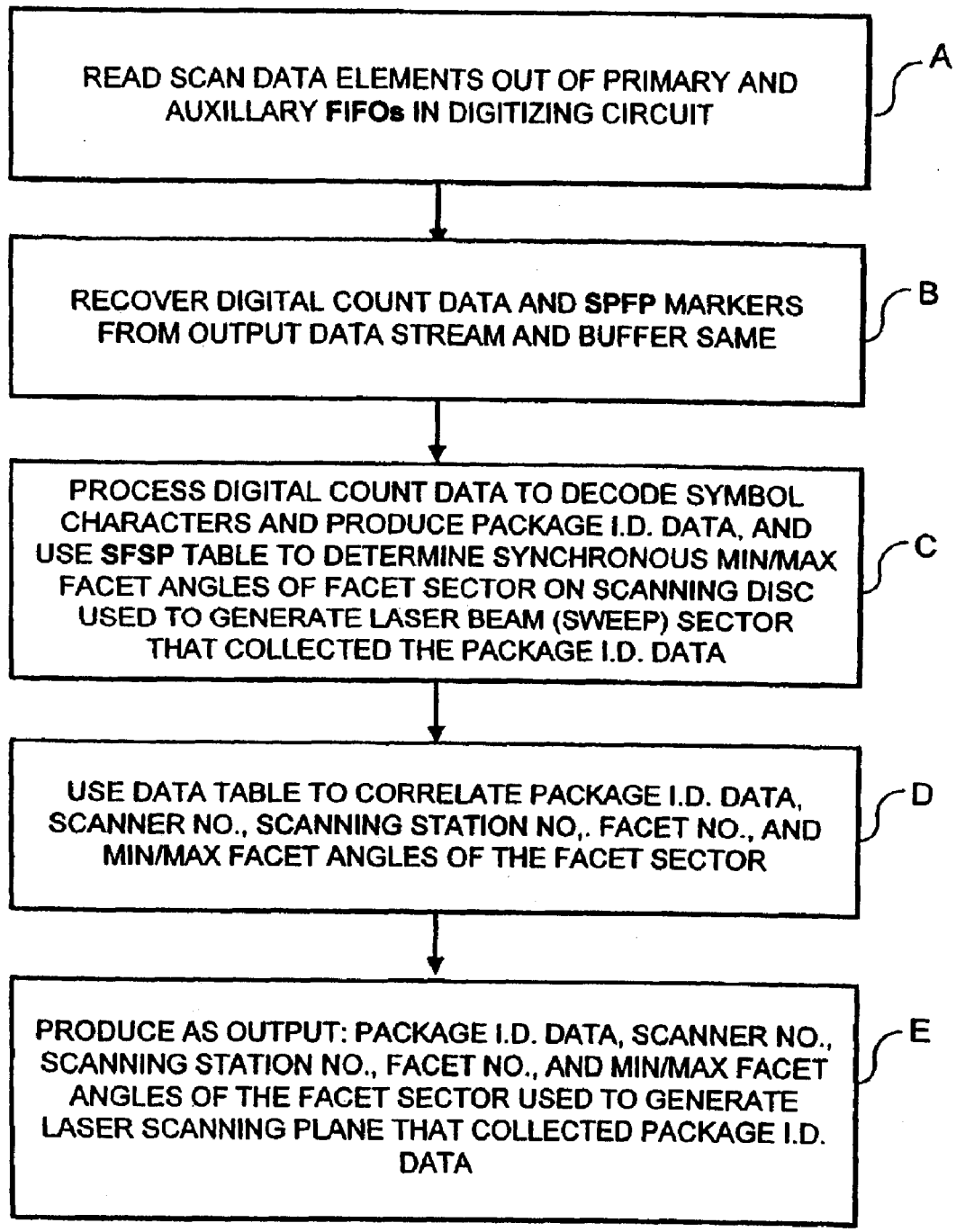
Figure 15:
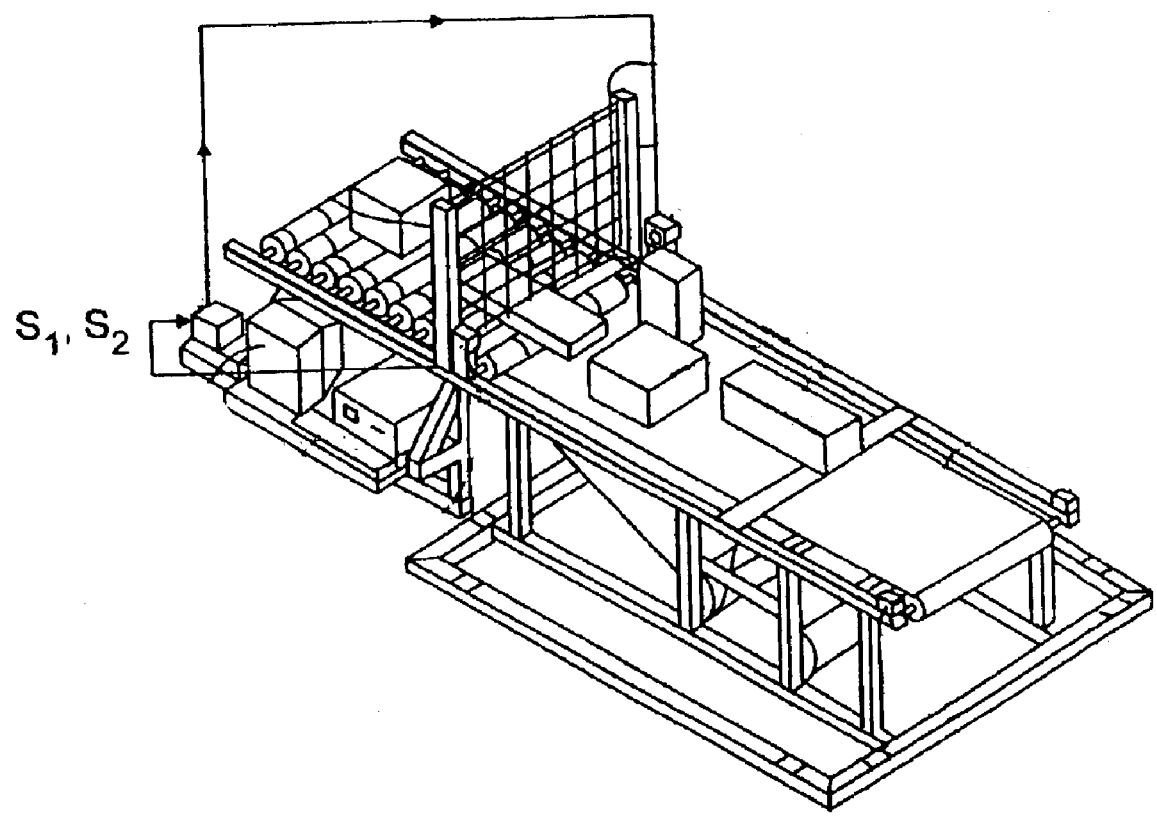
Figure 15B:
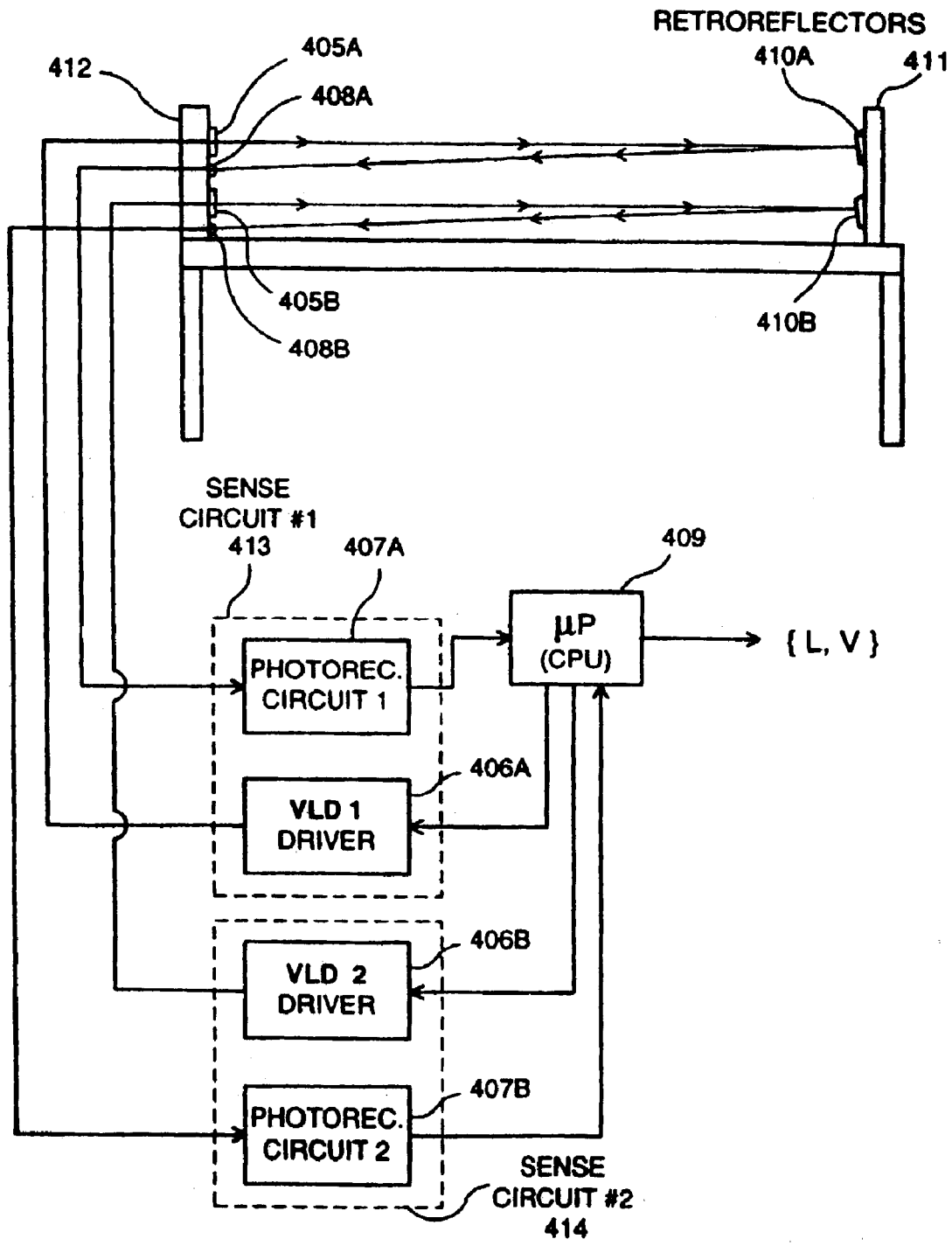
Figure 16:
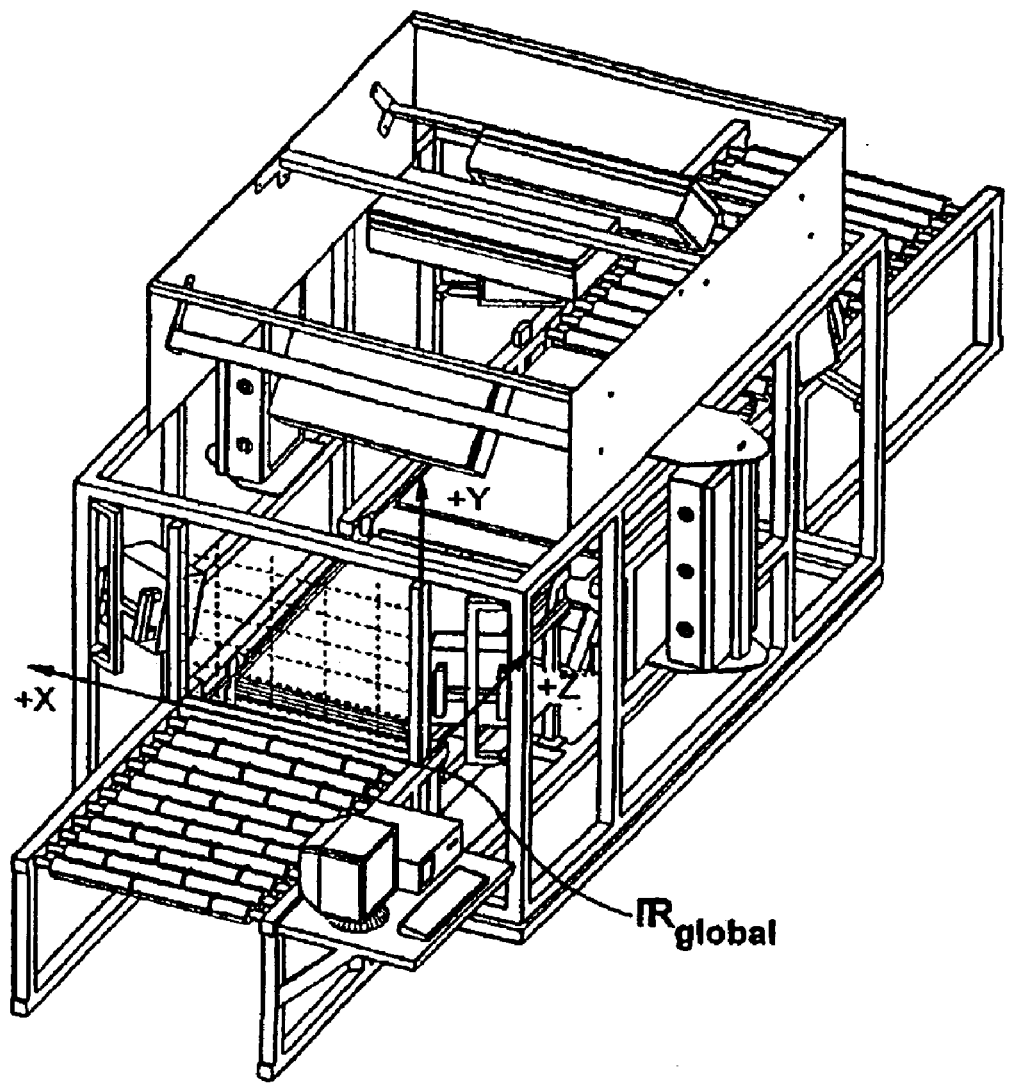
Figure 17A:
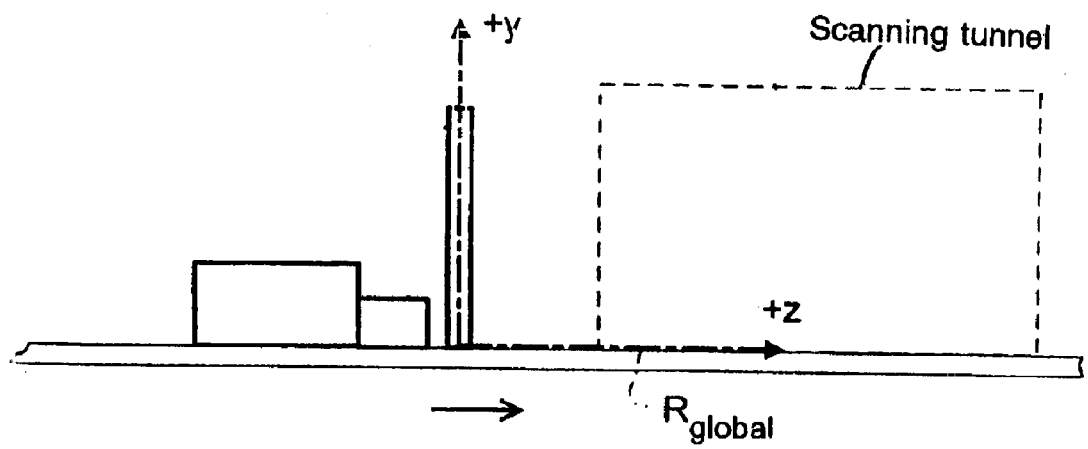
Figure 17B:
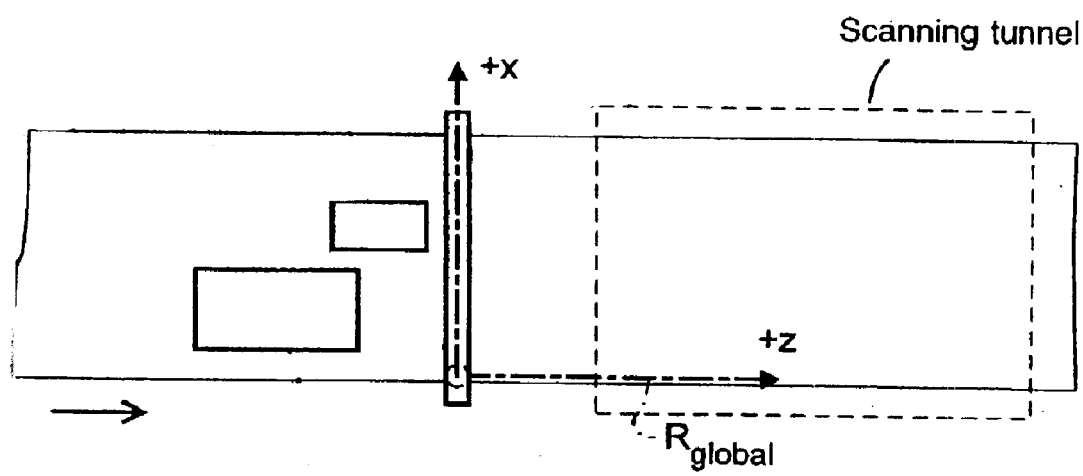
Figure 17C:
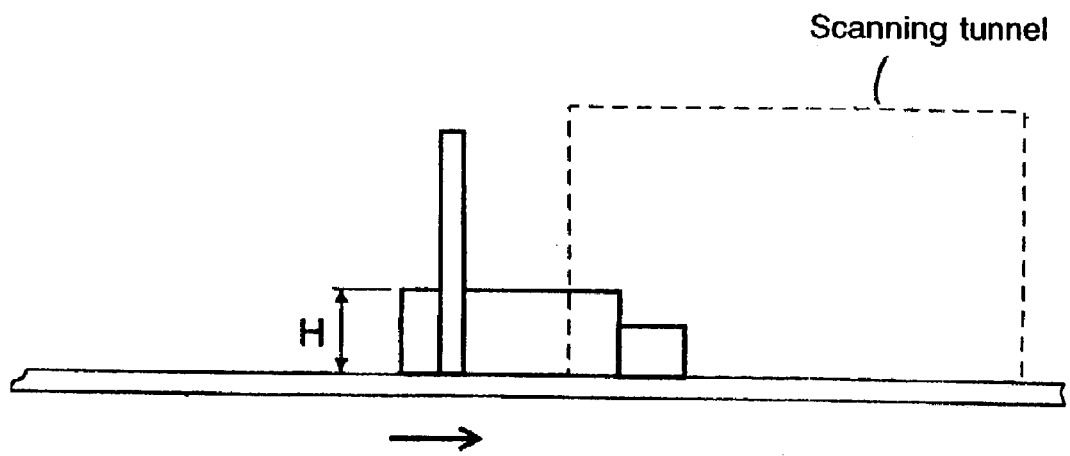
Figure 19:
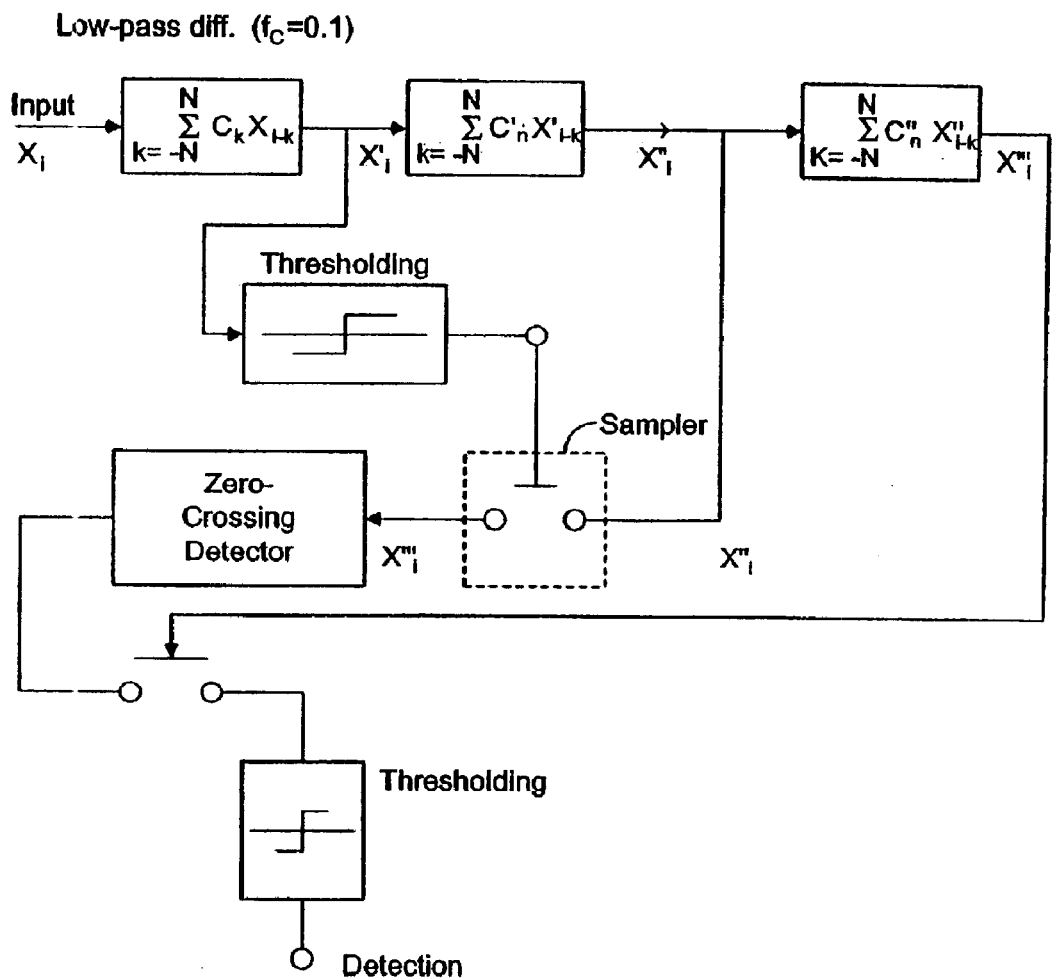
Figure 21:
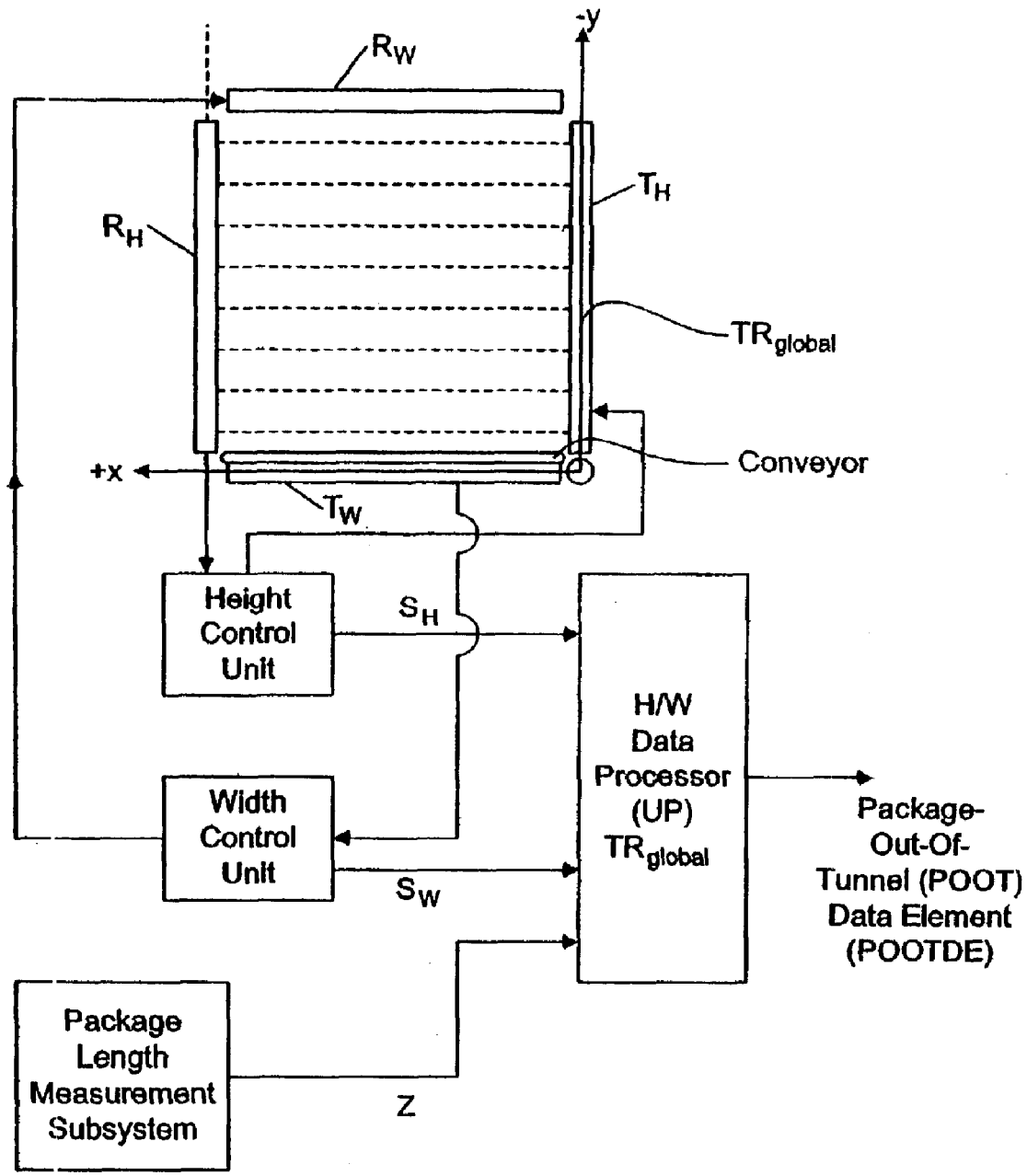
Figure 22B:
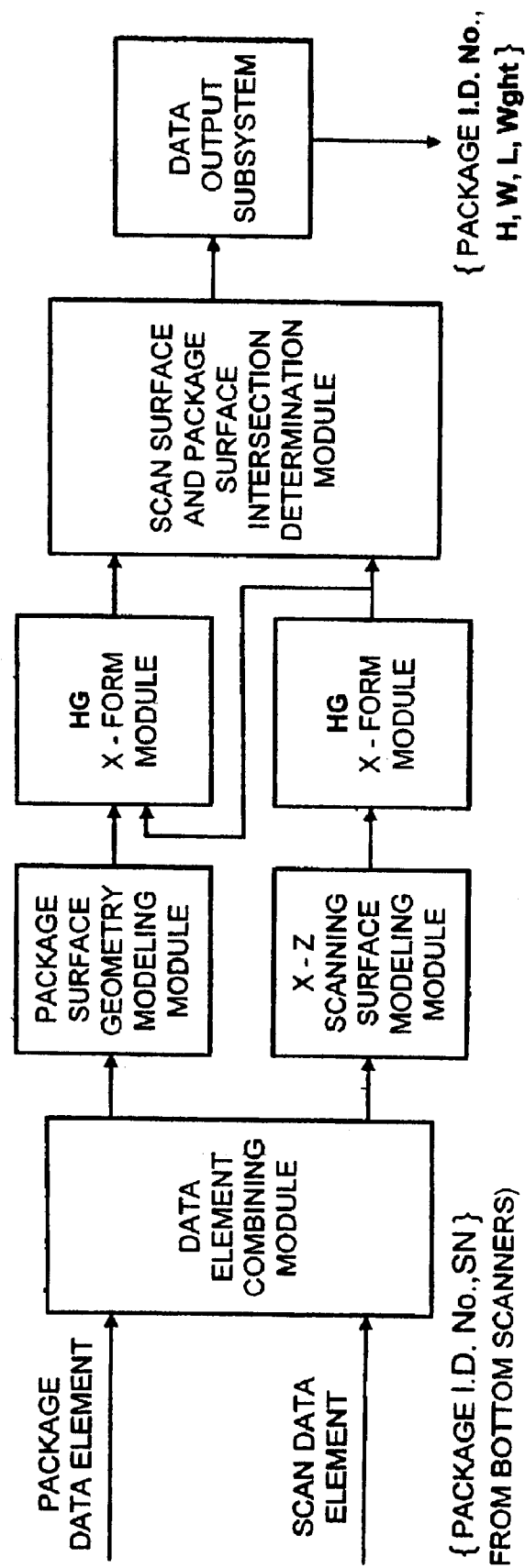
Figure 24:
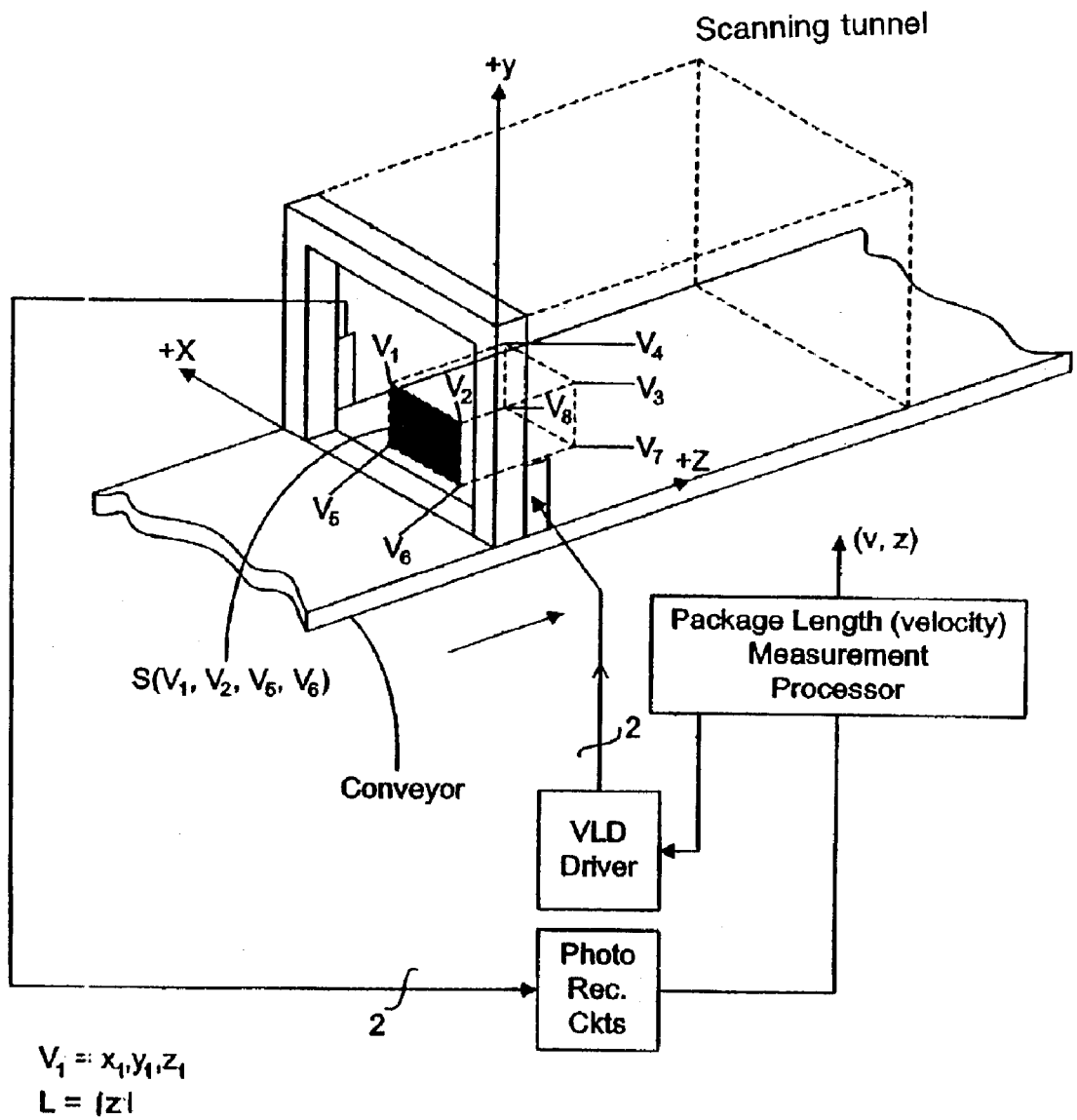
Figure 25A:
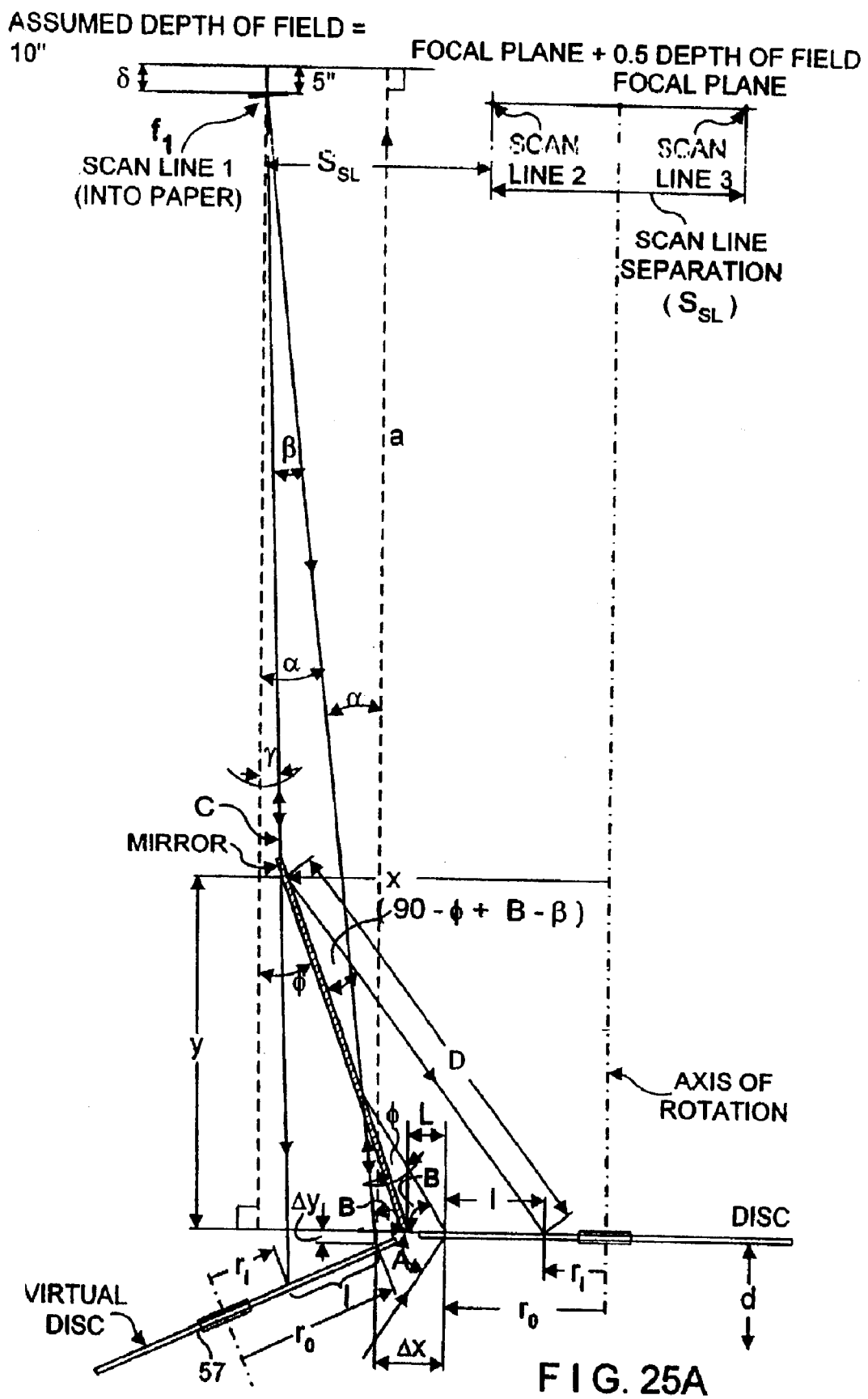
Figure 26:
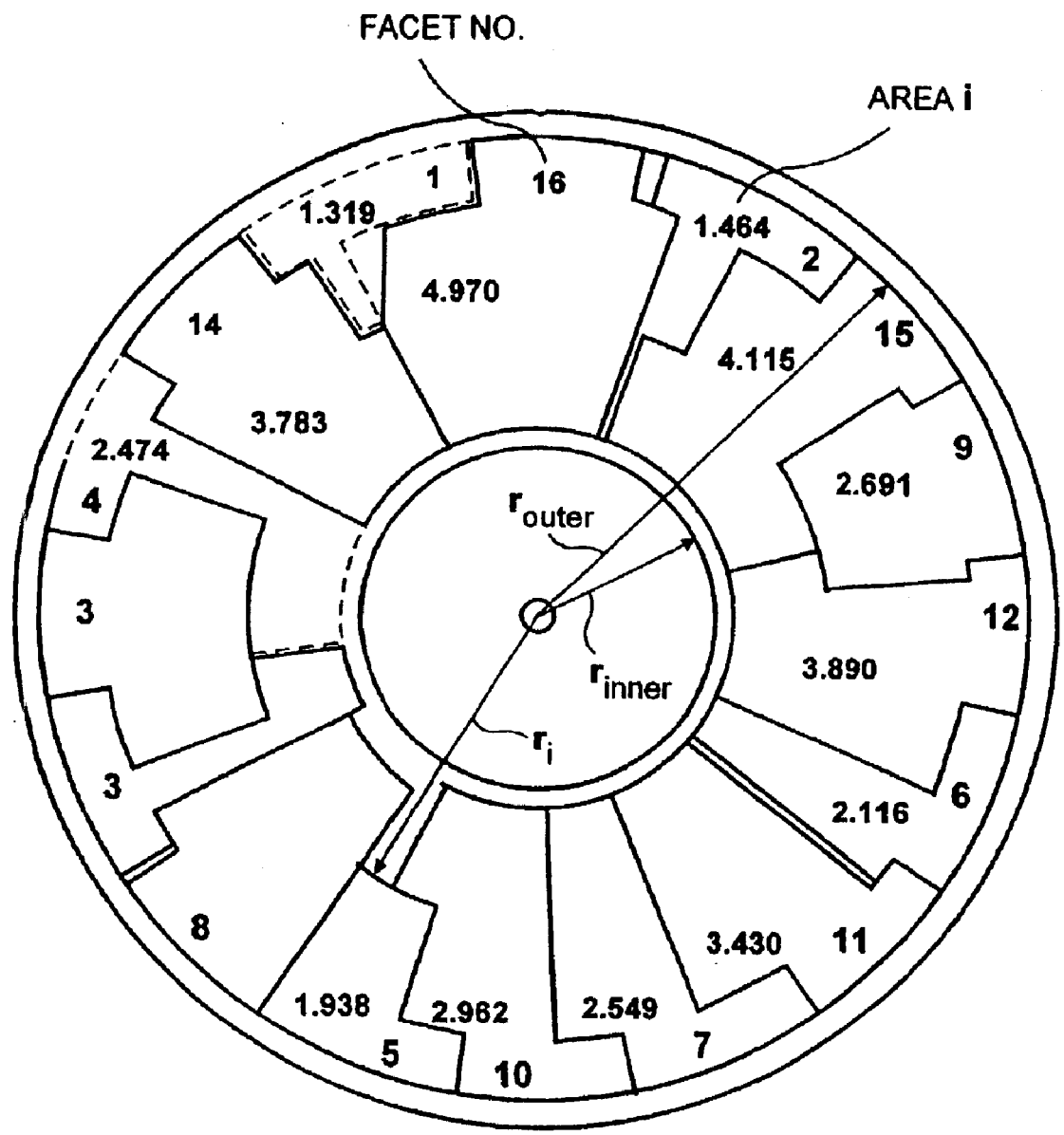
Figure 28:
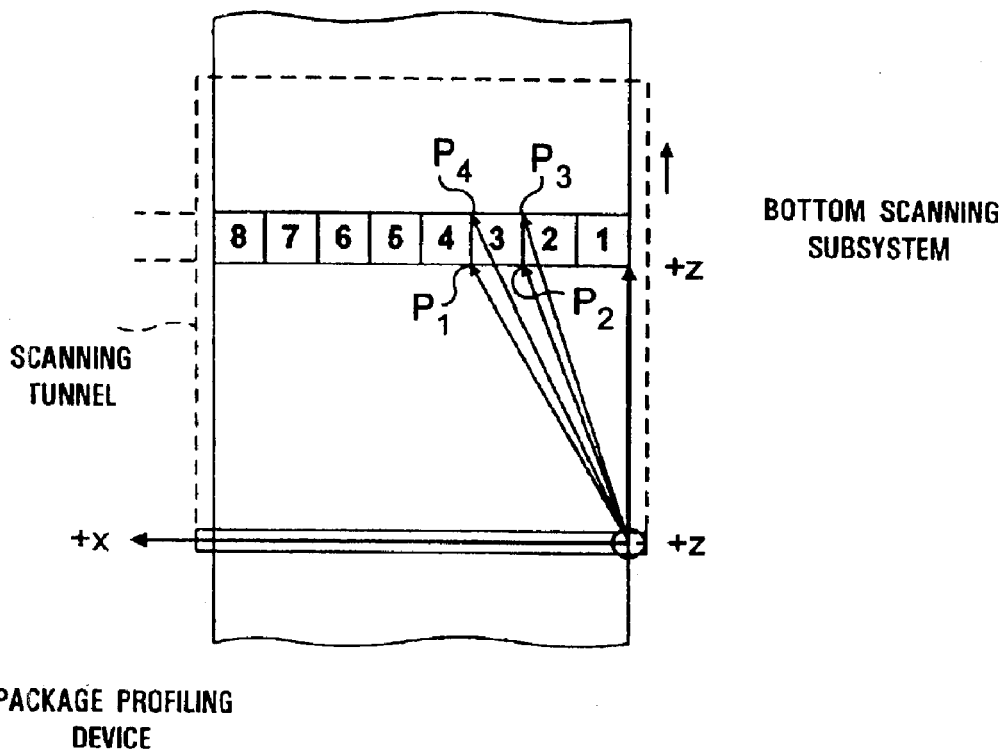
Figure 29:
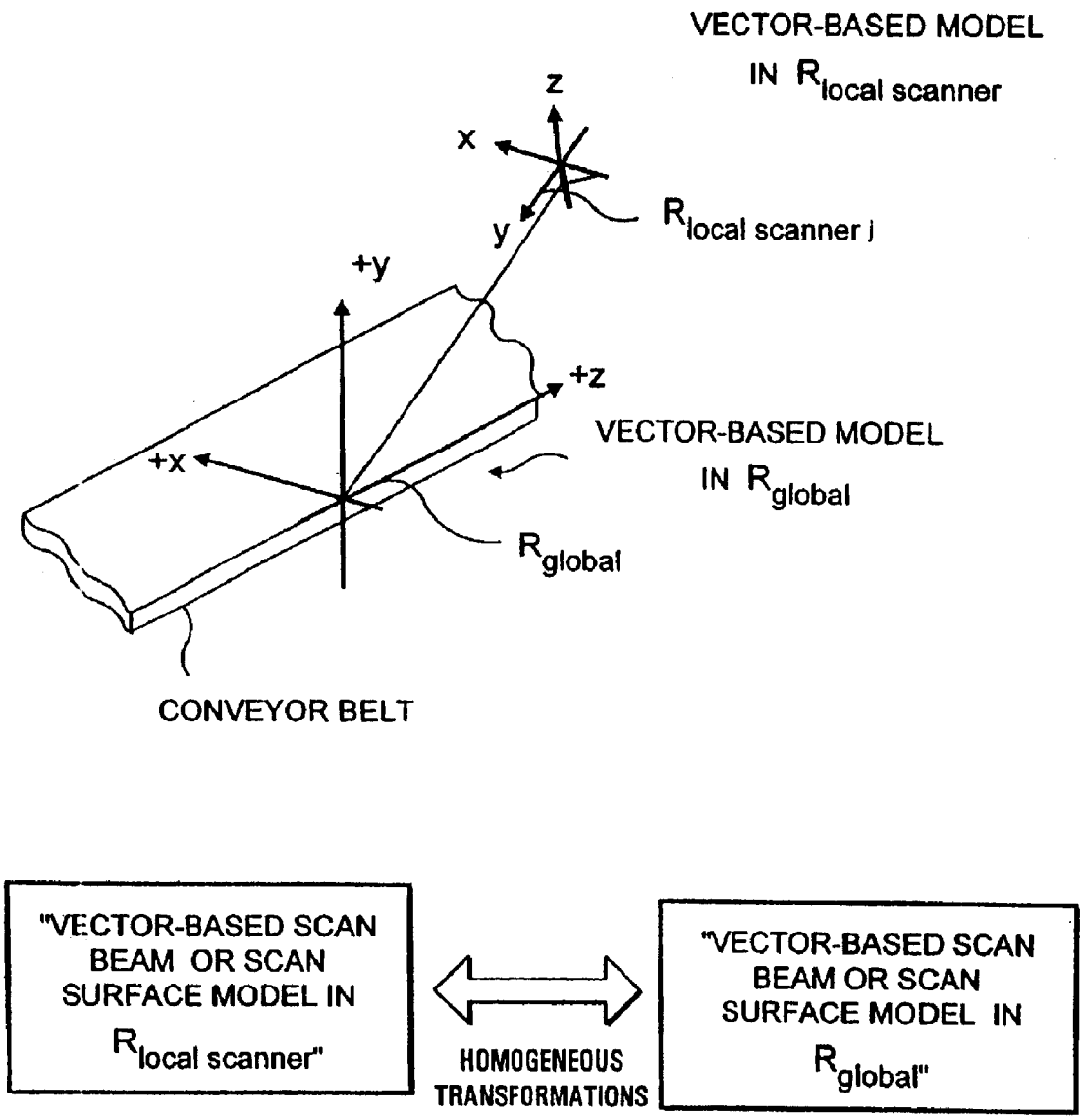
Figure 30:
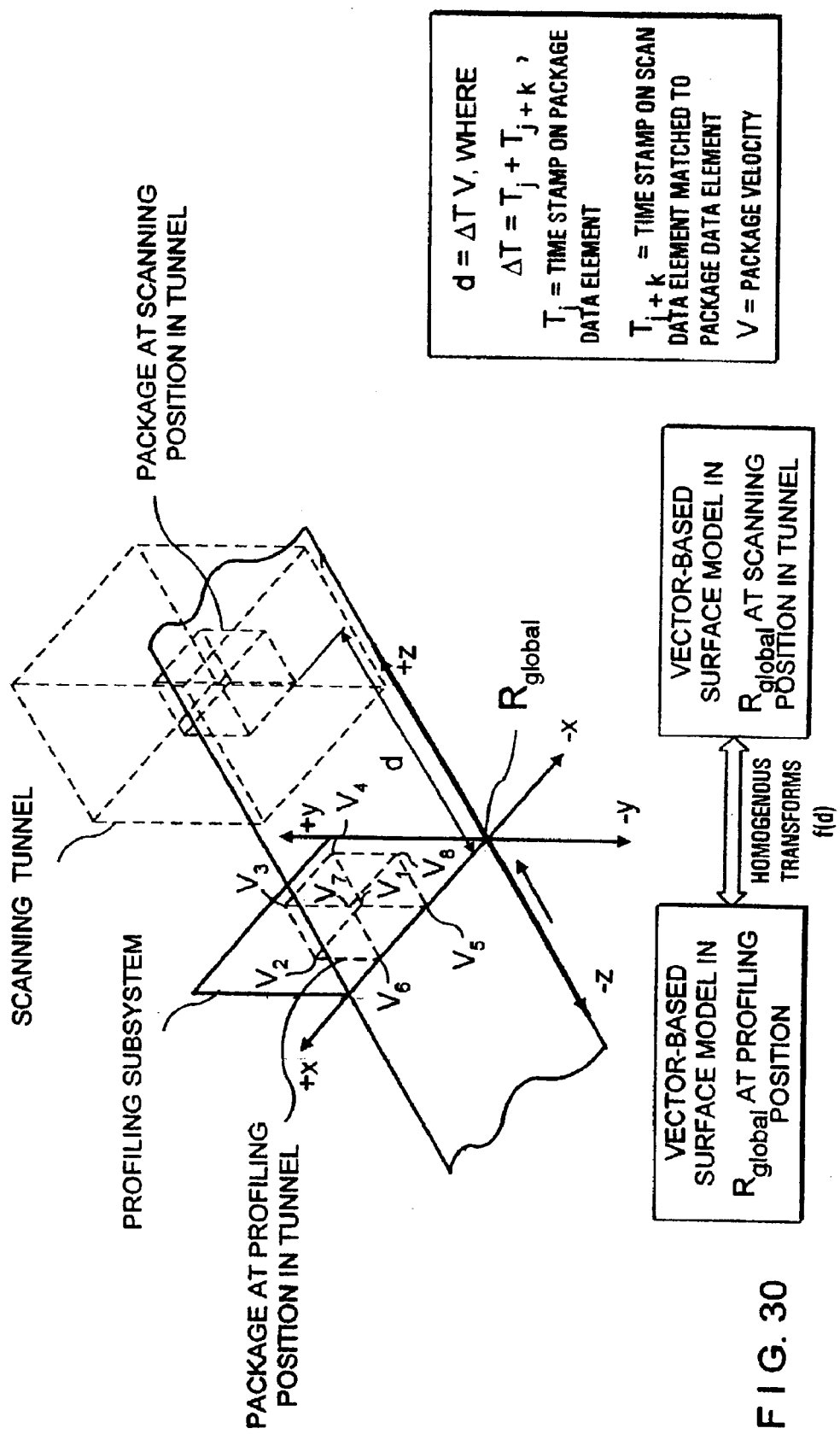
Figure 31A:
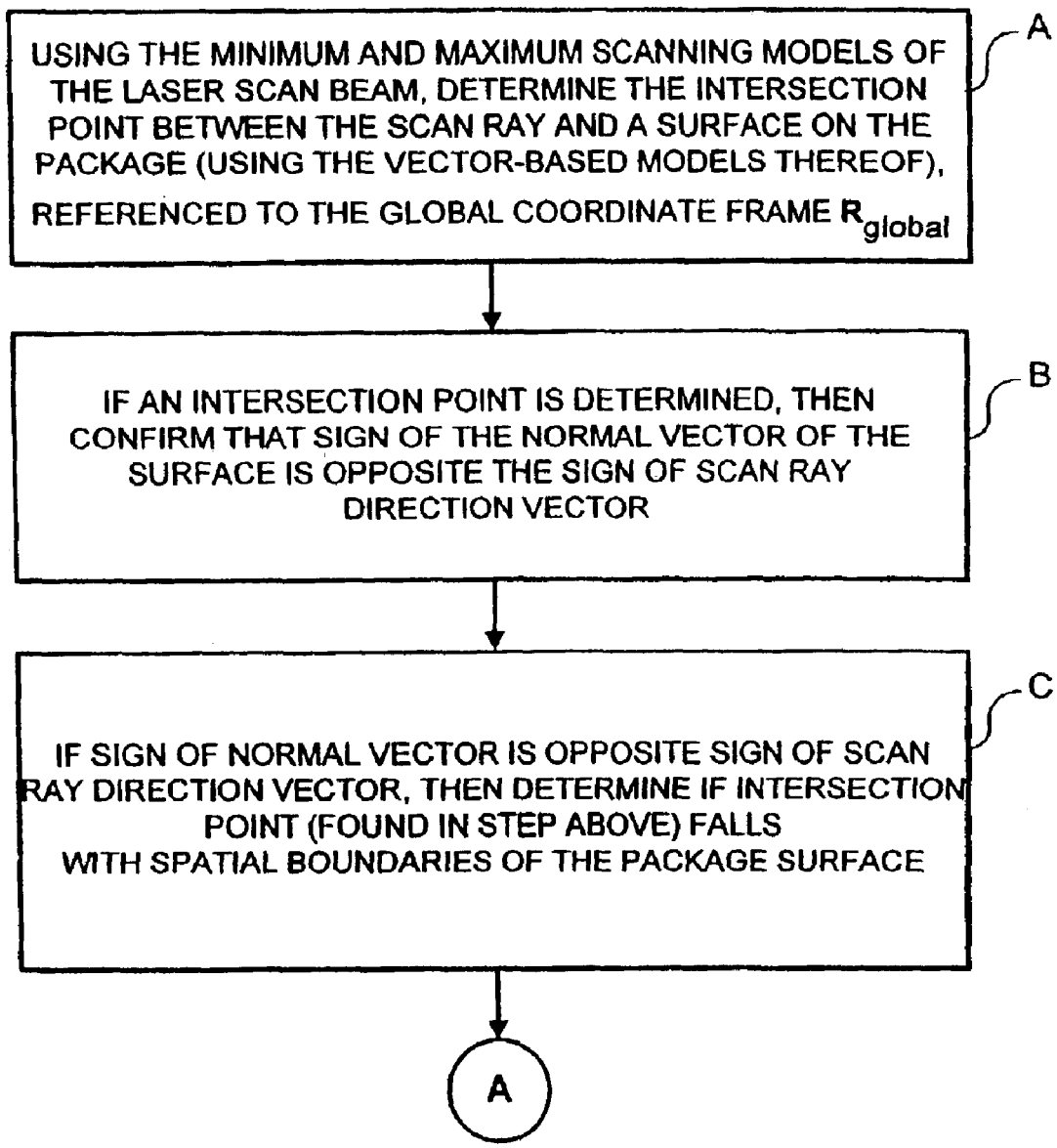
Figure 31B:
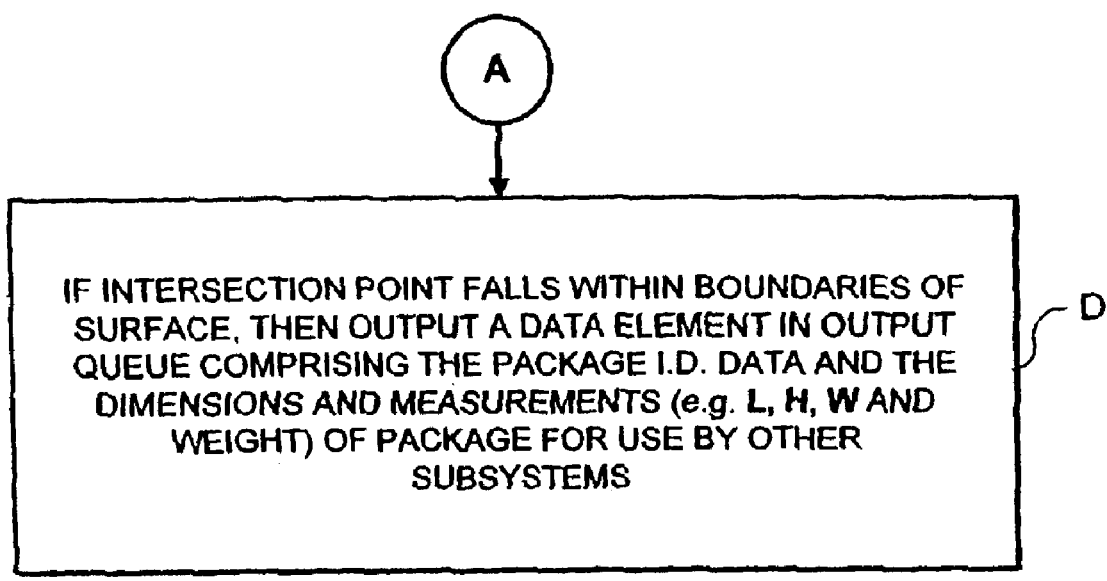
Figure 32A:
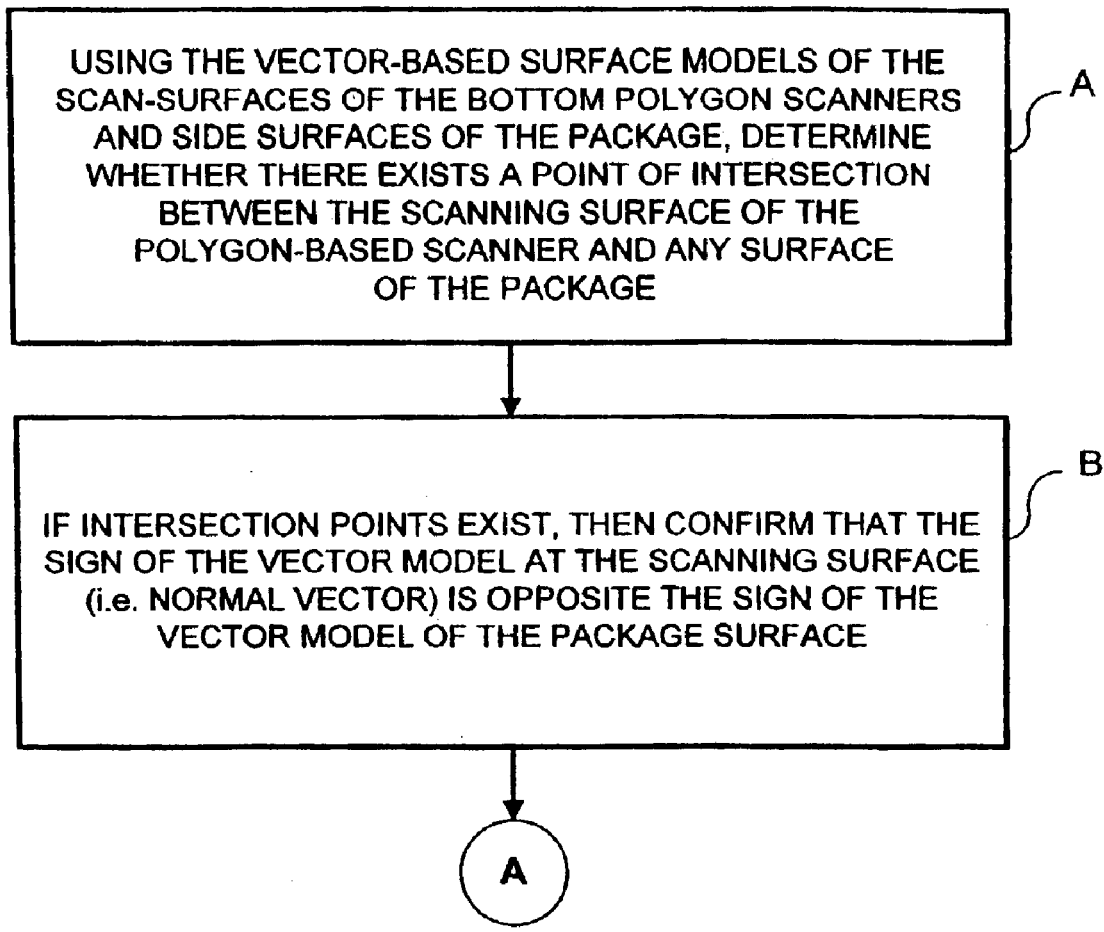
Figure 32B:
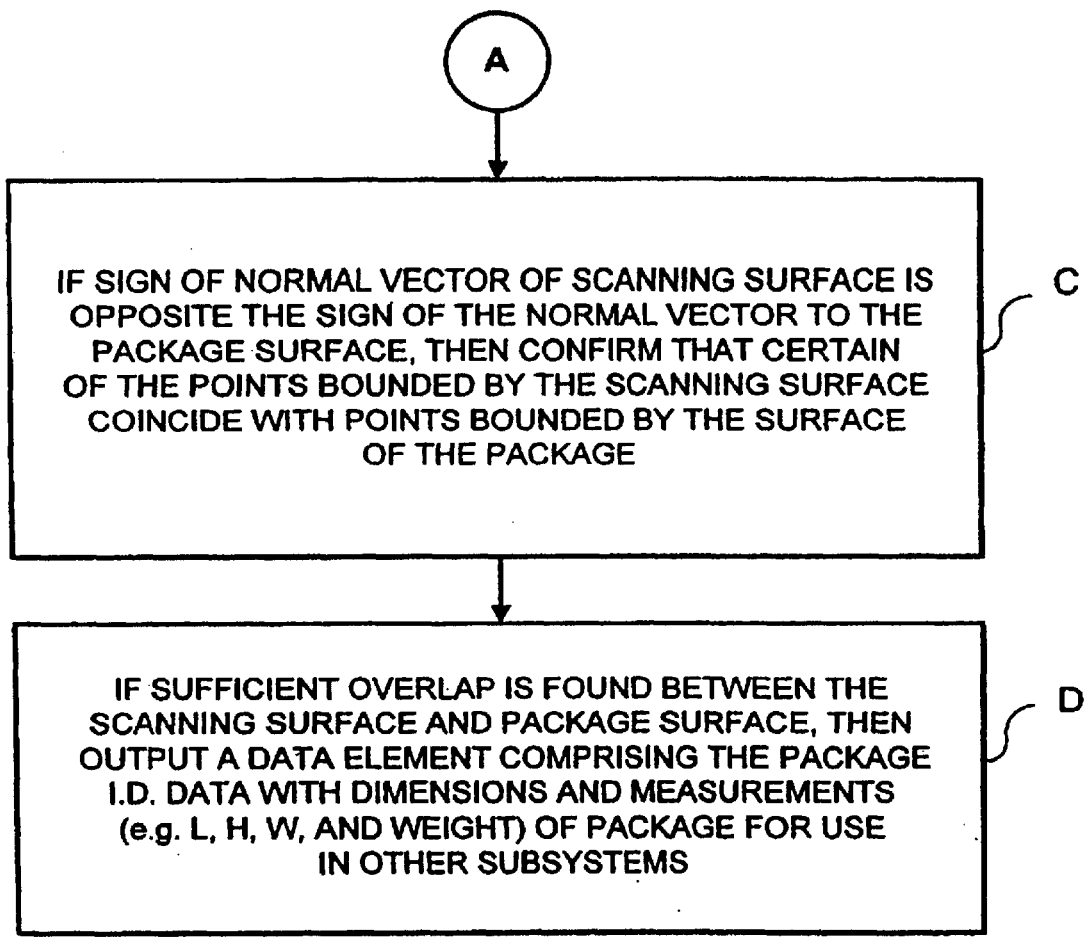

2) employed in the tunnel-type scanning system of the illustrative embodiment;

FIG. 9A is a schematic diagram showing the direction of omni-directional scanning provided in the Y-Z plane of the 3-D scanning volume of tunnel scanning system hereof, by the holographic laser scanning subsystems (indicated by L/B Corner #1, L/B Corner #2, L/F Corner #1 and L/B Corner #2) employed in the tunnel-type scanning system of the illustrative embodiment;

FIG. 9B is a schematic diagram showing the direction of omni-directional scanning provided in the X-Y plane of the 3-D scanning volume of tunnel scanning system hereof, by the holographic laser scanning subsystems (indicated by L/B Corner #1, L/B Corner #2, L/F Corner #1 and L/B Corner #2) employed in the tunnel-type scanning system of the illustrative embodiment;

FIG. 10 is a schematic representation of the components on the motherboard and decode processing boards associated with holographic scanning disc employed within the tunnel scanning subsystem of the present invention, showing the home-pulse detector and home-offset pulse (HOP) generator on the mother (control) board, and the start-of-facet-sector pulse (SFSP) generator, digitizer circuitry, decode signal processor and ROM containing relative timing information about each SFSP in relation to the HOP sent to the decode processing board from the control board of the present invention;

FIG. 10A is a schematic representation of the start-of-facet-sector pulse (SFSP) generator employed on each decode board associated with a holghraphic laser scanning subsystem in the system hereof;

FIG. 10B is a first table containing parameters and information that are used within the SFP generation module of the SFSP generator shown in FIG. 10A;

FIG. 10C is a schematic representation of the operation of the start-of-facet pulse (SFP) generator employed within each SFSP generator of the present invention, wherein start of facet pulses are generated within the SFP generator relative to the home-offset pulse (HOP) received from the HOP generator on the mother/control board associated with each holographic scanning disc;

FIG. 10D is a second table containing parameters and information that are used within the SFSP generation module of the SFSP generator shown in FIG. 10A;

FIGS. 10E1 and 10E2 set forth a table containing a set of production rules used within the SFSP generation module of the SFSP generator shown in FIG. 10A, to generate start-of-facet-sector pulses therewithin;

FIG. 10F is a schematic representation of the operation of the start-of-facet-sector pulse (SFSP) generator of the present invention, wherein start of facet sector pulses (SFSPs) are generated within the SFSP generator relative to the home-offset pulse (HOP) received from the HOP generator on the mother/control board associated with each holographic scanning disc;

FIGS. 11A1, and 11A2 set forth a schematic diagram of the digitizing circuit shown in FIG. 10, using a pair of dual FIFO memory storage buffers to sychronously track digital scan data and information about the facet-sectors on the optically-encoded holographic scanning disc of FIG. 12 used to generate the laser scanning beam that was used to collected such digital scan data from a bar code symbol on a package transported through the tunnel scanning subsystem hereof;

FIG. 11A is a schematic diagram showing in greater detail the digitizing circuit shown in FIG. 10;

FIGS. 11C1, 11C2 and 11D set forth tables containing parameters and information that are used within the decode processor of the present invention shown in FIG. 11B in order to recover digital count data from time-based facet-sector related information, and generate decoded symbol character data and the minimum and maximum facet sector angles that specify the facet sector on a particular holographic scanning disc used to generate the laser scanning beam/plane that collected the scan data associated with the decoded bar code symbol;

FIG. 11E is a high level flow chart describing the steps of the process carried out by the decode processor of the present invention shown in FIG. 11A;

FIG. 12 is a schematic diagram of the holographic scanning disc that contains optically-encoded home-pulse mark as well as a series of start-of-facet-sector marks about the outer edge thereof for indicating where each facet sector along the disc begins, relative to the home pulse mark;

FIG. 13 is a schematic representation of the components on the motherboard and decode processing boards associated with an optically-encoded holographic scanning disc which can be employed within the tunnel scanning subysystem of the present invention, showing the home-pulse detector and home-offset pulse (HOP) generator on the mother (control) board, and the start-of-facet-sector pulse (SFSP) generator, digitizer circuitry, decode signal processor and ROM containing relative timing information about each SFSP in relation to the HOP sent to the decode processing board from the control board of the present invention;

FIG. 13A is a schematic representation of the start-of-facet-sector pulse (SFSP) generator employed on each decode board shown in FIG. 13;

FIG. 13B is a table containing parameters and information that are used within the SFSP generation module of the SFSP generator shown in FIG. 13A;

FIG. 13C is a schematic representation of the operation of the start-of-facet sector pulse (SFSP) generator shown FIG. 13A, wherein start of facet sector pulses are generated therewithin relative to the home-offset pulse (HOP) received from the HOP generator on the mother/control board associated with each holographic scanning disc;

FIGS. 14A1 and 14A2 set forth a schematic diagram of the digitizing circuit shown in FIG. 13 using a pair of dual FIFO memory storage buffers to sychronously track digital scan data and information about the facet-sectors on a holographic scanning disc used to generate the laser scanning beam that was used to collected such digital scan data from a bar code symbol on a package transported through the tunnel scanning subsystem hereof;

FIG. 14B is a schematic diagram showing the digitizing circuit of FIGS. 14A1 and 12B2 in greater detail;

FIGS. 14C1 and 14C2 are tables containing parameters and information that are used within the decode processor of the present invention shown in FIG. 14A in order to recover digital count data from time-based facet-sector related information, and generate decoded symbol character data and the minimum and maximum facet sector angles that specify the facet sector on a particular holographic scanning disc used to generate the laser scanning beam/plane that collected the scan data associated with the decoded bar code symbol;

FIG. 14D is a high level flow chart describing the steps of the process carried out by the decode processor of the present invention shown in FIG. 14B;

FIG. 15 is a schematic representation of the package velocity and length measurement subsystem of the present invention configured in relation to the tunnel conveyor and package dimensioning/profiling subsystems of the system of the illustrative embodiment;

FIG. 15A is a schematic representation showing the dual-laser based package velocity and measurement subsystem installed in a "direct transmitt/receive" configuration at the location of the vertical and horizontal light curtains employed in the package profiling subsystem of the present invention;

FIG. 15A1 is a schematic representation of the signals received by the photoreceivers of the dual-laser based package velocity and measurement subsystem shown in FIG. 15;

FIG. 15A2 is a schematic representation of the signals generated by the photoreceiving circuitry and provided as input to the signal processor of the dual-laser based package velocity and measurement subsystem shown in FIG. 15;

FIG. 15A3 is a schematic diagram of circuitry for driving the dual laser diodes used in the dual-laser based package velocity and measurement subsystem of FIG. 15A;

FIGS. 15A4A and 15A14B set forth a schematic diagram of circuitry for conditioning the signals received by the photoreceivers employed in the dual-laser based package velocity and measurement subsystem of FIG. 15A;

FIG. 15B is a schematic representation showing the dual-laser based package velocity and measurement subsystem installed in a "retro-reflection" configuration at the location of the vertical and horizontal light curtains employed in the package profiling subsystem of the present invention;

FIG. 15B1 is a schematic diagram of electronic circuitry adapted for automatically generating a pair of laser beams at a known space-part distance, towards a retroflective device positioned on the opposite side of the conveyor belt of the system hereof, and automatically detecting the retroflected beams and processing the same so as to produce signals suitable for computing the length and velocity of a package passing through the transmitted laser beams within the dual-laser based package velocity and measurement subsystem of FIG. 15B;

FIGS. 15C through 15C2, taken together, set forth a flow chart describing the steps carried out by the signal processor used in the dual-laser based package velocity and measurement subsystems of FIG. 15 and FIG. 15B, so as to compute the velocity (v) and length (L) of the package transported through the laser beams of the dual-laser based package velocity and measurement subsystem hereof;

FIG. 16 is a perspective view of the automated package identification and measurement system of the present invention, showing the location of the package dimensioning/profiling subsystem (and package-in-tunnel signalling subsytem) in relation thereto and the global coordinate reference system $R_{global}$ symbolically embedded within the structure thereof, as shown;

FIG. 16A is a schematic representation of the horizontally and verically arranged light transmitting and receiving structures and subcomponents employed in the package (X-Y) dimensioning/profiling subsystem of the illustrative embodiment;

FIG. 17A is an elevated side view of a package about to be transported through the package dimensioning/profiling subsystem of FIG. 16;

FIG. 17B is a plan view of two packages about to be transported through the package dimensioning/profiling subsystem of FIG. 16;

FIG. 17C is an elevated side view of a package being transported through and thus profiled by the package dimensioning/profiling subsystem of FIG. 16;

FIG. 18A is an elevated side view of two stacked packages conveyed along the conveyor belt subsystem, wherein one package is being transported through and thus profiled by the package dimensioning/profiling subsystem of FIG. 16, while the other package is not yet being being profiled;

FIG. 18B is an elevated side view of two stacked packages conveyed along the conveyor belt subsystem, wherein both packages are being transported through and thus profiled by the package dimensioning/profiling subsystem of FIG. 16;

FIG. 18C is an elevated side view of two stacked packages conveyed along the conveyor belt subsystem, wherein one package is being transported through and thus profiled by the package dimensioning/profiling subsystem of FIG. 16, while the other package is not yet being being profiled;

FIG. 19 is a schematic diagram of a finite-impulse-response (FIR) digital filter that can be used to filter data streams produced from the height and width profiling data channels of the package dimensioning/profiling subsystem of FIG. 16;

FIG. 20A is an elevated side schematic view of the in-motion weighing subsytem arranged about the package dimensioning/profiling subsystem of FIG. 16, showing the scale and data processing subcomponents of the in-motion weighing subsytem;

FIG. 20B is a plan view of the in-motion weighing subsytem shown in FIG. 20A;

FIG. 21 is a schematic diagram of the package-in-tunnel signalling subsystem employed in the automated package identification and measuring system of the present invention;

FIGS. 22A1, 22A2 and 22B taken together provide a schematic representation of the data element queuing, handing and processing subsystem of the present invention shown in FIG. 4;

FIGS. 23A1 and 23A2 set forth a table of rules used to handle the data elements stored in the system event queue in the data element queuing, handing and processing subsystem of FIGS. 22A1 and 22A2;

FIG. 24 is a schematic representation of the surface geometry model created for each package surface by the package surface geometry modeling subsystem (i.e module) deployed with the data element queuing, handing and processing subsystem of FIGS. 22A1 and 22A2, illustrating how each surface of each package (transported through package dimensioning/measuring subsystem and package velocity/length measurement subsystem) is mathematically represented (i.e modeled) using at least three position vectors (referenced to x=0, y=0, z=0) in the global reference frame $R_{global}$, and a normal vector to the package surface indicating the direction of incident light reflection therefrom;

FIG. 24A is a table setting forth a preferred procedure for creating a vector-based surface model for each surface of each package transported through the package dimensioning/measuring subsystem and package velocity/length measurement subsystem of the system hereof;

FIGS. 25A through 25A1 is a schematic representation of a diffraction-based geometric optics model, created by the scan beam geometry modeling subsystem (i.e. module) of FIG. 22, for the propagation of the laser scanning beam (ray) emanating from a particular point on the facet, to its point of reflection on the corresponding beam folding mirror, towards to the focal plane determined by the focal length of the facet, created within the scan beam geometry modeling module shown in FIGS. 22A1 and 22A2;

FIGS. 25B1 through 25B3 set forth a table of parameters used to -construct the diffraction-based geometric optics model of the scanning facet and laser scanning beam shown in FIGS. 25A and 25A1;

FIGS. 25C1 and 25C2, taken together, set forth a table of parametric equation used in the spreadsheet design of the holographic laser scanner of the present invention;

FIG. 26 is a schematic representation of the laser scanning disc shown in FIGS. 25A and 25A1, labeled with particular parameters associated with the diffraction-based geometric optics model of FIGS. 25A and 25A1;

FIG. 27 is a table setting forth a preferred procedure for creating a vector-based ray model for laser scanning beams which have been produced by a holographic laser scanning subsystem of the system hereof, that may have collected the scan data associated with a decoded bar code symbol read thereby within the tunnel scanning subsystem;

FIG. 28 is a schematic representation of the vector-based 2-D surface geometry model created for each candidate scan beam by the scan surface modeling subsystem (i.e module) shown in FIG. 22A, and illustrating how each omnidirectional scan pattern produced from a particular polygon-based bottom scanning unit is mathematically represented (i.e modeled) using four position vectors (referenced to x=0, y=0, z=0) in the global reference frame $R_{global}$, and a normal vector to the scanning surface indicating the direction of laser scanning rays projected therefrom during scanning operations;

FIG. 29 is a schematic representation of graphically illustrating how a vector-based model created within a local scanner coordinate reference frame $R_{localscannerj}$ can be converted into a corresponding vector-based model created within the global scanner coordinate reference frame $R_{global}$ using homogeneous transformations;

FIG. 30 is a schematic representation of graphically illustrating how a vector-based package surface model created within the global coordinate reference frame $R_{global}$ at the "package profiling position" can be converted into a corresponding vector-based package surface model created within the global scanner coordinate reference frame $R_{global}$ at the "scanning position" within the tunnel using homogeneous transformations, and how the package travel distance (d) between the package profiling and scanning positions is computed using the package velocity (v) and the difference in time indicated by the time stamps placed on the package data element and scan data element matched thereto during each scan beam/package surface intersection determination carried out within the data element queuing, handling and processing subsytem of FIGS. 22 and 22A;

FIGS. 31A and 31B, taken together, provide a procedure for determining whether the scan beam (rays) associated with a particular scan data element produced by a holographic scanning subsytem intersects with any surface on the package that has been scanned at a particular scanning position, and thus whether to correlate a particular package identification data element with particular package measurement data element acquired by the system; and FIGS. 32A and 32B, taken together, provide a procedure for determining whether the scanning surface associated with a particular scan data element produced by a non-holographic (e.g. polygon-based) bottom-located scanning subsystem intersects with any surface on the package that has been scanned at a particular scanning position, and thus whether to correlate a particular package identification data element with particular package measurement data element acquired by the system.

DETAILED DESCRIPTION OF THE ILLUSTRATIVE EMBODIMENTS OF THE PRESENT INVENTION

Referring to the figures in the accompanying Drawings, the preferred embodiment of the automated package identification and measurement system of the present invention will be described in great detail, wherein like elements will be indicated using like reference numerals.

In FIG. 1, there is shown an automated tunnel-type laser scanning package identification and measuring (e.g. dimensioning and weighing) system designed to meet the needs of demanding customers, such as the United States Postal Service (USPS), who requires "hands-free" bar code (or code symbol) scanning of at least six-packages, wherein the label containing the code symbol to be read could be placed in any orientation on any one of the six or more sides of the box or container structure. As used hereinafter, the term "hands-free" shall mean scanning of bar codes on boxes or parcels that are traveling past the scanners in only one direction on some sort of conveyor system.

Figure 1C:
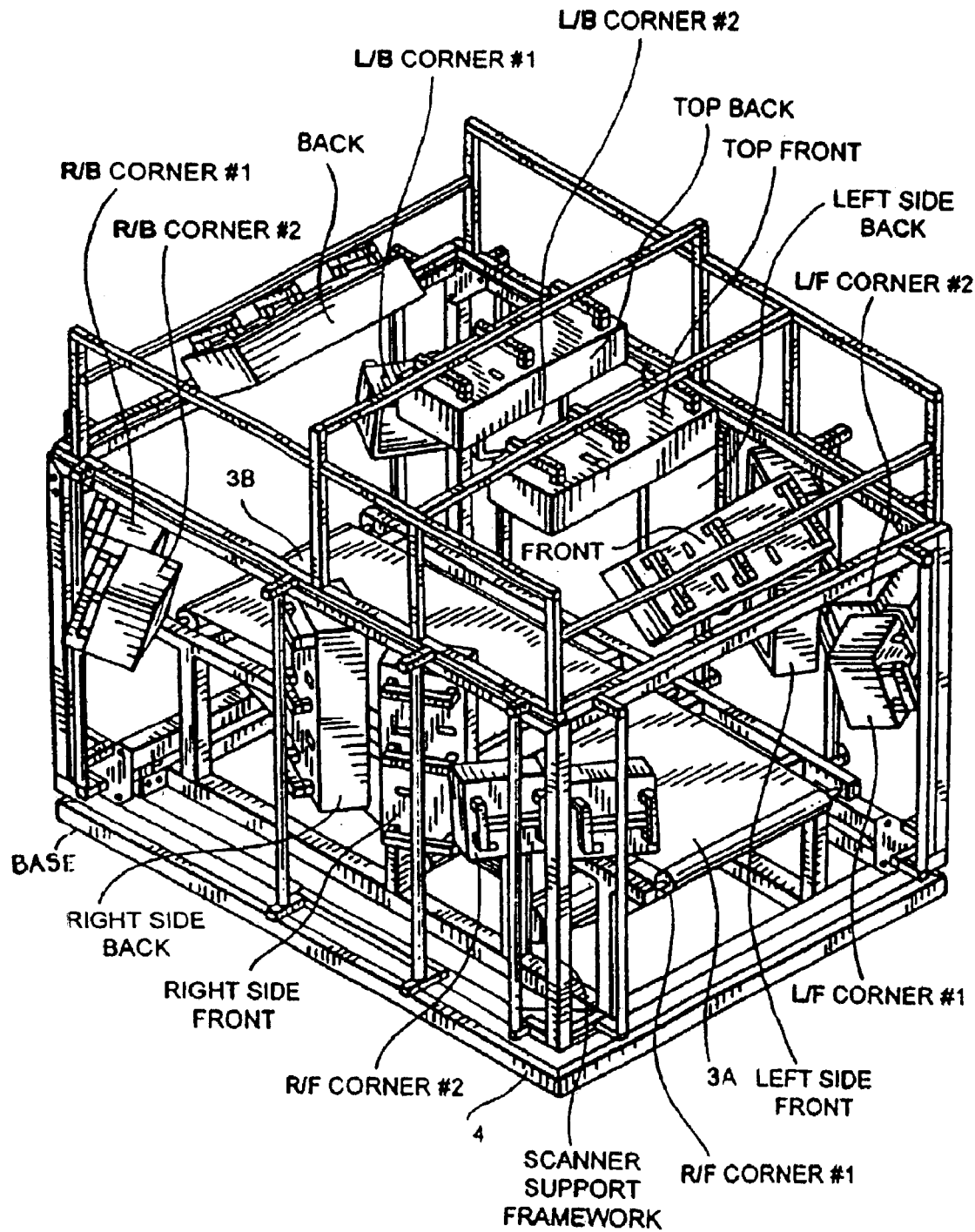
FIG. 1C is a second perspective view of the tunnel-type package indentification and measurement system of the present invention, shown in larger scale and with a portion of its conveyor structure removed from about the tunnel laser scanning subsystem.
Figure 1D:
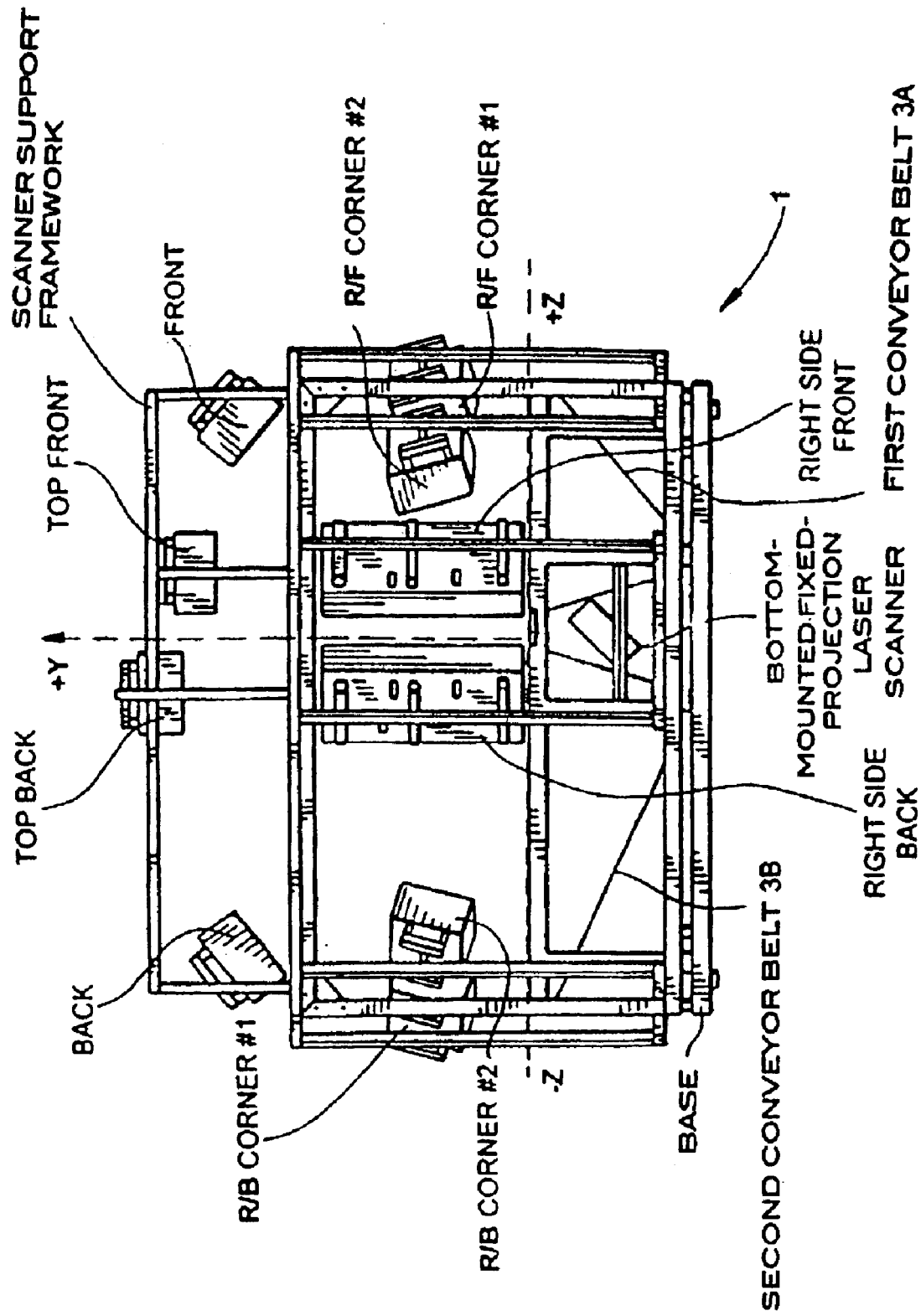
FIG. 1D is an elevated side view of the tunnel-type package indentification and measurement system of the illustrative embodiment, removed from the scanner support framework, in order to clearly show the O-ring conveyor platform for staggering packages prior to entering the 3-D scanning volume, the light curtain associated with the packaging dimensioning subsystem for determining the total volume of the package, and whether there are muliple packages entering the 3-D scanning volume, a scanner management computer system (i.e. Station) with a graphical user interface (GUI) for easily configuring the scanning subsystems within the system and monitoring the flow of packages into the scanning tunnel, and an exit sensor for detecting the exit of each scanned package within the scanning tunnel.
Figure 1E:
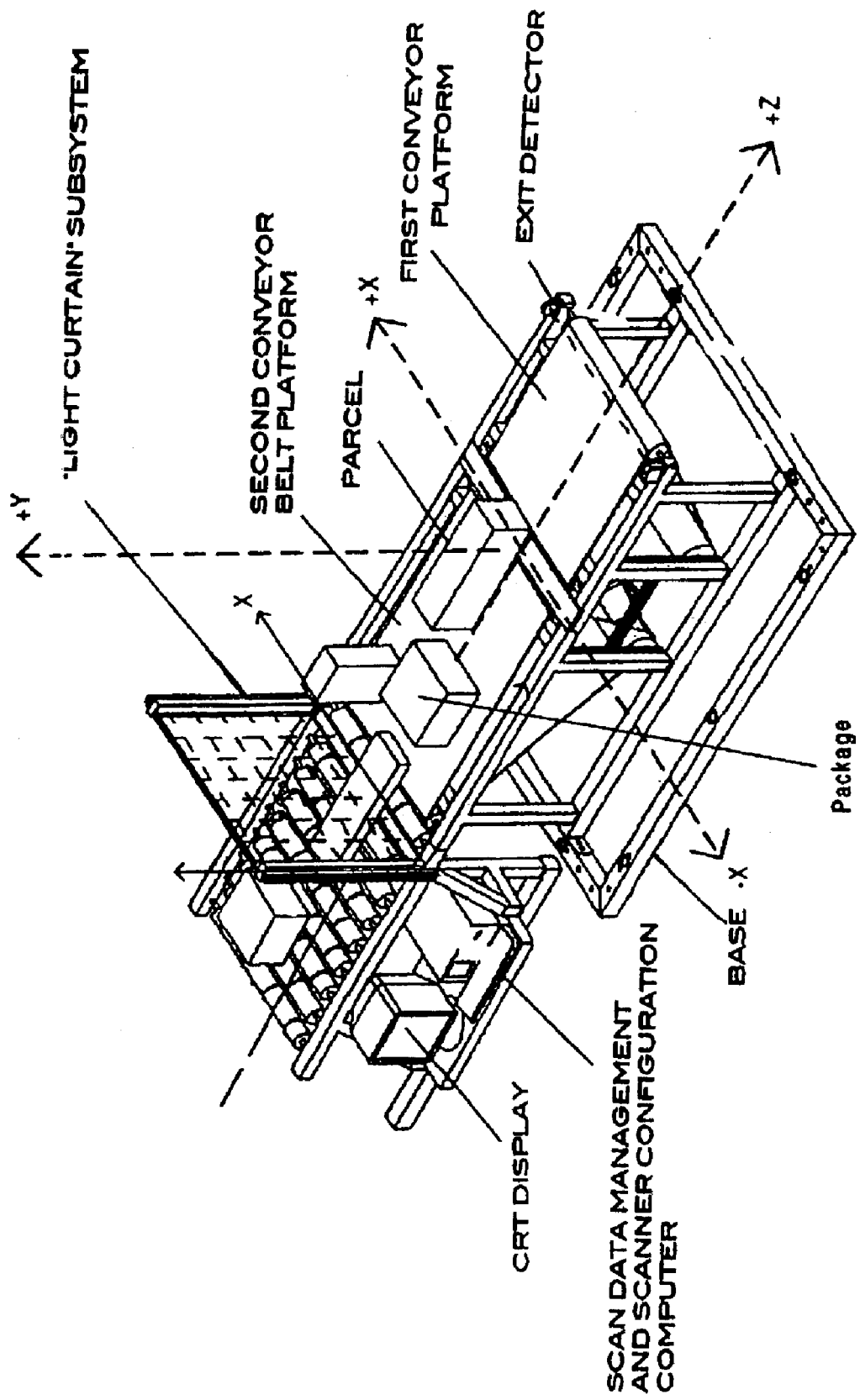
FIG. 1E is a perspective view of the tunnel-type laser scanning system of the illustatrative embodiment of the present invention, shown in greater detail, detached from a portion of its roller-based conveyor subsystem and scanner management subsystem.
Figure 1F:
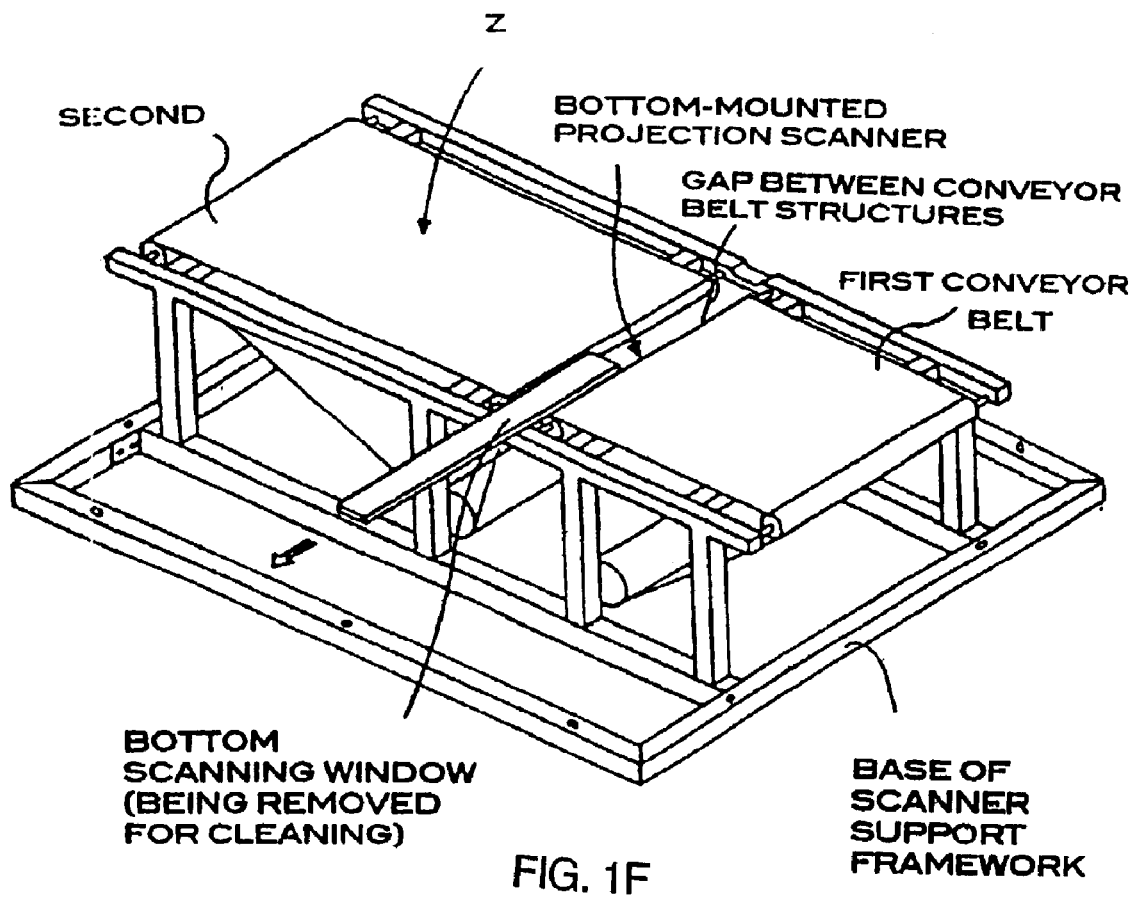
FIG. 1F is a perspective view of the split-section conveyor subsystem and its bottom-mounted laser scanning projection subsystem, and user-interface/workstation, shown detached from the scanner support framework shown in FIGS. 1, 1A and 1B.

As shown in FIGS. 1 through 1F, the package identification/measuring system of the illustrative embodiment 1 comprises an arrangement of laser scanning subsystems (i.e. scanners) which, by virtue of their placement, relative to a conveyor belt subsystem 2, essentially form a "tunnel" scanning subsystem over and about the conveyor belt of the conveyor subsystem. In the field of package sortation of any sort, whether it be mail, luggage (as in an airport terminal) or other items or boxes, this type of code symbol scanning system is known as a "tunnel scanning system" by those skilled in the art.

The package identification/measuring system of the illustrative embodiment, and shown in great detail in the drawings, has been designed and constructed to meet a specific set of customer-defined scanning parameters. For example, the bar code label could be on any one side of a box having six sides. The bar code label could be in any orientation. Futhermore, the object bearing the bar code label to be read would be moving past the scanners of the on a conveyor belt travelling at speeds in excess of 400 feet per second. In the illustrative embodiment, the conveyor belt belts 3A and 3B is moving at 520 feet per second. The types of codes to be read include such codes as Code 39, Code 128 and others. The aspect ratio of the bar codes to be read is on the order of 10 mils and up.

The package identification/measuring system of the present invention can be used in various types of applications, such as for example, where the bar codes are read to determine (a) identification of incoming packages, (b) identification of outgoing packages, and (c) sortation of outgoing packages. For sortation types of applications, the information derived from the bar code will be used not only to identify the package, but also to direct the package along a particular path using deflectors, routers and other instruments well known in the package and parcel handling art.

In the illustrative embodiment, the volume to be scanned within the tunneling subsystem (e.g. its 3-D scanning volume) is approximately: 1 meter wide (i.e. the width of the conveyor belt); ten feet long; and 1 meter tall (i.e. the height of the tallest possible box going through). The laser scanning pattern produced by the concerted operation of the holographic laser scanning subsystems indentified in the drawings, and described above, fills this entire 3-D scanning volume with over 400,000 scan lines per second. The 3-D scanning volume of the tunnel scanning system, measured with respect to the surface of the conveyor belt, begins at the surface of the conveyor belt in order to scan flat items (such as envelopes), and extends up approximately 1 meter ("h") above the surface of the conveyor belt subsystem.

As shown in FIGS. 1 through 1C, sixteen holographic laser scanning subsystems are mounted on a lightweight scanner support framework 4, at positions specified in Tunnel Scanner Positioning Data Table shown in FIG. 2C. The terms (e.g. "Top/Front", Top/Back", etc.) used in this Table to indentify the individual holographic scanning subsystems of the tunnel scanning system hereof are used throughout the drawings, rather than reference numerals. The one fixed-projection scanner subsystem, indentified by the label "Bottom", is mounted between the gap provided between the first and second conveyor platforms 3A and 3B comprising the conveyor subsystem of the tunnle scanning system.

Figure 5A:
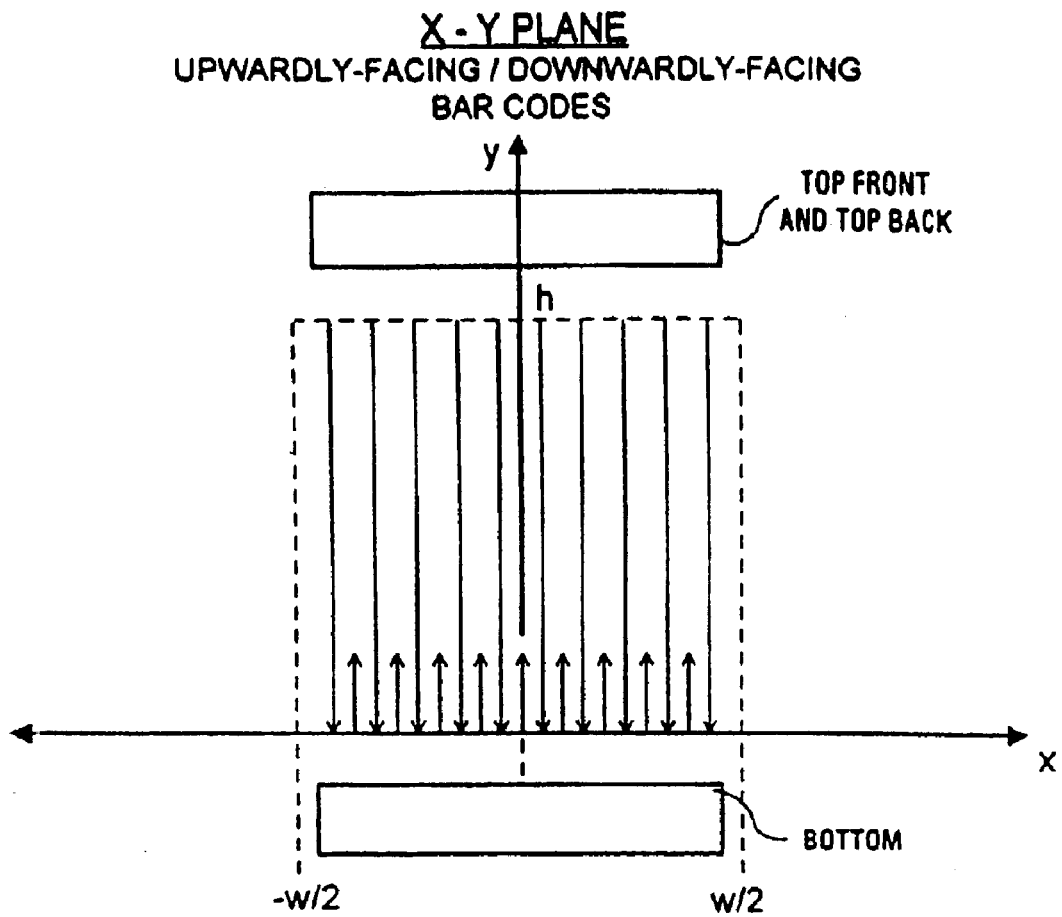
Figure 5B:
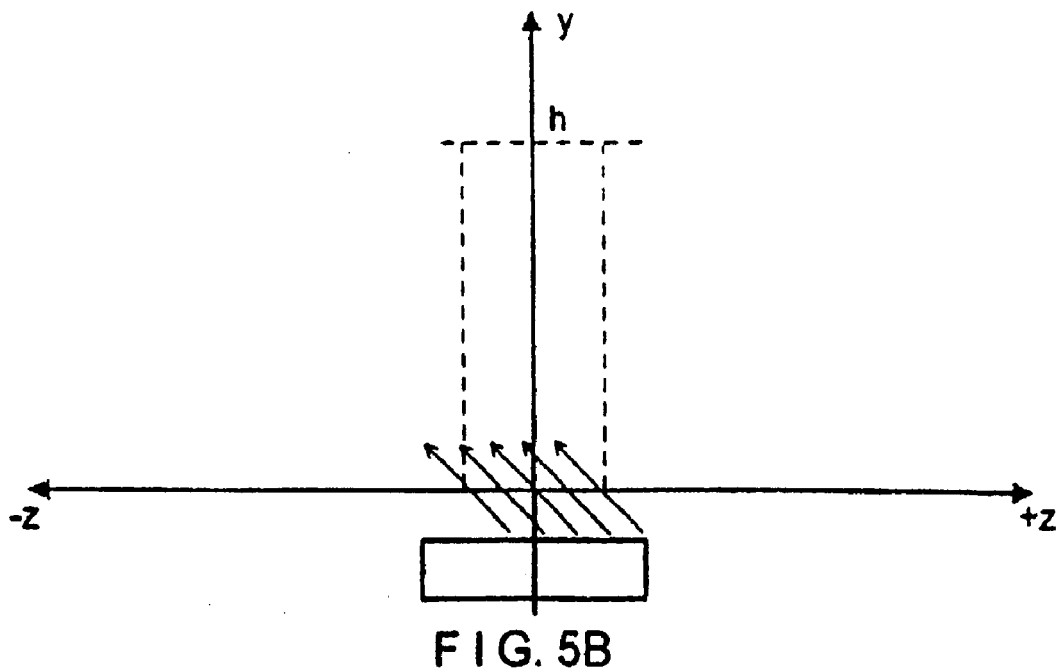
FIG. 5B is a schematic diagram showing the direction of omni-directional scanning provided in the Y-Z plane of the 3-D scanning volume of tunnel scanning system hereof, by the bottom-mounted fixed-projection laser scanning subsystem employed in the tunnel-type scanning system of the illustrative embodiment.
Figure 6:
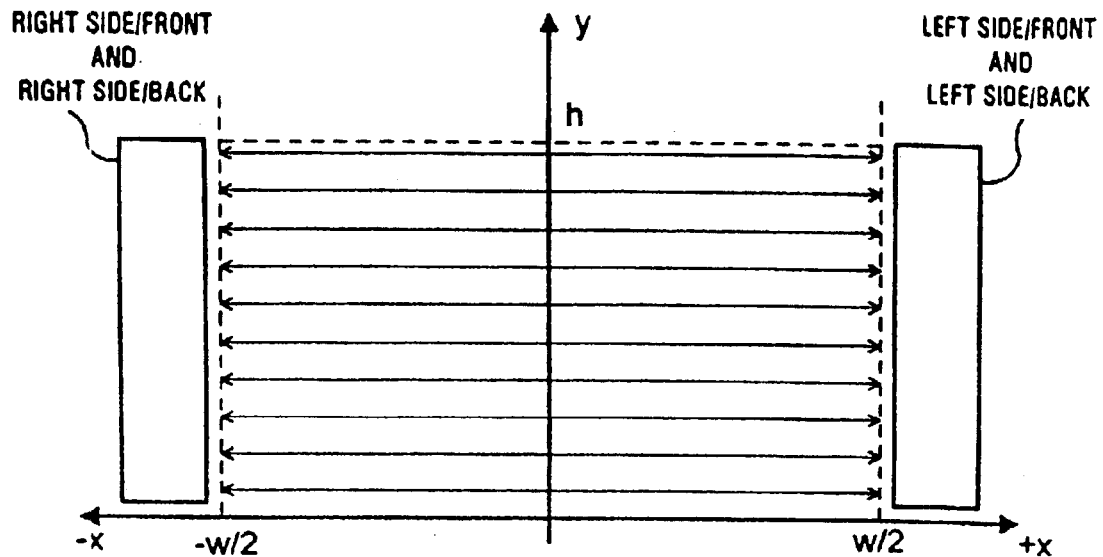

Each of the holographic scanners (R/F Corner #1, R/F Corner #2, R/B Corner #1, R/B Corner #2, L/F Corner #1, L/F Corner #2, L/B Corner #1, L/B Corner #2, ) mounted within the conrers of the scanner support framework are single-disc holograhic scanning subsystems, having five focal planes, formed using six laser scanning stations, each having a VLD, a beam folding mirror, parabolic light collection mirror, signal processing circuit boards and the like, are designed and constructed using the methods detained in Applicant's copending application Ser. No. 08/949,915 filed Oct. 14, 1997; Ser. No. 08/854,832 filed May 12, 1997; Ser. No. 08/886,806 filed Apr. 22, 1997; Ser. No. 08/726,522 filed Oct. 7, 1996; and Ser. No. 08/573,949 filed Dec. 18, 1995, each incorporated herein by reference. The design parameters for the twenty facet holographic scanning disc shown in FIG. 3A4, and the supporting subsystem used therewith, are set forth in the Table of FIGS. 3A5A and 3A5B. Notably, these the design parameters set forth in the table of FIGS. 3A5A and 3A5B are defined in detail in the above-referenced U.S. Patent Applications. The scanning pattern projected on the middle (third) focal/scanning plane of each such single-disc holographic scanning subsystem is shown in FIG. 3A6.

In FIGS. 5A through 9B, the various omnidirectional scanning directions provided for within the 3-D scanning volume of the tunnel scanner of the present invention are schematically illustrated. These illustrations indicate how each of the laser scanning subsystems within the tunnel scanning system contribute to produce the truly omnidirectional scanning performance attained by the tunnel scanner hereof.

As shown, the two triple-disc holographic scanners (Top Front and Top Back) are mounted above the conveyor belt by way of the scanner support framework. The four triple-disc holographic scanners (Left Side Front, Left Side Back, Right Side Front and Right Side Back) are mounted on the left and right sides of the scanner support framework. Each of these triple-disc holographic scanning subsystems is shown in greater detail in FIGS. 3B1 through 3B8. Each of these holograhic scanning subsystems has five focal planes, formed using three sets (groups) of six laser scanning stations, arranged about a twenty-facet scanning disc. Each laser scanning station about the scanning disc has a VLD, a beam folding mirror, parabolic light collection mirror, signal processing circuit boards and the like. Each holographic laser scanning subsystem within these triple-disc scanners are designed and constructed using the methods detained in Applicant's copending application Ser. No. 08/949,915 filed Oct. 14, 1997; Ser. No. 08/854,832 filed May 12, 1997; Ser. No. 08/886,806 filed Apr. 22, 1997; Ser. No. 08/726,522 filed Oct. 7, 1996; and Ser. No. 08/573,949 filed Dec. 18, 1995, each incorporated herein by reference. The design parameters for each twenty facet holographic scanning disc shown in FIG. 3B2, and the supporting subsystem used therewith, are set forth in the Table of FIGS. 3B3A and 3B3B. Notably, these the design parameters set forth in the table of FIGS. 3B3A and 3B3B are defined in detail in the above-referenced U.S. patent applications. The scanning pattern projected on the middle (third) focal/scanning plane of each such triple-disc holographic scanning subsystem is shown in FIG. 3B8.

As shown, the two triple-disc holographic scanners (Front and Back) are mounted above the conveyor belt by way of the scanner support framework. Each of these triple-disc holographic scanning subsystems is shown in greater detail in FIGS. 3C1 and 3C2. Each of these holograhic scanning subsystems has five focal planes, formed using three sets (groups) of six laser scanning stations, arranged about a twenty-facet scanning disc. Each laser scanning station about the scanning disc has a VLD, a beam folding mirror, parabolic light collection mirror, signal processing circuit boards and the like. Each holographic laser scanning subsystem within these triple-disc scanners are designed and constructed using the methods detained in Applicant's copending application Ser. No. 08/949,915 filed Oct. 14, 1997; Ser. No. 08/854,832 filed May 12, 1997; Ser. No. 08/886,806 filed Apr. 22, 1997; Ser. No. 08/726,522 filed Oct. 7, 1996; and Ser. No. 08/573,949 filed Dec. 18, 1995, each incorporated herein by reference. The design parameters for each twenty facet holographic scanning disc shown in the table of FIG. 3A4, and the supporting subsystem used therewith, are set forth in the Table of FIG. 3A5. Notably, these the design parameters set forth in the table of FIG. 3A5 are defined in detail in the above-referenced U.S. Patent applications. The scanning pattern projected on the middle (third) focal/scanning plane of each such triple-disc holographic scanning subsystem is shown in FIG. 3C2.

Figure 7:
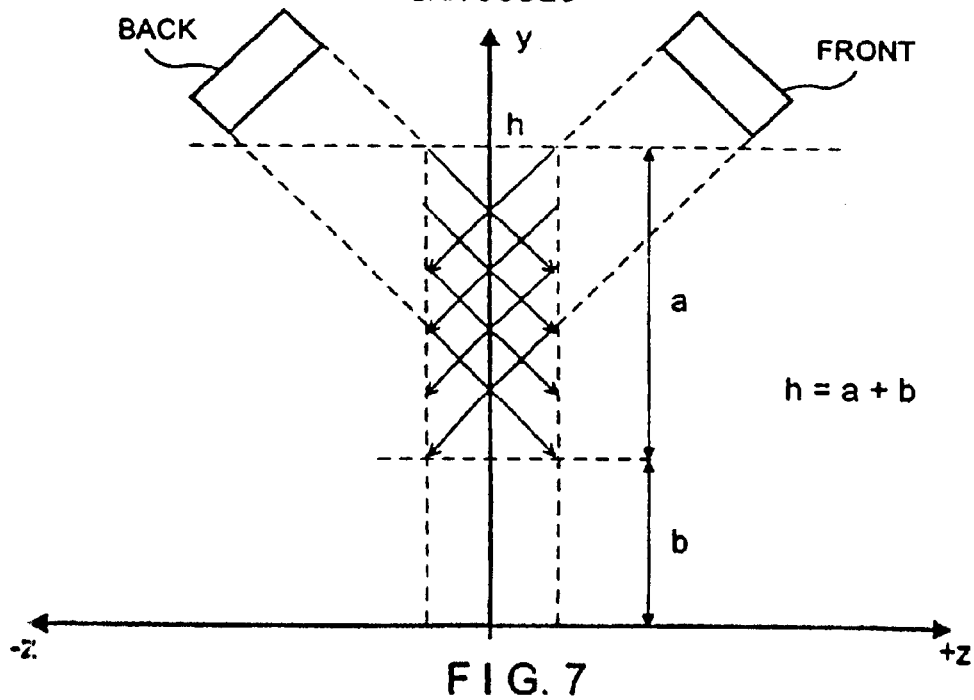

The bottom-mounted fixed projection scanner (Bottom) employed in the tunnel scanning system hereof is shown in greater detail in FIGS. 3D1 through 3D7. As shown in FIG. 3D1, the bottom-mounted scanner comprises eight fixed-projection laser scanning subsystems 6, shown in FIG. 3D2, that are mounted along optical bench 7 shown in FIG. 3D1. Each fixed projection scanning subsystem 6 comprises: four stationary mirrors 8 arranged about a central reference plane passing along the longitudinal extent of the optical bench 8 of the subsystem; and eightsided motor driven polygon scanning element 10 mounted closely to the nested array of mirrors 8; a light collecting mirror 9 mounted above the nested array along the central reference plane; a laser diode 11 for producing a laser beam which is passed through collecting mirror 9 and strikes the polygon 10; and a photodetector 12, mounted above the polygon, for detecting reflected laser light in a manner well known in the art to produce scan data signals for signal processing.

In FIGS. 3D4 and 3D5, the partial scan pattern produced by individual stationary mirrors in each subsystem 6 are shown. The complete pattern generated by each subsystem 6 is shown in FIG. 3D6. The composite omnidirectional scanning pattern generated by the eight subsystems 6 working together in the bottom scanner is shown in FIG. 3D7.

As shown in the system diagram of FIGS. 3A7A through 3A7C, each holographic laser scanning unit of the present invention comprises a number of system components, many of which are realized on a mother control board 200, a plurality (e.g. six) analog signal processing boads 201A-201-F, and six digital signal processing boards 202A–202F. For sake of simplicity, it will be best to describe these system components by describing the components realized on each of the above-described boards, and thereafter describe the interfaces and interaction therebetween.

In the illustrative embodiment, each analog scan data signal processing board 201A–201F has the following components mounted thereon: and an associated photodetector 215A (through 215F) (e.g. a silicon photocell) for detection of analog scan data signals (as described); an analog signal processing circuit 325A (through 235F for processing detected analog scan data signals.

In the illustrative embodiment, each photodetector 215A through 215F is realized as an opto-electronic device and each analog signal processing circuit 235A aboard the analog signal processing board is realized as an Application Specific Integrated Circuit (ASIC) chip. These chips are suitably mounted onto a small printed circuit (PC) board, along with electrical connectors which allow for interfacing with other boards within the scanner housing. With all of its components mounted thereon, each PC board is suitably fastened to the photodetector support frame 220, along its respective central reference frame, as shown in FIG. 3A2.

In a conventional manner, the optical scan data signal $D_0$ focused onto the photodetector (215A) during laser scanning operations is produced by light rays of a particular polarization state (e.g. S polarization state) associated with a diffracted laser beam being scanned across a light reflective surface (e.g. the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the holographic facet which produced the scanned laser beam. These reflected light rays are collected by the scanning facet and ultimately focused onto the photodetector of the associated light detection subsystem by its parabolic light reflecting mirror disposed beneath the scanning disc. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the analog signal processing circuitry is to band-pass filter and preamplify the electrical analog scan data signal $D_1$, in order to improve the SNR of the output signal.

In the illustrative embodiment, each digital scan data signal processing board 202A (through 202F) is constructed the same. On each of these signal processing boards, the following devices are realized: an analog-to-digital (A/D) conversion circuit 238A (through 238F) realized as a first application specific integrated circuit (ASIC) chip; a programmable digitizing circuit 239A (through 239F) realized as a second ASIC chip; a start-of-facet-sector pulse (SFSP) generator 236A (through 236F) realized as a programmable C chip, for generating SFSPs relative to home-offset pulses (HOP) generated by a start of facet pulse (SFP) generator circuit on the mother board 200; an EPROM 237A (through 237F) for storing parameters and information represented in the tables of FIGS. 10B, 10D, 10E1 and 10E2; and a programmed decode computer 240A (through 240F) is realized as a microprocessor and associated program and data storage memory and system buses, for carrying out symbol decoding operations and recovery of SFSPs from the digitizer circuit (239A) in a sychronous, real-time manner as will be described in greater detail hereinafter. In the illustrative embodiment, the ASIC chips, the microprocessor, its associated memory and systems buses are all mounted on a single printed circuit (PC) board, using suitable electrical connectors, in a manner well known in the art.

The function of the A/D conversion circuit (238A) is to perform a simple thresholding function in order to convert the electrical analog scan data signal $D_1$ into a corresponding digital scan data signal $D_2$ having first and second (i.e. binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit 239A of the present invention is two-fold: (1) to convert the digital scan data signal D2, associated with each scanned bar code symbol, into a corresponding sequence of digital words (i.e. a sequence of digital count values) $D_3$ representive of package identification (I.D.) data; and (2) to correlate time-based (or position-based) information about the facet sector on the scanning disc that generated the sequence digital count data (corresponding to a scanline or portion thereof) that was used to read the decoded bar code symbol on the package scanned in the scanning tunnel. Notably, in the digital word sequence D3, each digital word represents the time length associated with each first or second signal level in the corresponding digital scan data signal $D_2$. Preferably, the digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the holographic laser scanner of the present invention.

In bar code symbol scanning applications, the each programmed decode computer (240A through 240F) of the present invention has two primary functions: (1) to receive each digital word sequence $D_3$ produced from its respective digitizing circuit (239A through 239F)), and subject it to one or more bar code symbol decoding algorithms in order to determine which bar code symbol is indicated (i.e. represented) by the digital word sequence $D_3$, originally derived from corresponding scan data signal $D_1$ detected by the photodetector associated with the decode computer; and (2) to generate a specification for the laser scanning beam (or plane-sector) that was used to collect the scan data underlying the decode bar code symbol. In the illustrative embodimen hereof, the specification for the laser scanning beam (or plane-sector) is expressed as minimum and maximum facet angles delimited the facet sector involved in the scanning the decoded bar code symbol. Such minimum and maximum facet angles are indicated in the last column of the table shown in FIG. 11D. The second function of the programmed decode processor (240A through 240F) is described in greater detail in FIGS. 11D and 11E.

In more general scanning applications, the first function of the programmed decode computer (240A) hereof is to receive each digital word sequence $D_3$ produced from the digitizing circuit (239A), and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

Figure 8A:
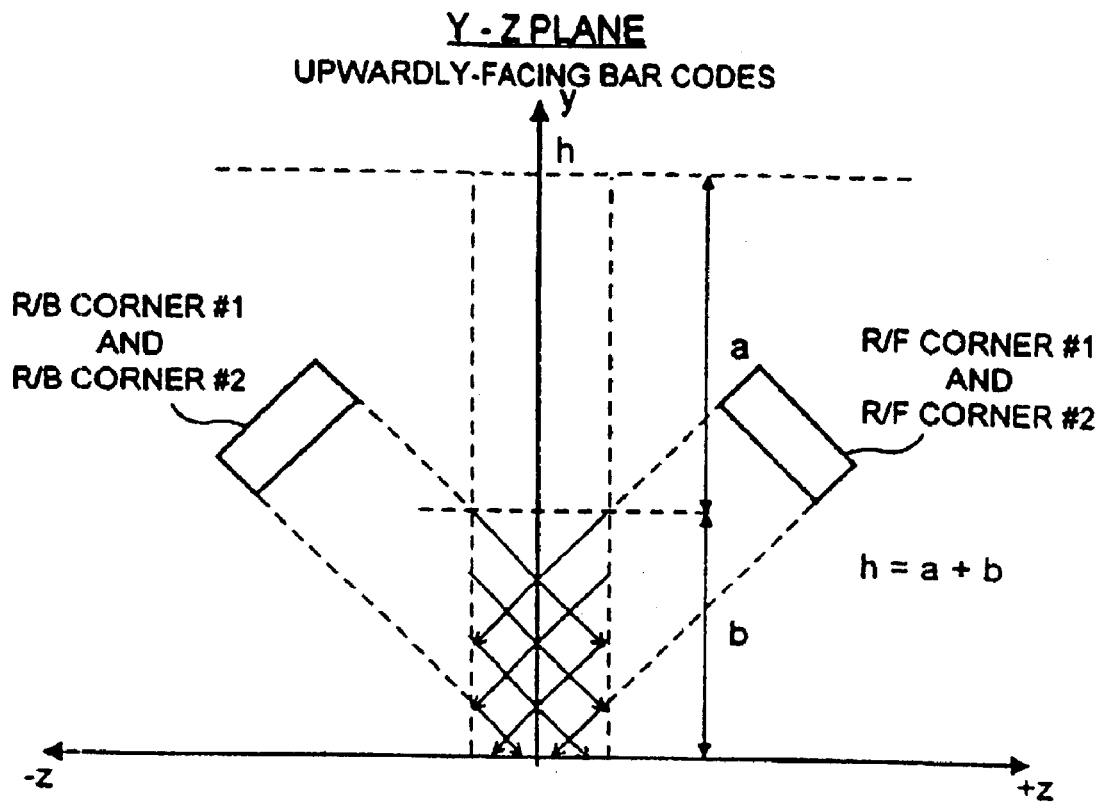
Figure 8B:
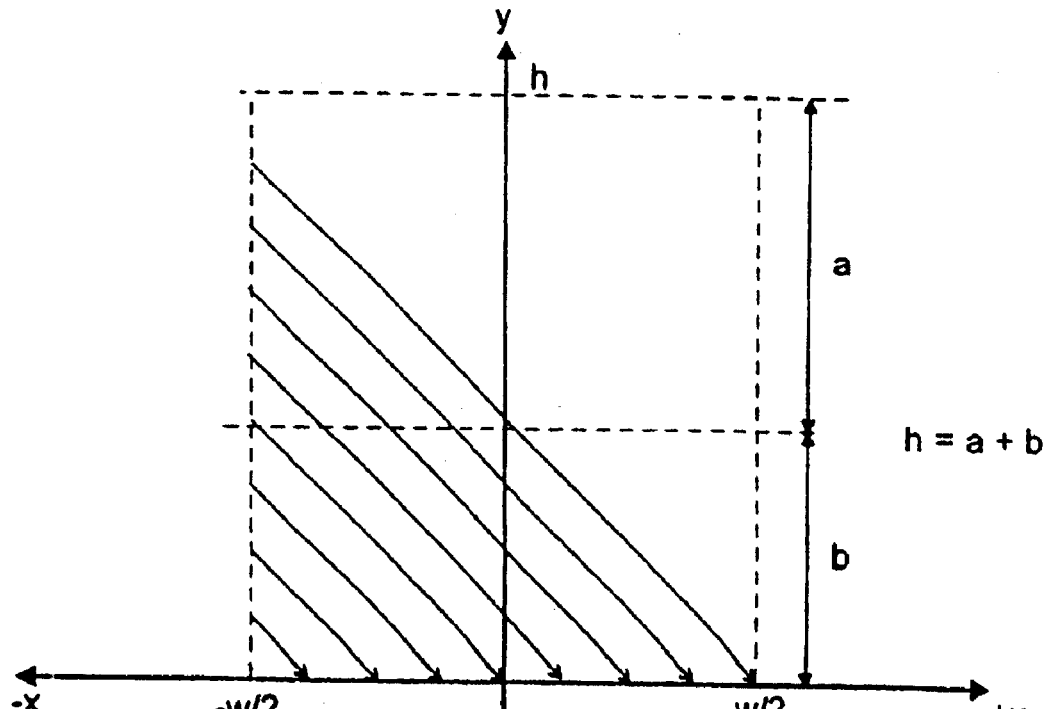

As shown in FIG. 3A7B, the central processing (i.e. mother) board 200 comprises a number of components mounted on a small PC board, namely: a programmed microprocessor 422 with a system bus and associated program and data storage memory, for controlling the system operation of the holographic laser scanner and performing other auxiliary functions; first, second, third, forth, fifth and sixth serial data channels 243A through 243F, for receiving serial data input from the programmable decode computers 420A (through 240F); an input/output (I/O) interface circuit 248 for interfacing with and transmitting symbol character data and other information to data management computer system 120; a home pulse detector 245 realized as the electronic circuit shown in FIG. 3A8C, for detecting the home pulse generated when the laser beam 250 (from VLD 251 in home pulse marking sensing module 251 in FIG. 3A8A) is directed through home-pulse gap (between Facets Nos. 5 and 12) and sensed by photodetector 252; and a home-offset-pulse (HOP) generator 244 realized as an ASIC chip, for generating a set of six home-offset pulses (HOPs) in response to the detection of each home pulse by circuit 245. In the illustrative embodiment, each serial data channel 243A through 243F is realized as an RS232 port, although it is understood that other structures may be used to realize the function performed thereby. The programmed control computer 242 also produces motor control signals, and laser control signals during system operation. These control signals are received as input by a power supply circuit 252 realized on the power supply PC board. Other input signals to the power supply circuit 252 include a 120 Volt, 60 Hz line voltage signal from a standard power distribution circuit. On the basis of the received input signals, the power supply circuit produces as output, (1) laser source enable signals to drive VLDs 253A, 253B and 253C, respectively, and (2) motor enable signals in order to drive the scanning disc motor 211 coupled to holograohic scanning disc 130.

Referring now to FIGS. 3A7A, 3A7B, and 10, it is noted that each home offset pulse produced from HOP generating circuit 244 is provided to the SFSP generator (236A through 236F) on the decode processing board . When the HOP pulse is received at the SFSP generator (236A through 236F) on a particular decode processing board, this indicates that the home pulse gap on the scanning disc 130 is starting to pass through the laser beam directed therethrough at the scanning station associated with the decode signal processing board. As shown in FIGS. 10 through 11E, timing information stored in the tables shown in these figures is used by the SFSP generator 236A to generate a set of SFSPs in response to the received HOP during each revolution of the scanning disc. This enables a digital number count (referenced from the HOP) to be generated and correlated along with the digital data counts produced within the digitizer circuit 239A in a synchronous manner. As shown in FIG. 10A, each SFSP generator (236A through 236B) comprises: a clock 260 for producing clock pulses (e.g. having a pulse duration of about 4 microseconds); a SFP generation module 261 for generating SFPs using the table of FIG. 10B in accordance with the process depicted in FIG. 10C; a SFSP generation module 262 for generating SFSPs using the table of FIG. 10D and production rules set forth in FIGS. 10E1 and 10E2, in accordance with the process depicted in FIG. 10F; and a control module 263 for controlling the SFP generator 261 and SFSP generator 262, and resetting the clock 260 upon each detection of a new HOP from the HOP generator on the mother control board 200 associated with the holographic scanning unit.

As shown in FIGS. 11A1 and 11A2, the digitizer circuit 239A of the present invention comprises a number of subcomponents. In particular, a scan data input circuit 322 is provided fpr receiving digital scan data signal $D_2$. A clock input 132 is provided from an external fixed frequency source 313, e.g., a 40 MHz crystal, or another external clock 15 to produce a pulse train The output of the clock input circuit 312 is provided to the clock divider circuitry 314. That circuit includes dividers for successively dividing the frequency of the clock pulses by a factor of two to produce a plurality of clock frequencies, as will be described in detail later. This plurality of clock signals is provided to a multiplexer, clock mux 136. As shown in FIGS. 11A1 and 11A2, the 40 MHz clock input signal is also provided directly to the clock mux 316. The clock mux 136 selects the desired output frequencies for the device 10 based upon control signals received from clock control circuitry in the programmable processor 240A and in associated circuitry. The output of the clock mux 316 comprises an S clock signal which provides the basic timing for the digitizer circuit 239A, as well as the input to digital counters. The processing of the input (bar code) scan data $D_2$ is provided from signal processor 238A. The scanner input circuit 322 provides output signals which represent the detected bar code signal to be processed and are provided to the transition and sign detecting means 324. That circuit detects the transition from a bar to a space or a space to a bar from the input signals provided thereto, and also determines whether the symbol occurring before the transition is a bar or a space. Thus, the transition and sign detector 324 provides a signal bearing the "sign: information (referred to as the "SIGN" signal) which is provided to multiplexer 342, and thus a primary first-in, first-out (FIFO) memory which serves as the input of programmable processor 240A. The transition and sign means 324 also provides a signal to the sequencing means 328 to commence operation of the sequencing means 328. The sequencing means 328 steps the digitizer circuit through a predetermined number of steps which beg in at the occurrence of each symbol transition and which will be described in detail later. Sequencing means 328 provides a FIFO write signal to the FIFO input of primary FIFO 340. and the auxiliary FIFO 341, at the proper time to enable it to accept data thereinto. The sequencing means 328 provides input signals to digitizing counting means 330 so that the starting and stopping of the counters, occurring with the detection of each transition, is properly sequenced.

The counting means 330 also receives an input signal from the clock mux 316 (S Clock). This signal runs the counters at the selected rate when they are enabled by the sequencing means 328. The clock mux 316, the sequencer means 328 and the counting means 330 all supply signals to the interface circuit 333 which enables it to properly pass the digitized count data to the primary and auxilary FIFOs 340 and 341, via multiplexer 342, as shown in FIGS. 11A1, 11A2 and 11B. The clock mux 316 is arranged to provide two banks of available frequencies for the device to use, namely, an upper and a lower bank. The selection of frequencies from the upper bank or the lower bank is determined by a frequency bank switching means 362. The frequency bank switching means 362 also provides an input to an array reset 38 which provides a signal to reset the clock divider 314 on command. The clock divider circuitry 314 also generates a TEST reset signal by inverting the array reset signal. The TEST reset signal resets the remainder of the circuit 239A. The command which initiates this reset condition is normally generated by a testing device (not shown) connected to device 239A and used to test it upon its fabrication.

As shown in FIGS. 11A1, 11A2 and 11C, digital count data or a string of zeros (representative of correlated SFP data or count values from the HOP) are written into the primary FIFO using multiplexer 342 and write enable signals generated by the sequencing means 238. The SFP marker (i.e. string of zeros) is written over the data in the primary FIFO 340 whenever the SFP count data is presented to the digitizer circuit. Also, digital count data or a string of zeros (representative of correlated SFSP data or SFS count values from the HOP) are written into the auxiliary FIFO 341 using multiplexer 342 and write enable signals generated by the sequencing means 238. The SFSP marker (i.e. string of zeros) is written over the data in the auxiliary FIFO 341 whenever the SFP count data is presented to the digitizer circuit. With such a data encoding scheme, the decoder 240A is allowed to decode process the scan count data in the FIFOs, as well as determine which facet sector produced the laser scanning beam. The later function is carried out using the tables set forth in FIGS. 11C1 through 11D and the method described in the flow chart of FIG. 11E. As shown in FIG. 11B, the output of the decoder is a scan data element comprising the package ID data, the scanner number (SN), the laser scanning station number (SSN), facet number (FN) and minimum and maximum facet angles subtending the facet sector involved in generating the laser beam used to read the decoded bar code symbol representative of the package ID data. Additional details concerning the design and construction of digitizer circuit (239A) can be found in Applicant's U.S. Pat. No. 5,343,027 incorporated herein by reference in its entirety.

An alternative method of sychronously encoding facet section information with digital count data in the digitizer circuit of each decode board is shown in FIGS. 12 through 14C. This method involves optically encoding the start of each facet sector (SFS) mark along the outer edge of the holographic scanning disc 130, as shown in FIG. 12. This optical encoding process can be carried out when mastering the scanning disc using a masking pattern during laser exposure. The home pulse gap sensing module described above can be used to detect the home pulse gap as well as the SFS marks along the edge of the scanning disc. As shown, the home gap genrates a home pulse while the SFS marks generate a series of SFSPs during each revolution of the scanning disc. The home pulse is detected on the home pulse detection circuit on the motherboard and is used to generate HOPs as in the case described above. The HOPs are transmitted to each decode board where they are used reference (i.e. count) how many SFSPs have been counted since the received HOP, and thus determine which facet sector the laser beam is passing through as the scanning disc rotates. Digital counts representative of each SFSP are sychronously generated by the SFSP generator aboard each decode board are loaded into the auxiliary FIFO 341, while correlated digital count scan data is loaded into both the primary and auxiliary FIFOs in a manner similar to that described above. The decode processor can use the information in tables 14B1 and 14B2 to determine which SFSP counts correspond to which minimum and maximum facet angles in accordance with the decode processing method of the present invention described in FIG. 13C. The advantage of this method is that it is expected to be less sensitive to variations in angular velocity of the scanning disc.

In FIG. 4, the individual scanning subsystems within the system hereof are interfaced with a data management computer system 120 by way of I/O port multiplier 121 well known in the art. The computer system has a GUI 122 supported by a display terminal, mouse, keyboard and the like. This GUI enables programming of the system and the like.

In FIG. 15, the package velocity and length measurement subsystem 400 is configured in relation to the tunnel conveyor subsystem 500 and package dimensioning/profiling subsystem 600 of the illustrative embodiment. In FIG. 15A, a direct transmitt/receive configuration of the dual-laser based package velocity and measurement subsystem 400' is installed in at the location of the vertical and horizontal light curtains employed in the package profiling subsystem 600.

In FIG. 15B, a retro-reflection configuration of the dual-laser based package velocity and measurement subsystem 400 is shown installed in at the location of the vertical and horizontal light curtains 601 and 602 employed in the package profiling subsystem 600. The dual laser diodes used in the dual-laser based package velocity and length measurement subsystem 400 can be driven using the circuitry shown in FIG. 15B1. Electronic circuitry for conditioning the signals received by the photoreceivers of this subsystem is shown in FIG. 15B2. The velocity (v) and length (L) of the package transported through the dual-laser based package velocity and measurement subsystem can be computed using using the algorthim disclosed in FIGS. 15C1 through 15C3. The same signal processing algorithm can be used to process the signals detected by the photodetectors in the retro-reflective configuration of this subsystem.

As shown in FIG. 16, the global coordinate reference system $R_{global}$ is symbolically embedded within the structure of the package dimensioning/profiling subsystem 600 (and package-in-tunnel signalling subsytem 700). The horizontally and vertically arranged light transmitting and receiving structures and subcomponents of the package (X-Y) dimensioning/profiling subsystem are arranged in a manner generally known in the package handling art. In the illustrative embodiment, package dimensioning/profiling subsystem 600 is ralized by integrating (i) the profiler system (Model No. P101-144-200) from KORE, Inc. of Grand Rapids, Mich., and (ii) the dual-laser based package velocity and measurement subsystem 40 described above. The primary function of the package dimensioning/profiling subsystem 600 is to obtain x and y coordinates associated with the profile of each package as it passes through the light curtain arranged in the x–y plane of the the global coordinate reference system $R_{global}$. The function of the velocity and length measurement subsystem 400 is to obtain the z coordinate(s) of the package relative to the global reference system, at the time of package profiling (i.e. when the package has past the dual laser beam transceiver of this subsytem). Notably, the package dimensioning/profiling subsystem 600 carries out the function of the package-in-tunnel signalling subsystem 700. That is, each time a package is detected at the entry port of the scanning tunnel, the subsytem 600/700 automatically generates a package-in-tunnel (PIT) data element for transmission to the data element queuing, handling and processing subsystem 1000.

For automated conveyor systems, often packages that pass through on the belt are assumed singulated. However, the processing of dimensional data collected within the package dimensioning/profiling subsystem 600 allows detection of packages that have not been properly singulated. For example, this subsystem can simiultaneous track when two boxes pass through non-singulated and there is space between the boxes. In this case, the horizontal light curtain will detect the gap and detection in this scenario is straight forward. When the two boxes are close to each other or when one is on top of the other, the subsytem enables only one width (or height) measurement(s). However, to circumvent his restriction, subsytem 600 employs a simulaneous package detection method based on this width (height) measurement. This method is best described by considering the width measurement taken by the subsystem over time as being expressible as $[x_1, x_2, \ldots x_n]$. According to the simultanous package detection/tracking method hereof, the subsystem 60 employs digital filters to compute the 1st and 2nd derivatives of x. Sudden changes in the value of x can be detected by a threshold on the 1st derivative and a zero-crossing check on the 2nd derivative. Thereafter, the subsytem 600 computes the 3rd derivative of x, and performs a threshold on 3rd derivative to improve the detection performance. Thus, this Simul-Trak™ package detection method can detect any arrangement of non-singulated boxes on the conveyor belt.

In general, there are two basic scenarios to consider when carrying out this method: (1) when one box is disposed on top of another; and (2) when one box is disposed beside another. The cases of more than 2 boxes can be easily extended from these two box scenarios.

Considering the stacked-boxes case, it is noted that a vertical light curtain will measure the height of the boxes when they move through the curtain. In the case of stacked boxes, the measurement of the object height will change while the object is passing through. When the light curtain samples continuously as the boxes move by, subsystem 600 will obtain an array of measurements H(0), H(1), H(N−1). This array of N elements are the sampled height measurements at a fixed sampling rate. Naturally the sampling rate has to be fast enough to get enough measurements. The first derivative is defined as H"(i)=H'(i)-H'(i-1) where i=1,2,.. . N. In order to detect sudden changes in the values of H's, the subsystem 600 differentiates the sudden changes in height from noise (e.g. measurement errors and slight irregularities in the box shape). The first and second derivatives are used to filter out the noise. The decision rules for the simultaneous detection method are:

(1) determine that the boxes are stacked if H(i)>i and sign [H'(i)] ⊘[H'(i)], for any i; and (2) otherwise, determine that the boxes are singulated.

Notably, the sign( ) is the algebraic sign function. It is used to find zero crossings in the 2nd derivative. Simulations show that the decision rule is good with regard to noise, and always correctly locates the abrupt height change, which is necessary to determine that boxes are stacked.

The sampling rate for the above described method can be determined as follows. Let the speed of the box/conveyor be υ, and the minimum tolerance for package separation be D. Then considering the necessary data points to perform the second derivative the following expression must hold true:

$$T \# \frac{3D}{\upsilon}$$

Using this rule for a 600 ft/min. conveyor belt, if the minimum tolerance is 50 mm (2 in.), then the sampling period is −5 ms, which corresponds to a sampling frequency of −200 $H_z$.

The above embodiment of the simultaneous package detection method considered the case when height width measurement was involved. It is noted, however, that the method can also be practiced when w is the width measurement using w'and w".

The above detection method can be carried out usingh a FIR formulation whose transfer function fits the linear operation of differentiation where $$\frac{d}{dt}e^{iwt} = iwe^{iwt}.$$

In the frequency domain, this implies that the transfer function is of the form:

$$H(w)=iw.$$

Letting the digital filter be of the form $$Y_a = \frac{N}{Z_{K=-N}} C_k x_{n-k}.$$

with coefficients $C_k=-C_k$, the transfer function can be expressed as:

$$H(w)=[2c_i \sin w + 2c_2 \sin 2w + \ldots + 2c_N \sin Nw]i.$$

A Fourier Series approximation of the function can be expressed as:

$$H(w) = \{iw \quad |w| < w_c$$
$$\{c \quad |w| > w_c$$

The resulting filter will have a passband of $[o, w_c]$. This is a low pass (smoothing) differentiator for $w_c < \pi$.

The filter coefficients can be computed using $C_k=(a_k+ib_k)/2$ where k ⊘0.

$$\text{where } a_k = \upsilon \text{ and } b_k = \frac{1}{\pi}\Big|_{-\pi} \mu(w)\sin kw\, dw$$
$$= \frac{2}{\pi}\Big|_0^{wc} i\omega \sin kw\, dw$$

$$C_{k=} - \frac{1}{\pi}\left(\frac{\sin kw_c}{k} - \frac{\omega_c \cos kw_c}{k}\right)$$

Notably, $w_c$ is a value in the range of $[o, \pi\}$ when $w_c + \pi$, and also $$C_k = \frac{1}{k}(-1)^k$$

Using the above formulation, a digital filter can be designed for the Simul-Trak™ package detection method of system 600. For the 1st derivative, a low pass stop frequency of $f_c + o.1$ is used where $w_c = 2\pi$). This will help filter out the noise during measurement operations in subsystem 600. For 2nd derivative, an all pass band ($w_c = \pi$) is used.

To improve the detection performance, in particular to reduce flash-alarm rate, a threshold can be applied on the third derivative, which allows one to lower the threshold on the 1st derivative, and thus reduce miss-detection by doing so. The function of the 3rd derivative threshold is to ensure that false-alarms do not happen due to the lowering of the 1st derivative threshold in the digital filter design.

As shown in the FIGS. 20 and 20A, the in-motion weighing subsytem 900 is preferrably arranged about the package dimensioning/profiling subsystem 600.

The package-in-tunnel signalling subsystem 800 can be realized in a variety of way. One way, shown in FIG. 21 is to use a light transmitting/receiving structure as employed in package identification and measuring system 600, and generating a package-out-of-tunnel (POOT) data element upon detecting the exit of each package from the scanning tunnel. As shown in FIG. 21, the best location for this subsystem is at the exit plane of the scanning tunnel. The POOT data element is provided to the data element queuing, handling and processing subsystem 1000, in the manner as all other data elements generated from the package dimensioning/profiling subsystem 600, scanning units associated with the tunnel scanning subsystem, and package-in-tunnel signalling subsystem 700.

In FIGS. 22 and 22A, the structure and function of data element queuing, handing and processing subsystem 1000 is shown in greater detail. As shown, all data elements entering this subsystem are provided to an I/O subsytem (e.g. 121 in FIG. 4). In the illustrative e,mbodiment, there are four possible data elements that might be loaded into the system event queue, realized as a FIFO data structure known in the computing art. Prior to loading into the system event queue, each data element is time-stamped (i.e $T_j$) by a timing stamping module driven by a master clock referenced to the global reference frame $R_{global}$. All data elements in the system event queve are handled by a data element analyzer/handler which is governed by the table of rules set forth in FIGS. 23A1 and 23A2. In general, the subsystem 1000 is best realized by an computing platform having a multi-tasking operating system capable of handling multiple "threads" at the same time.

Each package moving through the scanning tunnel will be represented by a data element (i.e. an object in an object-oriented programming environment) stored in a moving package tracking queue operably connected to the data element handler. Package data elements are placed in the moving package tracking queue and matched with each scan data element accessed from the system event queue using a data element combining module. Scan data elements generated from holographic-based scanning units are processed along the scan data processing channel illustrated by the blocks set forth in the lower right hand corner of FIG. 22, whereas scan data elements generated from non-holographic based scanning units (eg. from the bottom-located polygon scanners in the tunnel) are processed along a different scan data processing channel illustrated by the blocks set forth on FIG. 22A. This is because scan data elements generated from holographic-based scanning units have been generated from laser scanning beams (or finite scanning sectors) which can be tracked with scan package identification data by tracking facet sectors on the scanning disc in issue. A similar technique can be used for polygon-based scanners (e.g. tracking "mirror sectors" instead of HOE-based facet sectors), a different approach has been adopted in the illustrative embodiment. That is the scanning surface (e.g 3×5") of each polygon scanning unit along the bottom scanner is accorded a vector-based surface model, rather than ray-type model used for package identification data collected using holographic scanning mechanisms.

As shown in FIG. 24, a surface geometry model is created for each package surface by the package surface geometry modelling subsystem (i.e module) deployed with the data element queuing, handing and processing subsystem of FIG. 22. In the illustrative embodiment, each surface of each package (transported through package dimensioning/measuring subsystem and package velocity/length measurement subsystem) is mathamatically represented (i.e modelled) using at least three position vectors (referenced to x=0, y=0, z=0) in the global reference frame $R_{global}$, and a normal vector to the package surface indicating the direction of incident light reflection therefrom. The table of FIG. 24A describes a preferred procedure for creating a vector-based surface model for each surface of each package transported through the package dimensioning/measuring subsytem and package velocity/length measurement subsystem of the system hereof.

As shown in FIGS. 25A through 25A1, a vector-based model is created by the scan beam geometry modelling subsytem (i.e. module) of FIG. 22, for the propagation of the laser scanning beam (ray) emanating from a paricular point on the facet, to its point of reflection on the corresponding beam folding mirror, towards to the focal plane determined by the focal length of the facet. The table of FIGS. 25B1 through 25B3 set forth define the parameters used to construct the diffraction-based geometric optics model of the scanning facet and laser scanning beam shown in FIGS. 25A and 25A1. Details of this modelling procedure can be found in Applicant's copending application Ser. No. 08/726,522 filed Oct. 7, 1996; and Ser. No. 08/573,949 filed Dec. 18, 1995. FIG. 26 provides a schematic representation of the laser scanning disc shown in FIGS. 25A and 25A1, labelled with particular parameters associated with the diffraction-based geometric optics model of FIGS. 25A and 25A1.

In FIG. 27, a preferred procedure is described for creating a vector-based ray model for laser scanning beams which have been produced by a holographic laser scanning subsystem of the system hereof, that may have collected the scan data associated with a decoded bar code symbol read thereby within the tunnel scanning subsystem.

Alternatively, FIG. 28 shows how to define a vector-based 2-D surface geometry model for each candidate scan beam by the scan surface modelling subsystem (i.e module) shown in FIG. 22A, wherein each omnidirectional scan pattern produced from a particular polygon-based bottom scanning unit is mathamatically represented (i.e modelled) using four position vectors (referenced to x=0, y=0, z=0) in the global reference frame $R_{global}$, and a normal vector to the scanning surface indicating the direction of laser scanning rays projected therefrom during scanning operations;

FIG. 29 describes how homogeneous transformations can be used to convert a vector-based model within a local scanner coordinate reference frame $R_{localscannerj}$ into a corresponding vector-based model created within the global scanner coordinate reference frame $R_{global}$.

FIG. 30 describes how homogeneous transformations can be used to convert a vector-based package surface model (created within the global coordinate reference frame $R_{global}$ at the "package profiling position") into a corresponding vector-based package surface model created within the global scanner coordinate reference frame $R_{global}$ at the "scanning position" within the tunnel using homogeneous transformations. Notably, this method of coordinate conversion involves computing the package travel distance (d) between the package profiling and scanning positions using the package velocity (v) and the difference in time indicated by the time stamps placed on the package data element and scan data element matched thereto during each scan beam/package surface intersection determination carried out within the data element queuing, handling and processing subsytem of FIGS. 22 and 22A.

FIGS. 31A and 31B, taken together, provide a procedure for determining whether the scan beam (rays) associated with a particular scan data element produced by a holographic scanning subsytem intersects with any surface on the package that has been scanned at a particular scanning position, and thus whether to correlate a particular package identification data element with particular package measurement data element acquired by the system.

FIGS. 32A and 32B, taken together, provide a procedure for determining whether the scanning surface associated with a particular scan data element produced by a non-holographic (e.g. polygon-based) bottom-located scanning subsystem intersects with any surface on the package that has been scanned at a particular scanning position, and thus whether to correlate a particular package identification data element with particular package measurement data element acquired by the system.

When a scan data element taken from the system event queue is correlated with a package data element using the above described methods, then the subsytem 1000 outputs a data elememt (in an output data queue) containing the package ID data and the package measurement data. Such data elements can be displayed graphically, printed out as a listed, provided to sorting subsystems, shipping pricing subsystems, routing subsystems and the like.

Notably, the smaller the facet sectors on the scanning disc, then the better resolution the system hereof will have with regarding to correlating package identification data with package measurement data. As the facet sector gets small, the corresponding minimum and maximum facet angles generated from the decoder device hereof will get closer and closer, approaching a single scanning ray in the ideal situation.

The tunnel scanning system of the present invention can read different bar code symbologies (Interleaved two of five, Code 128 and Code three of nine) and formats so as to sort and identify packages at various package rates required by USPS or other end-user. The system of the illustative embodiment can read the ZIP Code (six digits), Package Identification Code (PIC) (sixteen characters)[1] and the Tray bar code (ten digits) symbols.

The tunnel scanning system hereof can be configured so that all of the products passing through the "tunnel" shall be scanned and read for the valid USPS bar coded symbols regardless of the position of the BCS on the surface of the product. This also includes the bottom surface of the product.

The tunnel scanning system hereof can provided with equipment such as tachometers, dimensioning units, support structures, special power units (if required), air compressors and any other support equipment.

Preferably, the tunnel scanning system of the present invention is constructed using standard interfaces such that scanners, decoders, concentrator, etc. are interchangeable.

The tunnel scanning system hereof can read bar coded symbols through the entire population of tray and tub label holders in use by the USPS. In addition, the tunnel scanning system can read BCS on the package products when the BCS label is placed under diaphanous materials.

There will be more than one symbol (BCS) on many of the packages found in the tunnel system hereof. Some of these symbols will not be valid USPS symbols. If there are multiple symbols on a package, the scanner logic will automatically identify and process only the USPS valid symbols.

The tunnel scanning system of the present invention can process all types of products found in BMC's (e.g. trays and tubs having extremely large variance in surface types and colors, e.g. plastics, Tyvek material, canvass, cardboard, polywrap, Styrofoam, rubber, dark packages). Some of product types are: Softpack—Pillows, bags. All have non-flat bottoms; Flats; Trays and tubs with and without bands. The surface is cardboard or plastic; Cartons; Rugs, duffel bags (without strings or metal clips); mixed-tires, wooden containers (no nails or screws); Sacks; Tires.

It is understood that the laser scanning modules, engines and systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. An automated package identification and dimensioning system capable of (i) identifying packages by reading bar code symbols on said packages while transported through a three-dimensional laser scanning volume disposed above a conveyor belt structure, and (ii) measuring dimensional characteristics of said packages while said packages are transported along the conveyor belt structure through said three-dimensional laser scanning volume, said automated package identification and dimensioning system comprising:

a conveyor belt structure for transporting packages along a predetermined direction;

a scanner support framework arranged above said conveyor belt structure, for supporting a package identification subsystem providing a tunnel-like scanning arrangement above said conveyor belt structure through which said conveyor belt structure extends and along which said packages are transported in an automated manner, wherein said tunnel-like scanning arrangement as an entry port and an exit port; and a data element queuing, handling and processing subsystem for (1) queuing, handling and processing (i) scan beam data elements produced by said package identification subsystem, and (ii) package dimension data elements produced by a package dimensioning subsystem, and (2) generating an output data element for each package transported through said three-dimensional laser scanning volume, and wherein each said output data element contains a time-stamped scan beam data element correlated with a time-stamped package dimension data element, and whereby each said package transported through said three-dimensional laser scanning volume is identified, while providing a measure of the dimension-related characteristics thereof in an automated manner.

2. The automated package identification and dimensioning system of claim 1, wherein said package identification subsystem has a plurality of laser scanning subsystems, each said laser scanning subsystem being mounted from said scanner support framework and projecting a laser scanning pattern confined substantially within said three-dimensional laser scanning volume disposed above said conveyor belt structure, so that when each said package is transported through said three-dimensional laser scanning volume, a bar code symbol on said package is automatically read and a scan beam data element is automatically generated, wherein said scan beam data element includes (i) symbol character data representative of the bar code symbol read by at least one said laser scanning beam and the identity of said package, and (ii) laser scanning beam index data indicative of said at least one laser scanning beam used to read said bar code symbol;

wherein said package dimensioning subsystem is mounted above said conveyor belt structure and before said entry port of said tunnel-like scanning arrangement, for optically scanning each said package as said package is transported through said three-dimensional laser scanning volume, and automatically generating a package dimension data element for each optically scanned package, wherein each said package dimension data element contains package dimension-related data representative of one or more dimension-related characteristics of said optically scanned package.

3. The automated package identification and dimensioning system of claim 2, whereby said data element queuing, handling, and processing subsystem comprises:

a time-stamping module for time-stamping each package identification data element produced from said package identification subsystem and each package dimension data element produced from said package dimensioning subsystem so as to produce a time-stamped scan beam data element for each scan beam data element, and a time-stamped package dimension data element for each package dimension data element, a first queue structure having a first data input port, a first data output port and a first queuing mechanism for queuing each time-stamped scan beam data element and each time-stamped package dimension data element produced by said time-stamping module, wherein each said time-stamped package dimension data element is indicative of a dimensioned package present within said tunnel-like scanning arrangement, and each said time-stamped scan beam data element is indicative of an identified package present within said tunnel-like scanning arrangement, a second queue structure having a second data input port, a second data output port, and a second queuing mechanism for queuing each time-stamped package dimension data element removed from the first data output port of said first queue structure, a data element analyzer for analyzing each data element at the first output data port of said first queue structure to determine if the data element at said first data output port is a time-stamped package dimension data element or a time-stamped scan beam data element, and placing each analyzed time-stamped package dimension data element into the second input port of said second queue structure;

a data element combining module for combining (i) the time-stamped package dimension data element at the second output data port of said second queue structure with (ii) each and every time-stamped scan beam data element within said first queue structure so as to produce a plurality of package data element pairs, wherein each said package data element pair includes a time-stamped package dimension data element containing package dimension-related data, and a time-stamped scan beam data element containing symbol character data and laser scanning beam index data, a package surface modeling module for generating a surface geometry model of the package represented by the time-stamped package dimension related data contained within each said package data element pair, a scan beam modeling module for generating a ray tracing model of the laser scanning beam represented by the laser scanning beam index data contained with each said time-stamped package data element pair, and a scan beam and package surface intersection determination module for determining the occurrence of an intersection between the surface geometry model and the ray tracing model associated with each package data element pair, so as to determine that the time-stamped package dimension data element within said package data element pair is correlated with the corresponding time-stamped scan beam data element within said package data element pair, and if so, generating an output data element containing the time-stamped scan beam data element correlated with the time-stamped package dimension data element.

4. The automated package identification and dimensioning system of claim 2, wherein the laser scanning pattern produced by each said laser scanning subsystem has multiple focal planes and a highly confined geometry extending about a projection axis extending from a scanning window provided within said laser scanning subsystem and above said conveyor belt structure.

5. The automated package identification and dimensioning system of claim 2, wherein said three-dimensional laser scanning volume has a widthwise dimension of at least about 1 meter extending along the width dimension of said conveyor belt structure, a lengthwise dimension of at least 1 meter extending along said predetermined direction, and a heightwise dimension of at least 1 meter extending above said conveyor belt structure.

6. The automated package identification and dimensioning system of claim 2, wherein said plurality of laser scanning subsystems are mounted within the corners of said scanner support framework, on the top and sides of said scanner support framework, and on the front and back of said scanner support framework.

7. The automated package identification and dimensioning system of claim 2, which further comprises a computer system interfaced with said plurality of laser scanning subsystems through an input/output port multiplexer, said computer system supporting functions carried out by said data element queuing, handling and processing subsystem.

8. The automated package identification and dimensioning system of claim 2, wherein each said laser scanning subsystem is a holographic laser scanning system.

9. The automated package identification and dimensioning system of claim 2, wherein said data element queuing, handling and processing subsystem further comprises a homogeneous transformation module for transforming each said surface geometry model and each said ray tracing model to a common coordinate reference frame, within which said scan beam and package surface intersection determination module can determine the occurrence of an intersection between one said surface geometry model and one said ray tracing model.

10. The automated package identification and dimensioning system of claim 9, which further comprises a package velocity determination subsystem for determining the velocity of each said package being transported along said conveyor belt structure.

11. The automated package identification and dimensioning system of claim 10, wherein said homogeneous transformation module analyzes the time-stamp values contained within each said package data element pair to determine a time of travel between the point of dimensioning and the point of laser scanning, and wherein the package velocity is used in conjunction with said time of travel to compute the distance between said the point of dimensioning and the point of laser scanning the package, and wherein said distance is used by said homogeneous transformation module to transform said surface geometry model and said ray tracing model to said common coordinate reference frame.

12. The automated package identification and dimensioning system of claim 2, wherein said package dimensioning subsystem comprises a pair of light transmitting and receiving structures mounted about said conveyor belt structure.

13. The automated package identification and dimensioning system of claim 2, wherein said dimension-related characteristics include one or more dimensions of said optically-scanned package.

14. The automated package identification and dimensioning system of claim 2, wherein each said laser scanning subsystem is a holographic laser scanning subsystem having a holographic scanning disc with a plurality of scanning facets, and each said scanning facet consists of a plurality of scanning sectors, and wherein said laser scanning beam index data is representative of the scanning sector(s) used to produce the laser scanning beam that read said bar code symbol on said package.

15. The automated package identification and dimensioning system of claim 2, wherein each said laser scanning subsystem is a polygonal laser scanning subsystem having a polygonal scanning disc with a plurality of scanning facets, and each said scanning facet consists of a plurality of scanning sectors, and wherein said laser scanning beam index data is representative of the scanning sector(s) used to produce the laser scanning beam that read said bar code symbol on said package.

* * * * *